(12) United States Patent
Adjakple et al.

(10) Patent No.: US 10,880,868 B2
(45) Date of Patent: *Dec. 29, 2020

(54) SYSTEM INFORMATION PROVISIONING AND LIGHT WEIGHT CONNECTION SIGNALING

(71) Applicant: Convida Wireless, LLC, Wilmington, DE (US)

(72) Inventors: Pascal M. Adjakple, Great Neck, NY (US); Joseph M. Murray, Schwenksville, PA (US); Qing Li, Princeton Junction, NJ (US); Wei Chen, San Diego, CA (US); Allan Y. Tsai, Boonton, NJ (US); Guodong Zhang, Woodbury, NY (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,772

(22) Filed: Jul. 9, 2019

(65) Prior Publication Data
US 2019/0394753 A1 Dec. 26, 2019

Related U.S. Application Data

(63) Continuation of application No. 15/492,571, filed on Apr. 20, 2017, now Pat. No. 10,390,331.
(Continued)

(51) Int. Cl.
*H04W 72/00* (2009.01)
*H04W 72/04* (2009.01)
(Continued)

(52) U.S. Cl.
CPC ............. *H04W 72/04* (2013.01); *H04W 4/06* (2013.01); *H04W 16/02* (2013.01); *H04W 36/00* (2013.01);
(Continued)

(58) Field of Classification Search
CPC ..... H04W 48/12; H04W 48/10; H04W 48/14; H04W 74/0833; H04W 72/042;
(Continued)

(56) References Cited

U.S. PATENT DOCUMENTS 8,902,773 B2   12/2014  Anderson et al.
9,002,979 B2 *  4/2015  Hansen .................. G06Q 50/22
                                                                 709/217
(Continued)

FOREIGN PATENT DOCUMENTS

CN    104205930 A    12/2014
EP      2464076 A2    6/2012
(Continued)

OTHER PUBLICATIONS

3rd Generation Partnership Project (3GPP) R2-162571 TSGRAN WG2 Meeting #93bis, Introduction of Virtual Cell, CATT, Dubrovnik, Croatia, Apr. 11-15, 2016, 3 pages.
(Continued)

*Primary Examiner* — Joseph Arevalo
(74) *Attorney, Agent, or Firm* — BakerHostetler

(57) ABSTRACT

System information can include a basic set of system information and additional system information. A UE can receive the basic set of system information and then later request or receive the additional system information. Messages can use tags which can be used to look up locally stored system information. If a tag does not correspond to any locally stored system information, the system information and an associated tag can then be requested. Messages can be indicative of a cluster identity associated with cells. When the UE goes into a new cell, the cluster identity can be checked to see if system information from a prior call can be reused.

15 Claims, 40 Drawing Sheets

Related U.S. Application Data

(60) Provisional application No. 62/325,380, filed on Apr. 20, 2016, provisional application No. 62/331,301, filed on May 3, 2016, provisional application No. 62/331,202, filed on May 3, 2016, provisional application No. 62/417,162, filed on Nov. 3, 2016.

(51) Int. Cl.

| | | |
|---|---|---|
| *H04W 36/00* | (2009.01) | |
| *H04W 48/00* | (2009.01) | |
| *H04W 76/18* | (2018.01) | |
| *H04W 76/10* | (2018.01) | |
| *H04W 4/06* | (2009.01) | |
| *H04W 16/02* | (2009.01) | |

(52) U.S. Cl.
CPC ........... *H04W 48/00* (2013.01); *H04W 76/10* (2018.02); *H04W 76/18* (2018.02)

(58) Field of Classification Search
CPC ..... H04W 4/06; H04W 4/70; H04W 72/0406; H04W 72/0446; H04W 76/27; H04W 84/12; H04W 36/08; H04W 48/02; H04W 48/08; H04W 24/10; H04W 48/16; H04W 48/20; H04W 52/0216; H04W 72/005; H04W 72/12; H04W 72/1289; H04W 74/006; H04W 76/10; H04W 8/005; H04W 28/18; H04W 72/1278; H04W 88/08; H04W 8/26; H04W 24/02; H04W 36/0055; H04W 48/18; H04W 4/00; H04W 56/001; H04W 64/00; H04W 68/00; H04W 72/02; H04W 72/04; H04W 72/0413; H04W 72/0453
USPC .... 455/450, 434, 452.1, 561, 446, 444, 436, 455/447
See application file for complete search history.

(56) References Cited

U.S. PATENT DOCUMENTS

| | | | |
|---|---|---|---|
| 9,198,181 B2 | 11/2015 | Blankenship et al. | |
| 9,338,700 B2 * | 5/2016 | Schulist | H04W 36/14 |
| 9,413,451 B2 | 8/2016 | Park et al. | |
| 9,559,797 B2 | 1/2017 | Liao et al. | |
| 10,306,671 B2 | 5/2019 | Li et al. | |
| 2007/0042784 A1 | 2/2007 | Anderson | |
| 2008/0205351 A1 | 8/2008 | Lindoff et al. | |
| 2009/0047902 A1 | 2/2009 | Nory et al. | |
| 2009/0298497 A1 * | 12/2009 | Lee | H04W 48/08 |
| | | | 455/434 |
| 2009/0323607 A1 | 12/2009 | Park et al. | |
| 2010/0027466 A1 | 2/2010 | Mustapha | |
| 2010/0035611 A1 | 2/2010 | Montojo et al. | |
| 2010/0061361 A1 | 3/2010 | Wu | |
| 2010/0227611 A1 * | 9/2010 | Schmidt | H04W 4/06 |
| | | | 455/434 |
| 2011/0077013 A1 | 3/2011 | Cho et al. | |
| 2011/0222428 A1 | 9/2011 | Charbit et al. | |
| 2011/0242997 A1 | 10/2011 | Yin | |
| 2012/0009963 A1 | 1/2012 | Kim et al. | |
| 2012/0127934 A1 | 5/2012 | Anderson et al. | |
| 2013/0017833 A1 * | 1/2013 | Sakamoto | H04W 36/18 |
| | | | 455/436 |
| 2013/0034071 A1 | 2/2013 | Lee et al. | |
| 2013/0155847 A1 | 6/2013 | Li et al. | |
| 2013/0188503 A1 | 7/2013 | Anepu et al. | |
| 2013/0225184 A1 | 8/2013 | Liu et al. | |
| 2013/0265932 A1 | 10/2013 | Huang et al. | |
| 2014/0036806 A1 | 2/2014 | Chen et al. | |
| 2014/0086217 A1 | 3/2014 | Park et al. | |
| 2014/0204854 A1 | 7/2014 | Freda et al. | |
| 2014/0206854 A1 | 7/2014 | Bennett et al. | |
| 2014/0223095 A1 | 8/2014 | Storm et al. | |
| 2014/0254544 A1 | 9/2014 | Kar et al. | |
| 2014/0293901 A1 * | 10/2014 | Hegde | H04W 48/16 |
| | | | 370/329 |
| 2014/0315593 A1 | 10/2014 | Vrzic et al. | |
| 2014/0321375 A1 | 10/2014 | Agiwal et al. | |
| 2014/0369201 A1 | 12/2014 | Gupta et al. | |
| 2015/0103725 A1 | 4/2015 | Sun et al. | |
| 2015/0223279 A1 * | 8/2015 | Jiao | H04W 4/06 |
| | | | 370/312 |
| 2015/0234708 A1 | 8/2015 | Storm et al. | |
| 2015/0282130 A1 | 10/2015 | Webb et al. | |
| 2015/0326484 A1 | 11/2015 | Cao et al. | |
| 2015/0327245 A1 | 11/2015 | Zhu et al. | |
| 2016/0020877 A1 | 1/2016 | Koutsimanis et al. | |
| 2016/0036578 A1 | 2/2016 | Malladi et al. | |
| 2016/0073302 A1 | 3/2016 | Yang et al. | |
| 2016/0100395 A1 | 4/2016 | Ku et al. | |
| 2016/0113039 A1 | 4/2016 | Hole et al. | |
| 2016/0135153 A1 | 5/2016 | Suzuki et al. | |
| 2016/0156397 A1 | 6/2016 | Onggosanusi et al. | |
| 2016/0234736 A1 * | 8/2016 | Kubota | H04B 7/0413 |
| 2016/0234759 A1 | 8/2016 | Kubota et al. | |
| 2016/0249269 A1 | 8/2016 | Niu et al. | |
| 2016/0270102 A1 | 9/2016 | Zeng et al. | |
| 2016/0352545 A1 | 12/2016 | Johnson | |
| 2016/0353343 A1 | 12/2016 | Rahman et al. | |
| 2017/0013598 A1 * | 1/2017 | Jung | H04W 76/14 |
| 2017/0034845 A1 | 2/2017 | Liu et al. | |
| 2017/0118054 A1 | 4/2017 | Ma et al. | |
| 2017/0134913 A1 | 5/2017 | Cui et al. | |
| 2017/0164212 A1 | 6/2017 | Opsenica et al. | |
| 2017/0164349 A1 | 6/2017 | Zhu et al. | |
| 2017/0201980 A1 | 7/2017 | Hakola et al. | |
| 2017/0230985 A1 | 8/2017 | Yamada et al. | |
| 2017/0273063 A1 | 9/2017 | Kim et al. | |
| 2017/0289791 A1 | 10/2017 | Yoo et al. | |
| 2017/0290052 A1 | 10/2017 | Zhang et al. | |
| 2017/0331670 A1 | 11/2017 | Parkvall et al. | |
| 2017/0331785 A1 | 11/2017 | Xu et al. | |
| 2017/0359731 A1 | 12/2017 | Soldati et al. | |
| 2017/0366311 A1 | 12/2017 | Iyer et al. | |
| 2018/0034612 A1 | 2/2018 | Lin et al. | |
| 2018/0076994 A1 | 3/2018 | Lee et al. | |
| 2018/0123763 A1 | 5/2018 | Yu | |
| 2018/0124598 A1 | 5/2018 | Zeng | |
| 2018/0139656 A1 | 5/2018 | Xu et al. | |
| 2018/0167938 A1 | 6/2018 | Stephenne et al. | |
| 2018/0184415 A1 | 6/2018 | Rong et al. | |
| 2018/0198504 A1 | 7/2018 | Li et al. | |
| 2018/0199361 A1 | 7/2018 | Zhang et al. | |
| 2018/0220407 A1 | 8/2018 | Xiong et al. | |
| 2018/0242304 A1 | 8/2018 | Rong et al. | |
| 2018/0287722 A1 | 10/2018 | Takano | |
| 2018/0294860 A1 | 10/2018 | Hakola et al. | |
| 2018/0338277 A1 * | 11/2018 | Byun | H04W 48/10 |
| 2018/0343043 A1 | 11/2018 | Hakola et al. | |
| 2018/0368018 A1 * | 12/2018 | Kim | H04L 69/22 |
| 2019/0045340 A1 * | 2/2019 | Zhu | H04W 72/042 |
| 2019/0045577 A1 * | 2/2019 | Kim | H04W 76/28 |
| 2019/0159107 A1 | 5/2019 | Kim et al. | |
| 2019/0182856 A1 | 6/2019 | Moroga et al. | |
| 2019/0190579 A1 | 6/2019 | Wang et al. | |
| 2019/0208474 A1 | 7/2019 | Ali et al. | |
| 2019/0281623 A1 | 9/2019 | Andgart et al. | |
| 2019/0288789 A1 | 9/2019 | Li et al. | |
| 2020/0092065 A1 | 3/2020 | Kuang et al. | |

FOREIGN PATENT DOCUMENTS

| | | |
|---|---|---|
| EP | 2882110 A1 | 6/2015 |
| EP | 3051906 A1 | 8/2016 |
| EP | 3082362 A1 | 10/2016 |
| EP | 3101971 A1 | 12/2016 |
| EP | 3420659 A1 | 1/2019 |
| JP | 2010-508789 A | 3/2010 |
| JP | 2010-519838 A | 6/2010 |
| JP | 2016-504798 A | 2/2016 |
| JP | 2016-504851 A | 2/2016 |

(56) References Cited

FOREIGN PATENT DOCUMENTS

| | | |
|---|---|---|
| JP | 2016-514416 A | 5/2016 |
| KR | 10-2008-0041237 A | 5/2008 |
| KR | 10-2008-0109535 A | 12/2008 |
| KR | 10-2009-0085640 A | 8/2009 |
| KR | 10-2010-0065327 A | 6/2010 |
| KR | 10-2010-0097625 A | 9/2010 |
| KR | 10-2011-0063565 A | 6/2011 |
| KR | 10-2014-0098156 A | 8/2014 |
| KR | 10-2015-0118874 A | 10/2015 |
| KR | 10-1563469 B1 | 10/2015 |
| WO | 2007/052753 A1 | 5/2007 |
| WO | 2007/125910 A1 | 11/2007 |
| WO | 2010/001474 A1 | 1/2010 |
| WO | 2014/090200 A1 | 6/2014 |
| WO | 2014/090208 | 6/2014 |
| WO | 2014/135126 A1 | 9/2014 |
| WO | 2015/045658 A1 | 4/2015 |
| WO | 2015/067196 A1 | 5/2015 |
| WO | 2015/080646 A1 | 6/2015 |
| WO | 20151084048 A1 | 6/2015 |
| WO | 2015/100533 A1 | 7/2015 |
| WO | 2015/113205 A1 | 8/2015 |
| WO | 2015/122737 A1 | 8/2015 |
| WO | 2015/141982 A1 | 9/2015 |
| WO | 20171147515 A1 | 8/2017 |
| WO | 2017/191833 A1 | 11/2017 |

OTHER PUBLICATIONS

3rd Generation Partnership Project (3GPP) RP-160301 TSG RAN Meeting #71, Motivation for new WI on Light Connection in LTE, Huawei, HiSilicon, Goteborg, Sweden, Mar. 7-11, 2016, 14 pages.
3rd Generation Partnership Project (3GPP) RP-160425 TSG RAN Meeting #71, Further enhancements on signaling reduction to enable light connection for LTE, Intel Corporation, Gothenburg, Sweden, Mar. 7-10, 2016, 7 pages.
3rd Generation Partnership Project (3GPP) RP-160540 TSG RAN Meeting #71, New WI proposal: Signalling reduction to enable light connection for LTE, Gothenburg, Sweden, Mar. 7-10, 2016, 7 pages.
3rd Generation Partnership Project (3GPP) RP-161214 TSG RAN Meeting #72, Revision of SI: Study on New Radio Access Technology, NTT DOCOMO, Busan, Korea, Jun. 13-16, 2016, 8 pages.
3rd Generation Partnership Project (3GPP) S1-152395 Revision of S1-152074, ZTE Corporation et al., "Update the network slicing use case in Smarter", ZTE Smarter Update the Network Slicing Use case REV3, vol. SA WG1, No. Belgrade Serbia, Aug. 24, 2015, 3 pages.
3rd Generation Partnership Project (3GPP) S1-161323 TSG-SA WG1 Meeting #74, Editorial cleanup and alignment of eMBB TR22.863, Venice, Italy, May 9-13, 2016, 4 pages.
3rd Generation Partnership Project (3GPP) S2-161198 SA WG2 Meeting #113AH, Solution for optimized UE sleep state and state transitions, Sophia Antipolis, France, Feb. 23-26, 2016, 3 pages.
3rd Generation Partnership Project (3GPP) S2-161324 SA WG2 Meeting #113, Solution to Key Issue on Mobility Framework, Sophia Antipolis, FR, Feb. 23-26, 2016, 3 pages.
3rd Generation Partnership Project (3GPP) S2-162982 was S2-162717-MDD and Slice Selection in core and RAN V1, 3rd vol. SA WG2, Nokia et al., No. Nanjing, P.R. China; May 27, 2016, 13 pages.
3rd Generation Partnership Project (3GPP) SA WG2 Meeting #115 S2-162511 "Common CP functions and dedicate CP function for simultaneous multiple Network Slice (update of solution 1.3)" May 23-27, 2016, 4 pages.
3rd Generation Partnership Project (3GPP) Tr 22.861 V14.1.0, Technical Specification Group Services and Systems Aspects, Feasibility Study on New Services and Markets Technology Enablers for Massive Internet of Things, Stage 1 (Release 14), Sep. 2016, 28 pages.
3rd Generation Partnership Project (3GPP) TR 22.862 V14.1.0, Technical Specification Group Services and System Aspects, Feasibility Study on New Services and Markets Technology Enablers for Critical Communications, Stage 1 (Release 14), Sep. 2016, 31 pages.
3rd Generation Partnership Project (3GPP) Tr 22.863 V0.3.1, Technical Specification Group Services and System Aspects, Feasibility Study on New Services and Markets Technology Enablers—Enhanced Mobile Broadband; Stage 1 (Release 14), Feb. 2016, 13 pages.
3rd Generation Partnership Project (3GPP) TR 22.863 V14.1.0, Technical Specification Group Services and System Aspects, Feasibility Study on New Services and Markets Technology Enablers—Enhanced Mobile Broadband, Stage 1 (Release 14), Sep. 2016, 21 pages.
3rd Generation Partnership Project (3GPP) TR 22.864 V14.1.0, Technical Specification Group Services and System Aspects, Feasibility Study on New Services and Markets Technology Enablers—Network Operation, Stage 1 (Release 14), Sep. 2016, 35 pages.
3rd Generation Partnership Project (3GPP) Tr 22.891 V14.2.0, Technical Specification Group Services and System Aspects, Feasibility Study on New Services and Markets Technology Enablers, Stage 1 (Release 14), Sep. 2016, 95 pages.
3rd Generation Partnership Project (3GPP) TR 23.720 V13.0.0, Technical Specification Group Services and System Aspects, Study on architecture enhancements for Cellular Internet of Things, (Release 13), Mar. 2016, 94 pages.
3rd Generation Partnership Project (3GPP) TR 36.881 V14.0.0, Technical Specification Group Radio Access Network, Evolved Universal Terrestrial Radio Access (E-UTRA), Study on Latency Reduction Techniques for LTE (Release 14), Jun. 2016, 249 pages.
3rd Generation Partnership Project (3GPP) TR 36.897 V13.0.0, Technical Specification Group Radio Access Network, Study on Elevation Beamforming/Full-Dimension (FD) Multiple Input Multiple Output (MIMO) for LTE; (Release 13), Jun. 2015, 58 pages.
3rd Generation Partnership Project (3GPP) TR 36.912 V13.0.0, Technical Specification Group Radio Access Network, Feasibility study for Further Advancements for E-UTRA (LTE-Advanced) (Release 13), Dec. 2015, 273 pages.
3rd Generation Partnership Project (3GPP) TR 38.801 V0.2.0, Technical Specification Group Radio Access Network, Study on New Radio Access Technology: Radio Access Architecture and Interface (Release 14), Jun. 2016, 20 pages.
3rd Generation Partnership Project (3GPP) TR 38.913 V14.3.0, Technical Specification Group Radio Access Network, Study on Scenarios and Requirements for Next Generation Access Technologies, (Release 14), Jun. 2017, 39 pages.
3rd Generation Partnership Project (3GPP) TR 45.820 V13.1.0, Technical Specification Group GSM/EDGE Radio Access Network, Cellular system support for ultra-low complexity and low throughput Internet of Things (CIoT) (Release 13), Nov. 2015, 495 pages.
3rd Generation Partnership Project (3GPP) TS 23.060 V13.6.0, Technical Specification Group Services and System Aspects, General Packet Radio Service (GPRS), Service description, Stage 2 (Release 13), Mar. 2016, 362 pages.
3rd Generation Partnership Project (3GPP) TS 23.401 V13.6.1, Technical Specification Group Services and System Aspects, General Packet Radio Service (GPRS) enhancements for Evolved Universal Terrestrial Radio Access Network (E-UTRAN) access (Release 13), Mar. 2016, 365 pages.
3rd Generation Partnership Project (3GPP) TS 24.302 V135.0, Technical Specification Group Core Network and Terminals, Access to the 3GPP Evolved Packet Core (EPC) via non-3GPP access networks; Stage 3 (Release 13), Mar. 2016, 126 pages.
3rd Generation Partnership Project (3GPP) TS 36.133 V14/.0, Technical Specification Group Radio Access Network, Evolved Universal Terrestrial Radio Access (E-UTRA), Requirements for support of radio resource management (Release 14), Mar. 2018, 2997 pages.
3rd Generation Partnership Project (3GPP) TS 36.213 V13.0.0, Technical Specification Group Radio Access Network, Evolved Universal Terrestrial Radio Access (E-UTRA), Physical layer procedures (Release 13), Dec. 2015, 326 pages.
3rd Generation Partnership Project (3GPP) TS 36.300 V13.3.0, Technical Specification Group Radio Access Network, Evolved

(56) References Cited

OTHER PUBLICATIONS

Universal Terrestrial Radio Access (E-UTRA) and Evolved Universal Terrestrial Radio Access Network (E-UTRAN), Overall description; Stage 2 (Release 13), Mar. 2016, 295 pages.
3rd Generation Partnership Project (3GPP) TS 36.321 V13.0.0, Technical Specification Group Radio Access Network, Evolved Universal Terrestrial Radio Access (E-UTRA), Medium Access Control (MAC) protocol specification (Release 13), Dec. 2015, 82 pages.
3rd Generation Partnership Project (3GPP) TSG RAN WG1 #84bis Meeting, R1-163757, Way Forward on Channel Coding Evaluation for 5G New Radio, Busan, Korea, Apr. 11-15, 2016, Agenda Item 8.1.6.1, 5 pages.
3rd Generation Partnership Project (3GPP) TSG RAN WG1 #85, R1-164013, Framework for Beamformed Access, Samsung, Nanjing, China, May 23-27, 2016, 4 pages.
3rd Generation Partnership Project (3GPP) TSG RAN WG1 #85, R1-164014, Discussion on RS for Beamformed Access, Samsung, Nanjing, China, May 23-27, 2016, 3 pages.
3rd Generation Partnership Project (3GPP) TSG RAN WG1 #85, R1-165669, Way Forward on Frame Structure, Qualcomm and etc., Nanjing, China, May 23-27, 2016, Agenda Item 7.1.4, 2 pages.
3rd Generation Partnership Project (3GPP) TSG RAN WG1 Meeting #83 R1-157351, Initial Views on Technical Design for Nb-IoT, Nov. 15-22, 2015, 3 pages.
3rd Generation Partnership Project (3GPP) TSG RAN WG1 Meeting #84bis R1-162379, "Overview of new radio access technology requirements and designs" Apr. 11-15, 2016, 4 pages.
3rd Generation Partnership Project (3GPP) TSG RAN WG1 Meeting #84bis R1-162797, "Harq Enhancement for Improved Data Channel Efficiency", Busan, Korea, Apr. 11-15, 2016, 3 pages.
3rd Generation Partnership Project (3GPP) TSG RAN WG1 Meeting #85 R1-164871 "Frame structure for new radio interface", May 23-27, 2016, 3 pages.
3rd Generation Partnership Project (3GPP) TSG RAN WG1 Meeting #85 R1-165174 "Uplink multiple access schemes for NR", May 23-27, 2016, 4 pages.
3rd Generation Partnership Project (3GPP) TSG RAN WG1 Meeting #86bis R1-1610524, WF on NR RS Definition, Huawei, HiSilicon, Lisbon, Portugal, Oct. 1-14, 2016, Agenda Item: 8.1.4.4, 4 pages.
3rd Generation Partnership Project (3GPP) TSG-RAN WG1 #85, R1-164628, Frame Structure for NR, Ericsson, Nanjing, China, May 23-27, 2016, 3 pages.
3rd Generation Partnership Project (3GPP) TSG-RAN WG1 #85, R1-164694, Frame Structure Requirements, Qualcomm, Nanjing, China, May 23-27, 2016, 5 pages.
3rd Generation Partnership Project (3GPP) TSG-RAN WG1#85 R1-165027 "Basic Frame Structure Principles for 5G" May 23-27, 2016, 6 pages.
3rd Generation Partnership Project (3GPP) TSG-RAN WG1#85, R1-165363, Nokia, Alcatel-Lucent Shanghai Bell, Scalability of MIMO Operation Across NR Carrier Frequencies, Nanjing, P.R. China, May 23-27, 2016, 5 pages.
3rd Generation Partnership Project (3GPP) TSG-RAN WG2 Meeting #94 R2-163371, "System Information Signalling Design in NR", May 23-27, 2016, 7 pages.
3rd Generation Partnership Project (3GPP) TSG-RAN WG2 Meeting #94, R2-163718 "Control Plane functions in NR", Nanjing, China; May 23-27, 2016, 4 pages.
3rd Generation Partnership Project (3GPP), RI-165027, vol. RAN WG1, Nokia et al: "Basic frame structure 1 principles for 5G", 3GPP Draft; No. Nanjing, P.R. China; May 23, 2016-May 27, 2016 May 13, 2016.
3rd Generation Partnership Project (3GPP), TS 36.212 V10.8.0, RAN WG1, Technical Specification Group Radio Access Network; Evolved Universal Terrestrial Radio Access (E-UTRA); Multiplexing and Channel Coding (Release 10), Jun. 17, 2013, pp. 1-79.
3rd Generation Partnership Project (3GPP), TSG RAN WG1 Meeting #86, "Rani Chairman's Notes", Gothenburg, Sweden, Aug. 22-26, 2016, 105 pages.
3rd Generation Partnership Project; (3GPP) TR 22.891 V1.1.0, 3rd Generation Partnership Project; Technical Specification Group Services and System Aspects; Feasibility Study on New Services and Markets Technology Enablers; Stage 1 (Release 14), Nov. 2015, 95 pages.
3rd Generation Partnership Project; (3GPP) TR 23.799, "Technical Specification Group Services and System Aspects; Study on Architecture for Next Generation System (Release 14)", vol. SA WG2, No. V0.5.0, Jun. 8, 2016, pp. 1-179.
3rd Generation Partnership Project; (3GPP) TR 38.913 V0.2.0, 3rd Generation Partnership Project; Technical Specification Group Radio Access Network; Study on Scenarios and Requirements for Next Generation Access Technologies; (Release 14), Feb. 2016, 19 pages.
3rd Generation Partnership Project; (3GPP) TS 36.211 V13.1.0, 3rd Generation Partnership Project; Technical Specification Group Radio Access Network; Evolved Universal Terrestrial Radio Access (E-UTRA); Physical Channels and Modulation (Release 13), Mar. 2016, 155 pages.
3rd Generation Partnership Project; (3GPP) TS 36.304 V13.0.0, 3rd Generation Partnership Project; Technical Specification Group Radio Access Network; Evolved Universal Terrestrial Radio Access (E-UTRA); User Equipment (UE) Procedures in idle Mode (Release 13), Dec. 2015, 42 pages.
3rd Generation Partnership Project; (3GPP) TS 36.331 V13.0.0, Technical Specification Group Radio Access Network; Evolved Universal Terrestrial Radio Access (E-UTRA); Radio Resource Control (RRC); Protocol specification (Release 13), Dec. 2015, 507 pages.
3rd Generation Partnership Project; (3GPP) TSG-RAN WG1 #86bis, R1-1610177, "DL Control Channels Overview", Qualcomm Incorporated, Oct. 10-14, 2016, Lisbon, Portugal, Discussion, Oct. 1, 2016, 6 pages.
Budisin S. "Decimation Generator of Zadoff-Chu Sequences", In: Carlet C., Pott A. (eds) Sequences and Their Applications—SETA 2010. SETA 2010. Lecture Notes in Computer Science, vol. 6338. Springer, Berlin, Heidelberg, 2010, 40 pages.
Budisin, "Decimation Generator of Zadoff-Chu Sequences", C. Carlet and A. Pott (Eds.): SETA 2010, LNCS 6338, pp. 30-40, 2010.
Chu, David, "Polyphase Codes With Good Periodic Correlation Properties", IEEE Transactions on Information Theory, Jul. 1972, 531-532.
IEEE P802.11, Wireless LANs, Proposed TGax draft specification, Comment Resolutions on UL MU Operation, Jul. 25, 2016, 27 pages.
International Telecommunication Union (ITU-R), "IMT Vision—Framework and overall objectives of the future development of IMT for 2020 and beyond", Recommendation ITU-R M.2083-0, Sep. 2015, 21 pages.
NGMN 5G Initiative White Paper v1.0, Feb. 17, 2015, 125 pages.
Qualcomm Incorporated: "Frame structure requirements", 3GPP Draft; vol. RAN WG1, No. Nanjing, China; May 14, 2016.
Qualcomm, 3GPP R1-1612062, TSG-RAN WG1 #87, Control Channel for slot format indicator, Nov. 14-18, 2016 (Year 2016).
Samsung: "Signaling of Slot Structure", 3GPP Draft; R1-1609127, 3Rd Generation Partnership Project (3GPP), Mobile Competence Centre; 650, Route Des Lucioles; F-06921 Sophia Anti Polis CEO EX ; France, RAN WG1, No. Lisbon, Portugal; 2016101 O-20161014 Sep. 30, 2016.
Sesia et al., "LTE—The UMTS Long Term Evolution", Chapter 9.3.3., LTE—The UMTS Long Term Evolution : from theory to Practice; Jul. 20, 2011, pp. 198-200.
3GPP TSG-RAN WG2 Meeting #95 R2-164693, Samsung, "System Information Signalling Design in NR" Aug. 2016, 6 pages.
3GPP TSG-RAN2 meeting #95bis R2-166202, Huawei et al., "Further Discussions of Minimum SI" Oct. 2016, 3 pages.
3GPP TSG-RAN2 Meeting #95bis R2-166203, Huawei et al., "Delivery of "Other SI" in NR", Oct. 2016, 5 pages.
3GPP TSG-RAN WG2 Meeting #95bis, ETSI MCC, "Skeleton report", Oct. 2016, 5 pages.
3GPP TSG GERA1 Adhoc #3 GPC150521, Samsung Electronics, "Discussions of Grant-Free Multiple Access in CIoT (Update GPC150512)", Jul. 2015, 9 pages.

(56) References Cited

OTHER PUBLICATIONS

3GPP TSG RAN WG1 Meeting #84bis R1-163049, Design Options for Longer Cyclic Prefix for MBSFN Subframes, Apr. 2016, 3 pages.

ETRI, "FS _NEO updated requirement of network slicing", 3GPP TSG-SA WG1 #74 S1-161171, Apr. 29, 2016, URL:http://www.3gpp.org/ftp/tsg_sa/WG1_Serv/TSGS1_74_Venice/docs/SI-161171.zip, 6 pages.

ETRI, "High-level Functional Architecture for the Network Slicing", 3GPPTSG-SA WG2 #114 SZ-161833, Apr. 6, 2016, URL: http://www.3gpp.org/ftp/tsg_sa/WG2_Arch/TSGS2_114_Sophia_Antipolis/Docs/S2-161833.zip, 7 pages.

Huawei, "HiSilicon, UE Slice Association/Overload control Procedure", 3GPP TSG-SA WG2 #115 SZ-162605, May 17, 2016, URL:http://www. 3gpp.org/ftp/tsg_sa/WG2_Archf/TSGS2_115_Nanjing_China/Docs/S2-162605.zip, 11 pages.

ITRI, "Updates to Solution 6. 1.3: Introducing Network Instance ID", 3GPPTSG-SA WG2 #115 SZ-162666, May 17, 2016, URL:http://www.3gpp.org/ftp/tsg_saNVG2_ArchiTSGS2_115_Nanjing_China/Docs/S2-162666.zip>, 9 pages.

MediaTek Inc., "HARQ Enhancement for Improved Data Channel Efficiency" [online], 3GPP TSG-RAN WG1#84b, R1-162797, <URL:http://www.3gpp.org/ftp/tsg_ran/WG1_RL1/TSGR1_84b/Docs/R1-162797.zip>, Apr. 2016, 4 pages.

Nokia, "Alcatel-Lucent Shanghai Bell", Slice Selection solution update, 3GPP TSG-SA WG2 #115 SZ-162982, May 27, 2016, URL: http://www.3gpp.org/ftp/tsg_sa/WG2_Arch/TSGS2_115_Nanjing_China/Docs/S2-162982.zip, 15 pages.

Nokia, "Solutions for Network Slice Selection", Alcatel-Lucent Shanghai Bell, 3GPP TSGG-RAN WG3 Meeting #92, R3-161356, China, May 23-27, 2016, 9 pages.

ZTE, "Consideration on RAN architecture impacts of network slicing", 3GPP TSG-RAN WG2 Meeting #93bis, R2-162627, Croatia, Apr. 11-15, 2016, 10 pages.

Huawei et al., "Discussion on frame structure for NR", 3 GPP TSG-RAN WG1#85, R1-164032, May 23-27, 2016, 8 pages.

NTT DOCOMO Inc., "Discussion on frame structure for NR", 3GPP TSG-RAN WG1#85, R1-165176, May 23-May 27, 2016, 10 pages.

Zte et al., "Forward compatibilty for numerology and fr ame structure design", R1-164261, 3GPP TSG-RAN WG1#85, May 23-27, 2016, 7 pages.

Consideration on System Information Broadcast in New RAT, ZTE, 3GPPTSG-RANWG2 Meeting #93bis, R2-162629, Apr. 15, 2016.

\* cited by examiner

For example:
1) Operator may configure Default SI Broadcast Level to "Normal" or "Reduced".
2) Operator may configure $Activity_{LowThresh}$ and $Activity_{HighThresh}$ to different values or the same value.
3) In some cases, SI Broadcast Level is not changed if $Activity_{LowThresh} \leq ActivityIndex \leq Activity_{HighThresh}$.

SYSTEM INFORMATION PROVISIONING AND LIGHT WEIGHT CONNECTION SIGNALING

CROSS-REFERENCE TO RELATED APPLICATIONS

This Application is a continuation of U.S. patent application Ser. No. 15/492,571, filed Apr. 20, 2017, which claims the benefit of U.S. Provisional Patent Application No. 62/331,301, entitled "On-Demand System Information Provisioning and Update Notification in 5G", filed May 3, 2016; U.S. Provisional Patent Application No. 62/331,202, entitled "Efficient System Information Provisioning In Common Areas", filed May 3, 2016; U.S. Provisional Patent Application No. 62/325,380, entitled "Light Weight Connection Signaling Procedures in 5G", filed Apr. 20, 2016; and U.S. Provisional Patent Application No. 62/417,162, entitled "Beam Based Mobility And Beam Management In NR", filed Nov. 3, 2016; the disclosures of which are hereby incorporated by reference as if set forth in their entireties.

BACKGROUND

LTE (Long-Term Evolution, sometimes called 4G LTE) is a standard for wireless communication of high-speed data for mobile phones and data terminals. It is based on the Global System for Mobile communications (GSM)/Enhanced Data rates for GSM Evolution (EDGE) and Universal Mobile Telecommunications System (UMTS)/High Speed Packet Access (HSPA) network technologies, increasing the capacity and speed using a different radio interface together with core network improvements.

The Radio Resource Control (RRC) protocol is the Radio Resource Control protocol used in UMTS and LTE on the Air interface. It handles the control plane signaling of Layer 3 between the User Equipment (UE) and the Radio Access Network (Universal Terrestrial Radio Access Network (UTRAN) or Evolved Universal Terrestrial Radio Access Network (E-UTRAN)) as well as for the radio interface between a Relay Node and the E-UTRAN. This protocol is specified by the 3rd Generation Partnership Project (3GPP) in TS 25.331 for UMTS and in TS 36.331 for LTE. RRC messages are transported via the PDCP-Protocol.

The major functions of the RRC protocol include connection establishment and release functions, broadcast of system information, radio bearer establishment, reconfiguration and release, RRC connection mobility procedures, paging notification and release and outer loop power control. By means of the signaling functions the RRC configures the user and control planes according to the network status and allows for Radio Resource Management strategies to be implemented.

FIG. 1 shows Radio Resource Control (RRC) Protocol States for Long Term Evolution (LTE). As described in 3GPP TS 36.33, in LTE, a terminal can be in two different states, RRC_CONNECTED and RRC_IDLE.

In RRC_CONNECTED, there is an RRC context. The cell to which the User Equipment (UE) belongs is known and an identity of the UE, the Cell Radio-Network Temporary Identifier (C-RNTI), used for signaling purposes between the UE and the network, has been configured. RRC_CONNECTED is intended for data transfer to/from the UE.

FIG. 2 provides an overview of the RRC states in Evolved Universal Terrestrial Radio Access (E-UTRA) with the illustration of the mobility support between E-UTRAN, UTRAN and GSM EDGE Radio Access Network (GERAN).

Mobility State of UE (36.304): Besides Normal-mobility state, a High-mobility and a Medium-mobility state are applicable if the parameters (TCRmax, NCR_H, NCR_M and TCRmaxHyst) are sent in the system information broadcast of the serving cell. These states can be considered substates as related to mobility in RRC_IDLE state.

NCR_M: This specifies the maximum number of cell reselections to enter Medium-mobility state.

NCR_H: This specifies the maximum number of cell reselections to enter High-mobility state.

TCRmax: This specifies the duration for evaluating allowed amount of cell reselection(s).

TCRmaxHyst: This specifies the additional time period before the UE can enter Normal-mobility state.

State detection criteria:

Medium-mobility state criteria: If number of cell reselections during time period TCRmax exceeds NCR_M and not exceeds NCR_H High-mobility state criteria: If number of cell reselections during time period TCRmax exceeds NCR_H The UE shall not count consecutive reselections between same two cells into mobility state detection criteria if same cell is reselected just after one other reselection.

State transitions:

The UE shall:

if the criteria for High-mobility state is detected: enter High-mobility state.

else if the criteria for Medium-mobility state is detected: enter Medium-mobility state.

else if criteria for either Medium- or High-mobility state is not detected during time period TCRmaxHyst: enter Normal-mobility state.

Details of the Non-access Stratum NAS Protocol for LTE are described in 3GPP TS 23.401 and 3GPP TS 24.301. A summary is provided below.

The non-access stratum (NAS) forms the highest stratum of the control plane between UE and MME at the radio interface over the reference point Uu. Main functions of the protocols that are part of the NAS are:

the support of mobility of the user equipment (UE); and the support of session management procedures to establish and maintain IP connectivity between the UE and a packet data network gateway (PDN GW).

As such, the NAS consists of two separate protocols that are carried on direct signaling transport between the UE and for e.g. the Mobile Management Entity (MME) in the Core Network (CN). The content of the NAS layer protocols is not visible to the Radio Access Network (RAN) nodes (e.g. eNodeB), and the RAN nodes are not involved in these transactions by any other means, besides transporting the messages, and providing some additional transport layer indications along with the messages in some cases. The NAS layer protocols include EPS Mobility Management (EMM), and EPS Session Management (ESM).

EPS Mobility Management (EMM): The EMM protocol is responsible for handling the UE mobility within the system. It includes functions for attaching to and detaching from the network, and performing location updating in between. This is called Tracking Area Updating (TAU), and it happens in idle mode. Note that the handovers in connected mode are handled by the lower layer protocols, but the EMM layer does include functions for re-activating the UE from idle mode. The UE initiated case is called Service Request, while Paging represents the network initiated case.

Authentication and protecting the UE identity, i.e. allocating the temporary identity Globally Unique Temporary UE Identity GUTI to the UE are also part of the EMM layer, as well as the control of NAS layer security functions, encryption and integrity protection. Example of EMM procedures include attach procedure (for registration), detach procedure, service request procedure, tracking area update procedure, connection suspend, connection resume procedure and UE reachability procedure. NAS security is an additional function of the NAS providing services to the NAS protocols, e.g. integrity protection and ciphering of NAS signaling messages.

EPS Session Management (ESM): This protocol may be used to handle the bearer management between the UE and MME, and it is used in addition for E-UTRAN bearer management procedures. Note that the intention is not to use the ESM procedures if the bearer contexts are already available in the network and E-UTRAN procedures can be run immediately. This would be the case, for example, when the UE has already signaled with an operator affiliated Application Function in the network, and the relevant information has been made available through the PCRF.

The overall Evolved Packet System Control Plane Protocol stack is depicted in FIG. 3.

In RRC_IDLE, there is no RRC context in the Radio Access Network (RAN) and the UE does not belong to a specific cell. No data transfer may take place in RRC_IDLE. A UE in RRC_IDLE monitors a Paging channel to detect incoming calls and changes to the system information. Discontinuous Reception (DRX) is used in to conserve UE power. When moving to RRC_CONNECTED, the RRC context needs to be established in both the RAN and the UE.

The System Information (SI) is the information broadcast by the Evolved Universal Terrestrial Radio Access Network (E-UTRAN) that needs to be acquired by the User Equipment (UE) to be able to access and operate within the network. The following excerpt from section 5.2.1.1 of 3GPP TS 36.331 provides a general description of the System Information that is broadcast by the E-UTRAN:

"System information is divided into the MasterInformationBlock (MIB) and a number of SystemInformationBlocks (SIBs). The MIB includes a limited number of most essential and most frequently transmitted parameters that are needed to acquire other information from the cell, and is transmitted on Broadcast Channel (BCH). SIBs other than SystemInformationBlockType1 are carried in SystemInformation (SI) messages and mapping of SIBs to SI messages is flexibly configurable by schedulingInfoList included in SystemInformationBlockType1, with restrictions that: each SIB is contained only in a single SI message, and at most once in that message; only SIBs having the same scheduling requirement (periodicity) can be mapped to the same SI message; SystemInformationBlockType2 is always mapped to the SI message that corresponds to the first entry in the list of SI messages in schedulingInfoList. There may be multiple SI messages transmitted with the same periodicity. SystemInformationBlockType1 and all SI messages are transmitted on DL-SCH Detailed descriptions of the MIB and SIB1 are available in section 6.2.2 of 3GPP TS 36.331. Detailed descriptions of the remaining SIBs (SIB2-SIB20) are available in section 6.3.1 of 3GPP TS 36.331.

The MIB and SIB1 use a fixed schedule with a periodicity of 40 ms and 80 ms respectively. The remaining SIBs use a flexible schedule that can be network dependent. The following excerpt from section 5.2.1.2 of 3GPP TS 36.331 describes the scheduling in more detail:

"The MIB uses a fixed schedule with a periodicity of 40 ms and repetitions made within 40 ms. The first transmission of the MIB is scheduled in subframe #0 of radio frames for which the SFN mod 4=0, and repetitions are scheduled in subframe #0 of all other radio frames.

The SystemInformationBlockType1 uses a fixed schedule with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0.

The SI messages are transmitted within periodically occurring time domain windows (referred to as SI-windows) using dynamic scheduling. Each SI message is associated with a SI-window and the SI-windows of different SI messages do not overlap. That is, within one SI-window only the corresponding SI is transmitted. The length of the SI-window is common for all SI messages, and is configurable. Within the SI-window, the corresponding SI message can be transmitted a number of times in any subframe other than MBSFN subframes, uplink subframes in Time Division Duplex (TDD), and subframe #5 of radio frames for which SFN mod 2=0. The UE acquires the detailed time-domain scheduling (and other information, e.g. frequency-domain scheduling, used transport format) from decoding SI-RNTI on Physical Downlink Control Channel (PDCCH) (see TS 36.321).

A single SI-RNTI is used to address SystemInformationBlockType1 as well as all SI messages.

SystemInformationBlockType1 configures the SI-window length and the transmission periodicity for the SI messages."

System information validity and notification of changes is described in detail in section 5.2.1.3 of 3GPP TS 36.331. Change of system information, other than for Earthquake and Tsunami Warning System (ETWS), Commercial Mobile Alert System (CMAS) and Extended Access Barring (EAB) parameters, occurs at specific radio frames. For example, the concept of a modification period is used. The modification period boundaries are defined by System Frame Number (SFN) values for which SFN mod m=0, where m is the number of radio frames comprising the modification period.

When the network changes system information, for instance at least some of the system information, it first notifies the UEs about this change. For example, this may be done throughout a modification period. In the next modification period, the network transmits the updated system information. These general principles are illustrated in FIG. 4. Referring to FIG. 4, blocks 402 are original SI transmitted during modification period (n), blocks 404 are updated SI transmitted during modification period (n+1), and blocks 406 are SI that are not updated at the modification period boundary.

The Paging message is used to inform UEs in RRC_IDLE and UEs in RRC_CONNECTED about a system information change. If the UE receives a Paging message including the systemInfoModification, it knows that the system information will change at the next modification period boundary.

SystemInformationBlockType1 includes a value tag, systemInfoValueTag, that indicates if a change has occurred in the SI messages. UEs may use systemInfoValueTag, e.g. upon return from out of coverage, to verify if the previously stored SI messages are still valid. Additionally, the UE considers stored system information to be invalid after 3 hours from the moment it was successfully confirmed as valid, unless specified otherwise.

FIG. 5 is a diagram that illustrates a system information acquisition procedure from 3GPP TS 36.331. Referring to FIG. 5, a UE 502 communicates with U-TRAN 504 for system information acquisition. The UE 502 applies the system information acquisition procedure described in section 5.2.2 of 3GPP TS 36.331 to acquire the Access Stratum (AS) and Non-access Stratum (NAS) related system information that is broadcasted by the E-UTRAN 504. The procedure applies to UEs in RRC_IDLE and UEs in RRC_CONNECTED. The UE 502 applies the system information acquisition procedure for the following, for example:

Upon selecting (e.g. upon power on) and upon re-selecting a cell
After handover completion
After entering E-UTRA from another Radio Access Technology (RAT)
Upon return from out of coverage
Upon receiving a notification that the System Information has changed
Upon receiving an indication about the presence of an ETWS notification, a CMAS notification and/or a notification that EAB parameters have changed
Upon receiving a request from CDMA2000 upper layers
Upon exceeding the maximum validity duration When the eDRX cycle is longer than the system information modification period, the UE 502 verifies that stored system information remains valid before establishing an RRC connection. Paging message can be used for system information change notification, when including systemInfoModification-eDRX, for a UE 502 configured with eDRX cycle longer than the system information modification period.

A bandwidth reduced low complexity (BL) UE can operate in any LTE system bandwidth but with a limited channel bandwidth of 6 PRBs (corresponding to the maximum channel bandwidth available in a 1.4 MHz LTE system) in downlink and uplink.

A BL UE may access a cell only if the MIB of the cell indicates that access of BL UEs is supported. If not, the UE considers the cell as barred.

A BL UE receives a separate occurrence of system information blocks (sent using different time/frequency resources). A BL UE has a transport block size (TBS) limited to 1000 bit for broadcast and unicast. The BL UE determines the scheduling information for SIB1 specific for BL UEs based on information in MIB. Scheduling information for other SIBs is given in SIB1 specific for BL UEs. The BCCH modification period for BL UEs is a multiple of the BCCH modification period provided in SIB2. The SIB transmission occasions within an SI-window are provided in the SIB1 specific for BL UEs. A BL UE can acquire SI messages across SI windows. The maximum number of SI messages that can be acquired across SI windows is 4. A BL UE is not required to detect SIB change when in RRC_CONNECTED.

Turning now to system information handling for UEs in enhanced coverage, UE in enhanced coverage is a UE that requires the use of enhanced coverage functionality to access the cell. A UE may access a cell using enhanced coverage functionality only if the MIB of the cell indicates that access of UEs in enhanced coverage is supported. System information procedures for UEs in enhanced coverage are identical to the system information procedures for bandwidth reduced low complexity UEs. A UE capable of enhanced coverage acquires, if needed, and uses legacy system information when in normal coverage if it is not a BL UE. A UE capable of enhanced coverage acquires, if needed, and uses system information specific for UEs in enhanced coverage. A UE in enhanced coverage is not required to detect SIB change when in RRC_CONNECTED.

The cell selection and reselection procedures performed by a UE in RRC_IDLE are described in section 5.2 of 3GPP TS 36.304]. FIG. 6 is high level flow chart illustrating the cell selection and reselection processing performed by the UE 502 in RRC_IDLE. The procedure can be entered whenever a new PLMN is selected or if a suitable cell can't be found upon leaving RRC_CONNECTED. Referring to FIG. 6, after a cell is selected, in step 602, the UE 502 camps on the cell in step 604 and performs the tasks defined in sections 5.2.6 or 5.2.9 of 3GPP TS 36.304, depending on whether the UE 502 has camped on a suitable cell or an acceptable cell, respectively. When camped on a cell, the UE 502 regularly searches for a better cell according to the cell reselection criteria, as defined in section 5.2.3.2 of 3GPP TS 36.304.

The Cell Reselection Evaluation process, in step 606, is performed according to internal UE 502 triggers or when information on the BCCH used for the cell reselection evaluation procedure has been modified. Upon re-selecting a cell, a UE 502 in RRC_IDLE is required to apply the System Information Acquisition procedure as defined in section 5.2.3 of 3GPP TS 36.331 to obtain the following system information for the new serving cell, for example:

MasterInformationBlock
SystemInformationBlockType1
SystemInformationBlockType2 through SystemInformationBlockType8 (depending on support of the concerned RATs)
SystemInformationBlockType17 (depending on support of RAN-assisted WLAN interworking)

System Information for the new serving cell that is acquired during the Cell Reselection Evaluation Process (e.g., MIB, SIB1, SIB2) might not have to be re-acquired following the cell reselection, for example if the information has not changed.

IMT for 2020 and beyond [Recommendation ITU-R M.2083: IMT Vision—"Framework and overall objectives of the future development of IMT for 2020 and beyond" (September 2015)] is envisaged to expand and support diverse families of usage scenarios and applications that will continue beyond the current IMT. Furthermore, a broad variety of capabilities would be tightly coupled with these intended different usage scenarios and applications for IMT for 2020 and beyond. The families of usage scenarios for IMT for 2020 and beyond include, for example:

eMBB (enhanced Mobile Broadband)
Macro and small cells
1 ms Latency (air interface)
Spectrum allocated at WRC-15 may lead up to 8 Gbps of additional throughput
Support for high mobility
URLLC (Ultra-Reliable and Low Latency Communications)
Low to medium data rates (50 kbps-10 Mbps)
<1 ms air interface latency
99.999% reliability and availability
Low connection establishment latency
0-500 km/h mobility
mMTC (massive Machine Type Communications)
Low data rate (1-100 kbps)
High density of devices (up to 200,000/km2)

Latency: seconds to hours

Low power: up to 15 years battery autonomy

Asynchronous access

Network Operation

Network Operation addresses the subjects such as Network Slicing, Routing, Migration and Interworking, Energy Saving, etc.

The following deployment scenarios are being considered primarily for eMBB. Deployment scenarios for mMTC and URLLC are still under study, however, the eMBB deployment scenarios below are likely to also be applicable to mMTC and URLLC.

The following 5 deployment scenarios are being considered for eMBB: Indoor Hotspot, Dense Urban, Rural, Urban Macro and High Speed.

Indoor Hotspot: this deployment scenario focuses on small coverage per site/TRP (Transmission and Reception Point) and high user throughput or user density in buildings. The key characteristics of this deployment scenario are high capacity, high user density and consistent user experience indoor.

Dense Urban: the dense urban microcellular deployment scenario focuses on macro TRPs with or without micro TRPs and high user densities and traffic loads in city centers and dense urban areas. The key characteristics of this deployment scenario are high traffic loads, outdoor and outdoor-to-indoor coverage.

Rural: this deployment scenario focuses on larger and continuous coverage. The key characteristics of this scenario are continuous wide area coverage supporting high speed vehicles.

Urban Macro: the urban macro deployment scenario focuses on large cells and continuous coverage. The key characteristics of this scenario are continuous and ubiquitous coverage in urban areas.

High Speed: Beyond 2020, there will be a growing demand for mobile services in vehicles, trains and even aircrafts. While some services are the natural evolution of the existing ones (navigation, entertainment, etc.), some others represent completely new scenarios such as broadband communication services on commercial aircrafts (e.g., by a hub on board). The degree of mobility required will depend upon the specific use case, with speeds greater than 500 km/h.

Additionally, the urban coverage for massive connection deployment scenario has been identified specifically for mMTC use case.

Urban coverage for massive connection: The urban coverage for massive connection scenario focuses on large cells and continuous coverage to provide mMTC. The key characteristics of this scenario are continuous and ubiquitous coverage in urban areas, with very high connection density of mMTC devices. This deployment scenario is for the evaluation of the KPI of connection density.

Furthermore, the following deployment scenarios have been identified for the UR/LL use case.

Highway Scenario: The highway deployment scenario focuses on scenario of vehicles placed in highways with high speeds. The main KPIs evaluated under this scenario would be reliability/availability under high speeds/mobility (and thus frequent handover operations).

Urban Grid for Connected Car: The urban macro deployment scenario focuses on scenario of highly densely deployed vehicles placed in urban area. It could cover a scenario where freeways lead through an urban grid. The main KPI evaluated under this scenario are reliability/availability/latency in high network load and high UE density scenarios.

Examples of mMTC applications include Light Weight Devices, video Surveillance with variable data size and warehouse applications.

First Example—Light Weight Device—A very simple device, e.g., with no IMS client (5.1.2.1 of 3GPP TR 22.861), the device could be, for example, a smart electric meter. It records electricity usage, provides up to the minute usage reports that allow the customer to take advantage of time of day rating, and provides a larger, complete report to the electric company once a month. The electric company deploys a large number of these smart meters within an apartment building, one for each apartment.

Second Example—video Surveillance with variable data size—The application here is a video Surveillance with variable data size (5.1.2.2 of 3GPP TR 22.861). A video recorder is installed and activated at a street corner. The video recorder includes a camera, some on-board processing capability, as well as the ability to send information to the traffic police. The camera records continuous video, storing the content for some period of time. The device periodically sends a status update to the traffic police indicating that traffic is moving smoothly When an accident occurs at the intersection, the device begins sending high quality video to the traffic police of the accident and ensuing traffic congestion.

The network will need the flexibility to provide efficient service to the device at all times, whether a small or large amount of data is sent in a given transmission. An efficient system could minimize any negative impact to battery life for the device and minimize use of signaling resources. The same device will need to establish a connection when it needs to transmit a large amount of data (e.g., video)

Third Example—Warehouse Application (5.2.3.1 of 3GPP TR 22.861)—In this application, the coverage area is limited. Most likely the IoT devices in a given deployment are owned by same entity devices will range from very simple, limited function devices to very complex, sophisticated computing platforms. On the lower end of the device function range, not all such devices may use IMS and may not need to be equipped with an IMS client, and yet it would still be desirable to activate such a device remotely due to sensor deployment configurations.

Example of UR/LL Applications include Industrial Process Control, and Local UAV Collaboration and Connectivity.

First Example—Industrial Process Control (5.1.2.2 of 3GPP TR 22.862). Process automation requires communications for supervisory and open-loop control applications, process monitoring and tracking operations on field level inside an industrial plant. In these applications, a large number of sensors (~10,000) that are distributed over the plant forward measurement data to process controllers on a periodic or event-driven base. The use case requires support of a large number of sensor devices (10,000) per plant as well as highly reliable transport (packet loss rate <10-5). Further, power consumption is critical since most sensor devices are battery-powered with a targeted battery lifetimes of several years while providing measurement updates every few seconds. A typical process control application supports downstream and upstream flows between process controllers and sensors/actuators which consist of individual transactions. The process controller resides in the plant network. This network interconnects via base stations to the wireless (mesh-) network which hosts the sensor/actuator devices.

Typically, each transaction uses less than 100 bytes. For both controller- and sensor/actuator-initiated service flows, upstream and downstream transactions usually occur asynchronously.

FIG. 7 illustrates an industrial process control example. Sensor/activator (S/A) 704 sends a measurement report to process controller 702. Process controller 702 responds with an Acknowledgement (ACK) reply to S/A 704. Process controller 706 sends a measurement request to S/A 708. S/A 708 responds with a measurement response to process controller 706.

FIG. 8 is a diagram that illustrates a UAV Communication path.

Second Example—Local UAV Collaboration and Connectivity (5.1.2.4 of 3GPP TR 22.862)—Unmanned Aerial Vehicles (UAVs) can collaborate to act as a mobile sensor and actuator network to execute tasks in uncertain and dynamic environments while being controlled by a single user. Accuracy in sensing tasks is increased when deploying a team of UAVs versus just one as there are multiple vantage points using multiple sensors. Examples of uses for deploying a team of UAVs include: Searching for an intruder or suspect, Continual monitoring of natural disasters, Performing autonomous mapping, collaborative manipulation of an object (e.g. picking up corners of a net.) depicts how communication occurs in UAV local vehicle collaboration and connectivity. Both node to node and UAV to mobile network links are required.

Example of eMBB Applications include an Office scenario with High Data Rate Applications and an Office scenario with Higher Density of Connections.

First Example—Office scenario with High Data Rate Applications (5.1.2 of 3GPP TR 22.863)—In an office scenario with high data rate needs, users use real-time video meeting and frequently upload and download data from company's servers and they are various in size. The productivity is dependent on the efficiency of the system response time and reliability. Dependent on time of day (e.g. morning, evening, weekday vs. weekend etc.) and the location (e.g. shopping mall, downtown street), user expects multi-media traffic upload and download towards internet as well as D2D communications.

Second Example—Office scenario with Higher Density of Connections (5.2.1 of 3GPP TR 22.863)—This family covers scenarios with system requirement for the transport of high volume of data traffic per area (traffic density) or transport of data for high number of connections (connection density). One typical scenario enables users to upload and download a very high volume of data from servers, handle high resolution real-time video conferences, etc., while end-users can be under indoor or outdoor and in a densely populated area but with no high mobility needs i.e. up to 60 km/h in urban vehicular. In a hotspot scenario with high user density, depending on time of day (e.g. morning, evening, weekday vs. weekend etc.) and the location (e.g. pedestrians in shopping mall, downtown street, stadium, users in buses in dense city center), there could be high volume and high capacity multi-media traffic upload and download towards internet. Users can be either indoor or outdoor. Meanwhile when a user is indoors, it is either stationary or nomadic; however, when a user is outdoor it may travel slowly up to 60 km/h. Mobile broadband scenario is to be provided even when terminals enter areas with a high traffic density.

3GPP TR 38.913 (Study on Scenarios and Requirements for Next Generation Access Technologies) defines scenarios and requirements for next generation (5G) access technologies. The following are excerpts of the Key Performance Indicators (KPI) section of 3GPP TR 38.913 that impose new requirements that are relevant to light signaling connection topic.

7.17 Connection Density and the Need to Reduce Potential Signaling Storm

Connection density refers to total number of devices fulfilling specific QoS per unit area (per km2). QoS definition should take into account the amount of data or access request generated within a time t_gen that can be sent or received within a given time, t_sendrx, with x % probability. The target for connection density should be 1 000 000 device/km2 in urban environment.

3GPP should develop standards with means of high connection efficiency (measured as supported number of devices per TRP per unit frequency resource) to achieve the desired connection density.

7.4 Control Plane Latency

Control plane latency refers to the time to move from a battery efficient state (e.g., IDLE) to start of continuous data transfer (e.g., ACTIVE).

The target for control plane latency should be [10 ms].

7.11 UE Battery Life

UE battery life can be evaluated by the battery life of the UE without recharge. For mMTC, UE battery life in extreme coverage shall be based on the activity of mobile originated data transfer consisting of [200 bytes] UL per day followed by [20 bytes] DL from MCL of [tbd] dB, assuming a stored energy capacity of [5 Wh].

The target for UE battery life should be [10 years].

7.19 Network Energy Efficiency

The capability is to minimize the RAN energy consumption while providing a much better area traffic capacity.

Qualitative KPI as baseline and quantitative KPI is FFS.

7.1 Peak Data Rate

Peak data rate is the highest theoretical data rate which is the received data bits assuming error-free conditions assignable to a single mobile station, when all assignable radio resources for the corresponding link direction are utilized (i.e., excluding radio resources that are used for physical layer synchronization, reference signals or pilots, guard bands and guard times).

The target for peak data rate should be [20 Gbps] for downlink and [10 Gbps] for uplink.

5G Requirements Versus the Current State of Art—Current design for LTE (Rel-12) is not efficient in term of transition to RRC-CONNECTED state so a small amount of data can be transmitted or in terms of scalability to support a large number of devices that generate frequent small volume of data. For frequent small burst transmission, the device wakes up and sends data every few minutes. For the normal procedure, UE may need to follow the RACH procedure and subsequently establish signaling radio bearers (through RRC connection establishment procedure) and data radio bearers (through RRC Connection reconfiguration procedure). As illustrated in the overall legacy procedure in FIG. 9 the signaling overhead is substantial when considering only a small amount of data is transmitted in the uplink. This is situation is expected to be worst in light of 5G system diverse use cases and traffic profiles.

One key issue identified in the Rel-13 study item as captured in the 3GPP TR 23.720 is the support of infrequent small data transmission for Cellular IoT. This key issue aims to provide solution to support highly efficient handling of infrequent small data transmissions for ultra-low complexity, power constrained, and low data-rate 'Internet of Things' devices, called CIoT devices. In 5G systems, it is expected that the number of such devices will increase exponentially but the data size per device and per data transmission event will remain small. Infrequent small data traffic characteristics for MTC applications (as described in Annex E of 3GPP TR 45.820) may lead to inefficient use of resources in the 3GPP system.

Another key issue identified in 3GPP TR 23.720 is to provide efficient support of tracking devices using small data transmission for Cellular IoT. This key issue aims to provide solution to support highly efficient handling of tracking devices using small data transmissions for ultra-low complexity, power constrained, and low data-rate 'Internet of Things' devices, called CIoT devices. It should be noted that excessive signaling will also leads to additional latency and additional power consumption.

Rel-13 LTE has specified two solutions to further reduce signaling overhead for small data transmissions. One solution (Solution 2 in 3GPP TR 23.720), called the control plane (CP) solution, transfers user data between the UE and the core network as a NAS Protocol Data Unit (PDU). The second solution (Solution 18 in 3GPP TR 23.720) allows an RRC Connection to be suspended and at a later time resumed; minimizing the need to go through the full signaling procedure for IDLE to CONNECTED state transition. The solution is applicable both to normal LTE UEs and IOT UEs and is based on enhancements to the IDLE state to make it possible to resume the RRC connection avoiding the need to setup it up again when the UE returns from IDLE, assuming that most of the times the UE returns in a node which has the stored RRC context. The procedure is illustrated in FIG. 10 and FIG. 11.

The Release 13 solutions are still suboptimal with many drawbacks:

After RRC connection is suspended,
  The UE transitioned to NAS EMC-IDLE state and therefore no longer has NAS signaling connection. S1 connection is also released. This means signaling overhead both over the air, between the radio access network (RAN) and the core network (CN) as well as within the CN (e.g. between MME and SGW and between SGW and PGW) at the resumption of the RRC connection.
  The UE also transitioned to RRC-IDLE state and the execution of a full random access procedure is assumed before the RRC connection is resumed. There is still a need to be exchange of RRC Connection Resume/RRC Connection Resume Complete messages with the eNB in order to resume RRC connection.
  Only partial access stratum (AS) context is stored which will cause additional signaling overhead to reconfigure the UE after RRC is resumed.
  The storage of the AS context in eNB and the storage of non-access stratum context in the core network (MME, SGW and PGW) implies increase storage capacity on both the radio access network and the core network. With an expected density of a million mMTC devices per kilometer square, it is expected that the number of devices in suspended RRC-CONNECTED state per core network node (e.g. MME) and per cell could be quite large in 5G system when compare to the existing LTE system, even if one assume a dense deployment of cells and core network nodes as there is a non-negligible capex and opex deployment cost for the operators. A solution that mainly rely on context storage of large number of devices in the network might not be cost efficient in the context of 5G system
  Support for mobility is limited i.e. UE context retrieval is possible only in case X2 interface between source eNB and target eNB is available. If no X2 interface is available, then Signaling Radio Bearers (SRBs) and Data Radio Bearers (DRBs) must be reestablished using the legacy procedure. Furthermore, the contexts stored in the source eNB and even in the core network nodes will have to be cleared through some proprietary implementation means.
  For the first access or anytime the UE has no stored context, it is assumes the legacy RRC Connection establishment procedures (request/response) is used. It should also be noted that the legacy RRC connection establishment procedure is uni-cast transmission based procedure. All of these lead to scalability issue in the context of massive mMTC deployment scenarios anticipated for 5G systems.
  The solution does not allow efficient control of UE state transition by the RAN (e.g. eNB), and does not take into account traffic mix and UE mobility due to UE tracking based on NAS tracking area (TA) and UE paging based on NAS DRX configuration. The solution suffers the same limitations as the existing approaches in the prior 3GPP releases where the control of UE state transition between idle mode and connected mode is based on the use of inactivity timer in the eNB. In this approach, the eNB monitor through proprietary methods, traffic activity. When there is no traffic activity according to proprietary configuration and threshold settings for traffic activity detection, the eNB request the core network, specifically the eNB to release the S1 signaling connection. The eNB also releases the RRC signaling connection. NAS signaling connection is also released by the MME and the UE. The effectiveness of this approach depends on the ability of the eNB to cleverly configure traffic activity detection, and set the inactivity timer to the right value taking into account various factors such as the traffic type, the UE mobility level, the targeted user experience level, etc. Furthermore, in an ideal solution, the inactivity timer value should be adjusted dynamically. It has been observed in LTE networks that inactivity timers are typically configured to be quite short (down to 10-20 seconds) which leads to a high amount of transitions from RRC_IDLE to RRC_CONNECTED. This state transition is quite costly in terms of signaling considering that the majority of the RRC connections in LTE transfer less than 1 Kbyte of data to then move back to RRC_IDLE. Similarly, non-optimal configuration of Rel-13 NB-IOT solutions will limit the applicability of these solutions, and even the limited anticipated signaling overhead reduction with the use of this solution might not be realized.

The next generation systems are expected to support a wide range of use cases with varying requirements ranging from fully mobile devices to stationary IOT or fixed wireless broadband devices. The traffic pattern associated with many use cases is expected to consist of short or long bursts of data traffic with varying length of waiting period in between.

The drawbacks of Rel-13 NB-IOT solutions listed above highlight the need for further enhancements to the handling of small and infrequent data transmission, and not just for stationary NB-IoT/mMTC devices but also for all UEs that are mobile. More specifically:

1. The current signaling overhead for small and infrequent data transmissions is still too prohibitive and needs to be reduced further in order to meet 5G requirements of signaling storm reduction and spectrum efficiency by 3 times over IMT-Advanced.

2. Increased storage of AS and NAS context in the network implies increased network Capex and Opex which negatively impacts the requirement to minimize 5G network deployment and operational costs.
3. Excessive signaling also leads to additional latency. The current RRC connection setup latency (i.e. 120 ms for mobile originated calls and 280 ms for mobile terminated calls, see RP-160301) still need to be further reduced to improve the end user experience and meet 5G requirement on control plane latency which could be 10 ms or less for some of the use cases (e.g. Ultra Reliable and Low latency applications).
4. Excessive signaling also leads to additional UE power consumption and additional network energy consumption and will negatively impact the ability of the system to meet the UE Battery Life requirements of 10 years defined in section 7.11 of 3GPP TR 38.913 and the Network Energy Efficiency requirements defined in section 7.19 of 3GPP TR 38.913.

New proposals for enhancement to small data transmission handling, aimed specifically at further reducing signaling overhead and addressed the above identified drawbacks of the Rel-13 NB-IOT solutions are emerging. A new study item on signaling reduction to enable light connection for LTE has just been approved. Various high level solution ideas are already being proposed in the context of 5G discussion for e.g. in 3GPP System Aspects Working Group 2 (SA WG2 or simply SA2). High level ideas that are being proposed for further explorations include:

Further reduce NAS signaling and signaling to CN over S1 interface due to mobility and idle/active transition by further developing the following ideas:
Re-use the Rel-13 suspend/resume solution with UE context stored while the UE is in RRC_IDLE or create a new UE-controlled mobility based RRC-CONNECTED state but hide such suspend/resume state or any such new intermediary state from the core network.
RAN originated paging message
Use Anchor/Gateway function in RAN to allow context fetch upon cell reselection and data reforwarding Further enhancements to allow RAN to choose optimum parameters such as flexibility for RAN to control UE specific tracking area that could be different than core network based tracking area.

Further enhancements to allow RAN to choose optimum parameters such as flexibility for RAN to adjust DRX parameters applicable in lightly connected state (e.g. UE controlled mobility connected state) for example allows RAN to optimize DRX taking into account UE's current data QoS Requirements.

Referring now to FIG. 12, a high level illustration of the Network Slicing concept is shown. A network slice is composed of a collection of logical network functions that supports the communication service requirements of one or more use cases. It might be possible to direct terminals to selected slices in a way that fulfil operator or user needs, e.g., based on subscription or terminal type. The network slicing primarily targets a partition of the core network, but it is not excluded that Radio Access Network (RAN) may need specific functionality to support multiple slices or even partitioning of resources for different network slices (3GPP TR 22.891).

Turning now to potential network slicing service requirements defined in 3GPP TR 22.891:
The 3GPP System shall allow the operator to compose network slices, i.e. independent sets of network functions (e.g. potentially from different vendors) and parameter configurations, e.g. for hosting multiple enterprises or Mobile virtual network operators (MVNOs) etc.
The operator shall be able to dynamically create network slice to form a complete, autonomous and fully operational network customized to cater for different diverse market scenarios.
The 3GPP System shall be able to identify certain terminals and subscribers to be associated with a particular network slice.
The 3GPP System shall be able to enable a UE to obtain service from a specific network slice e.g. based on subscription or terminal type.

Turning now to potential Network Slicing Operational Requirements defined in 3GPP TR 22.891:
The operator shall be able to create and manage network slices that fulfil required criteria for different market scenarios.
The operator shall be able to operate different network slices in parallel with isolation that e.g. prevents data communication in one slice to negatively impact services in other slices.
The 3GPP System shall have the capability to conform to service-specific security assurance requirements in a single network slice, rather than the whole network.
The 3GPP System shall have the capability to provide a level of isolation between network slices which confines a potential cyber-attack to a single network slice.
The operator shall be able to authorize third parties to create, manage a network slice configuration (e.g. scale slices) via suitable Application Program Interfaces (APIs), within the limits set by the network operator.
The 3GPP system shall support elasticity of network slice in term of capacity with no impact on the services of this slice or other slices.
The 3GPP system shall be able to change the slices with minimal impact on the ongoing subscriber's services served by other slices, i.e. new network slice addition, removal of existing network slice, or update of network slice functions or configuration.
The 3GPP System shall be able to support End to End (E2E), e.g. RAN, Core Network (CN), resource management for a network slice.

As described above, in the current 3GPP system, the E-UTRAN repeatedly broadcasts the System Information that is needed by the UEs to be able to access and operate within the network. UEs in RRC_IDLE and RRC_CONNECTED modes apply the System Information Acquisition procedure to obtain the required System Information (e.g., MIB, SIB1, SIB2-SIB8). It is recognized herein that this approach, where the full set of System Information is repeatedly broadcast by all cells and acquired by all UEs, lacks efficiencies.

SUMMARY

As described above, it is recognized herein that current approaches to broadcasting System Information (SI) lack efficiencies that might be needed to meet the requirements proposed for 5G systems. Efficient SI provisioning mechanisms and procedures are described herein that increase efficiencies, for example, by reducing SI acquisition latency, increasing radio resource utilization efficiency, reducing eNB/UE power consumption, and supporting flexible network slicing.

System information can include a basic set of system information and additional system information. A UE can receive the basic set of system information and then later request or receive the additional system information.

Messages can use tags which can be used to look up locally stored system information. If a tag does not correspond to any locally stored system information, the system information and an associated tag can then be requested.

Messages can be indicative of a cluster identity associated with cells. When the UE goes into a new cell, the cluster identity can be checked to see if system information from a prior call can be reused.

In an example embodiment, an apparatus comprising a processor, a memory, and communication circuitry. The apparatus can be connected to a network via its communication circuitry. The apparatus can further comprising computer-executable instructions stored in the memory of the apparatus which, when executed by the processor of the apparatus, cause the apparatus to perform operations.

Mechanisms for efficient SIB provisioning in common areas for 5G systems can include:
1. A Common Area can consists of a set of cells, where some of the Information Elements (IEs) broadcasted/multicasted/unicasted as the SI by each cell may be common.
2. A cluster-Identity IE can be used to indicate to which cluster a cell belongs.
3. A commonInfo IE can be used to indicate if a SIB is "cell specific" or "common" to the cluster.
4. An enhanced System Information Acquisition procedure can be used to acquire cell-specific SIBs following cell reselection.
5. A System Information Request message can be used to request one or more SIBs.
6. A SysInfoReqAllowed IE can be used to indicate System Information Request messages are allowed in the cell.

A new light-weight connection signaling procedure can use preconfigured Signaling Radio Bearer (SRB) and Data Radio Bearer (DRB) configuration parameter sets.

A non-backward compatible index-based combined SRB/DRB establishment procedure targeted to 5G and other forward looking systems is disclosed. An index, such as an N-bit cfgIndex, can be signaled to/from the UE, access nodes such as Evolved Node B (eNB), and Core Network (CN) nodes, and used to "lookup" the corresponding set of configuration parameters needed to establish a light-weight connection.

A Light-Weight (LW) Connection Establishment procedure disclosed herein describes the UE/eNB behavior and signaling required to establish a light-weight connection, including the definition of a novel set of messages and Information Elements (IEs) signaled during procedure; e.g. LW-ConnectionRequest, LW-ConnectionSetup and LW-ConnectionSetupComplete messages.

A backward-compatible index-based AS configuration procedure can be used for LTE-based systems. Mechanisms to signal a cfgIndex or cfgIndex list that can be used to "lookup" the set of configuration parameters used to setup the necessary RBs and to optionally modify the Medium Access Control (MAC) main configuration, the Semi-Persistent Scheduling (SPS) configuration and/or the dedicated Physical Layer (PHY) configuration.

Extensions to existing IEs and messages can facilitate the establishment of a light-weight connection; e.g. an Extended Establishment Cause IE, an Extended RadioResourceConfigDedicated IE, an Extended RRCConnectionSetup message, an Extended RRCConnectionResumeComplete message.

Triggers can be used to establish a light-weight connection and to switch between light-weight and legacy connections. Such a triggering mechanism can be controlled by higher layers and may be based on the data packet size, traffic profile, etc.

Mechanisms to switch between light-weight and legacy connections can use an enhanced RRC Connection Reconfiguration procedure; e.g. the Extended RadioResourceConfigDedicated IE, to switch between light-weight and legacy connections. An enhanced RRC Connection Resume procedure can allow the UE to switch between light-weight and legacy connections when the connection is resumed.

For example, the apparatus can receiving a request, from a user equipment (UE), for one or more system information elements. The request can include a first system information value tag. The apparatus can comparing the first system information value tag to a second system information tag. If the first system information value tag matches the second system information value tag, the apparatus can sending, to the UE, the one or more system elements and a confirmation that the first system information value tag matches the second system information value tag. If the first system information value tag does not match the second system information value tag, the apparatus can send, to the UE, the one or more system elements and the second system information value tag.

In accordance with another embodiment, normal or reduced SI broadcasts can be triggered based time or activity levels within a cell. For example, an activity index can be determined, and the activity index can be compared to various thresholds. The SI broadcast level can be modified based on the comparison.

The provisioning of system information blocks can be made more efficient by using the concept of clusters. Cells in a cluster can have shared system information blocks. When moving to a new cell region, the UE need only request system information blocks from the new cell that are not common to the cluster.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

DETAILED DESCRIPTION OF ILLUSTRATIVE EMBODIMENTS

Figure 1:
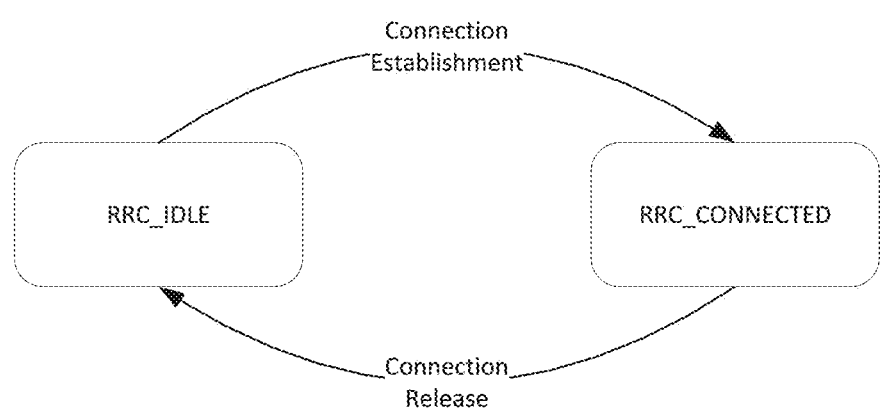
FIG. 1 shows Radio Resource Control (RRC) Protocol States for Long Term Evolution (LTE).
Figure 2:
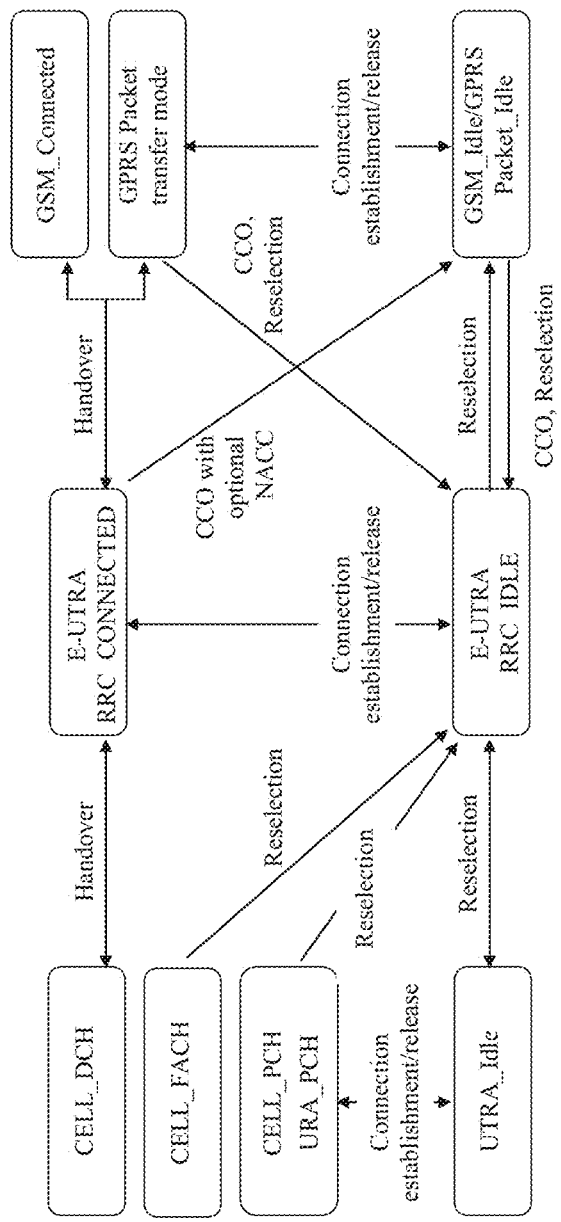
FIG. 2 provides an overview of the RRC states in Evolved Universal Terrestrial Radio Access (E-UTRA)
Figure 3:
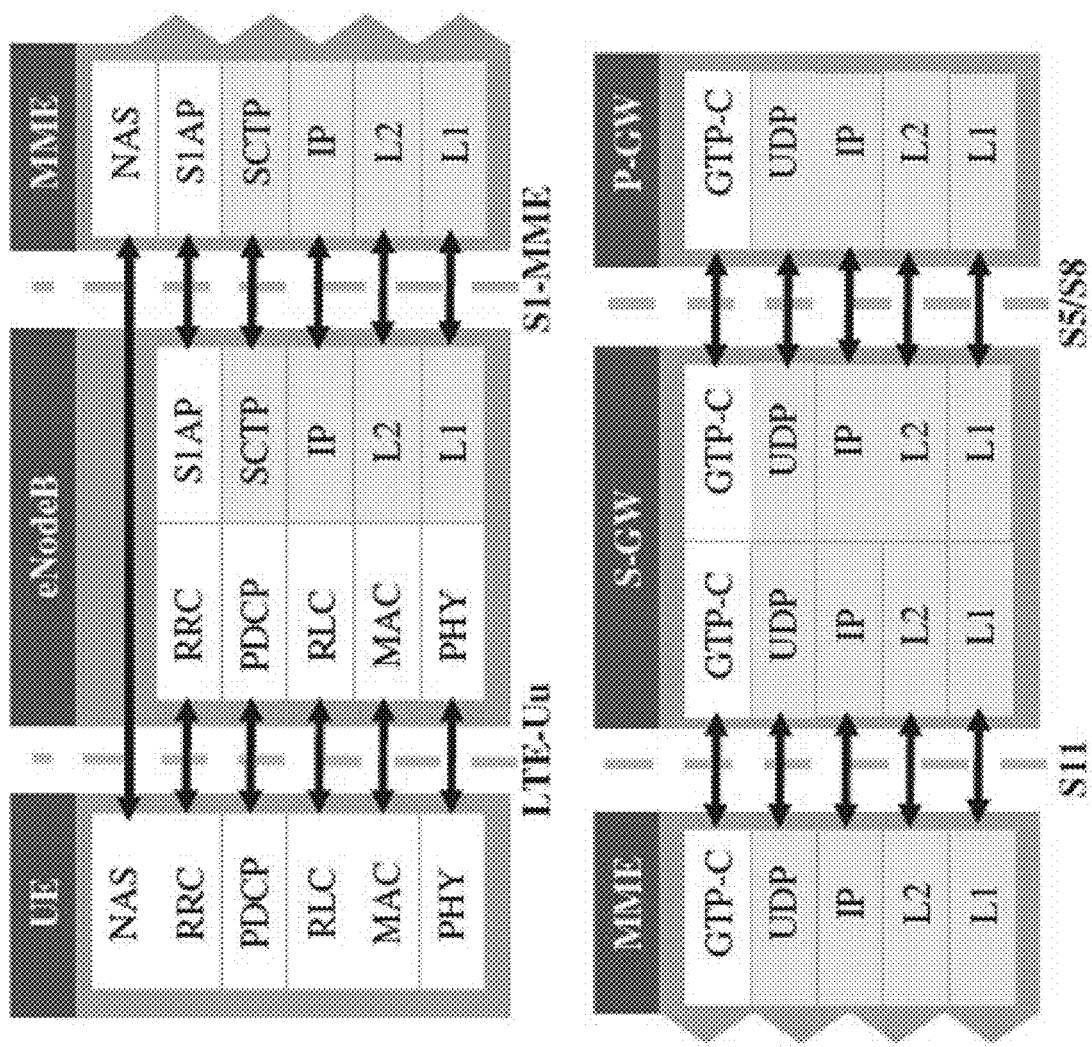
FIG. 3 shows an Evolved Packet System Control Plane Protocol stack.
Figure 4:
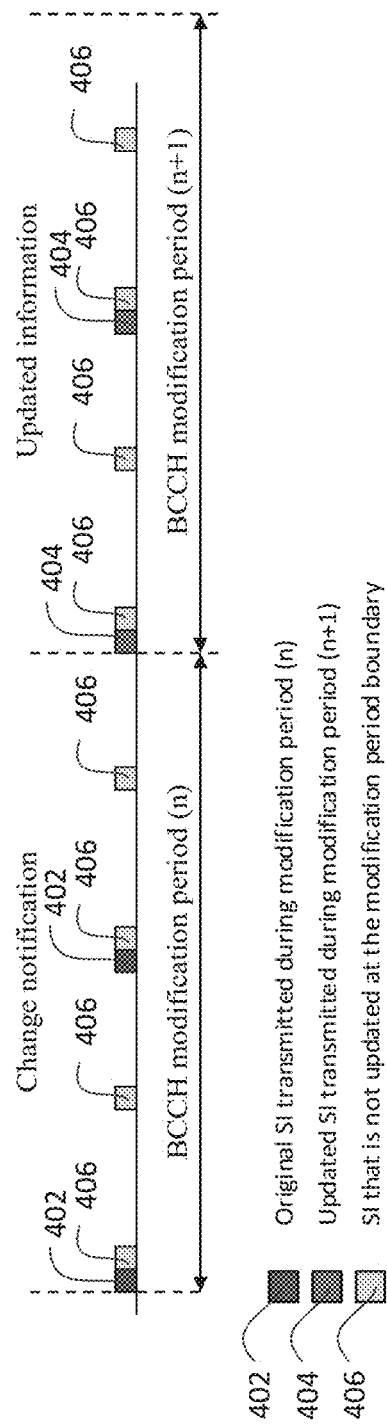
FIG. 4 is a diagram that illustrates a change of system information from 3GPP TS 36.331.
Figure 5:
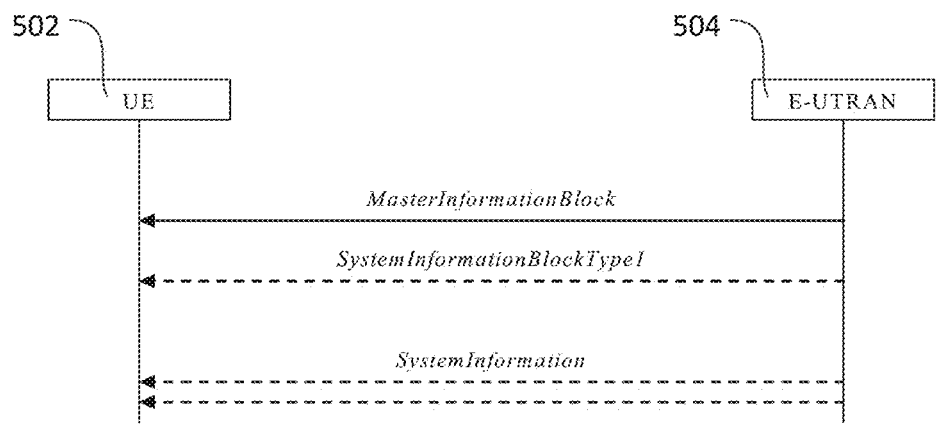
FIG. 5 is a diagram that illustrates a system information acquisition procedure from 3GPP TS 36.331.
Figure 6:
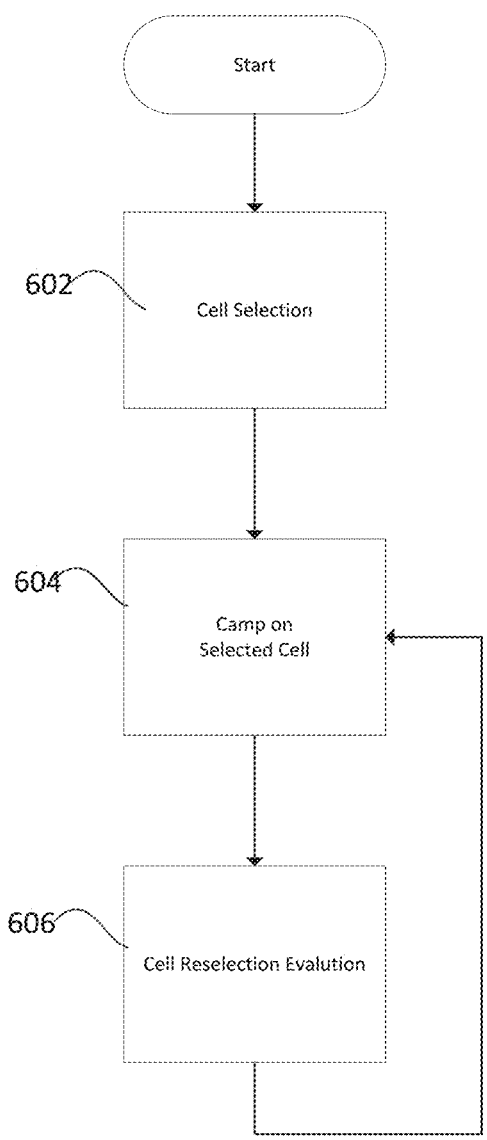
FIG. 6 is high level flow chart illustrating the cell selection and reselection processing performed by the UE in RRC_IDLE.
Figure 7:
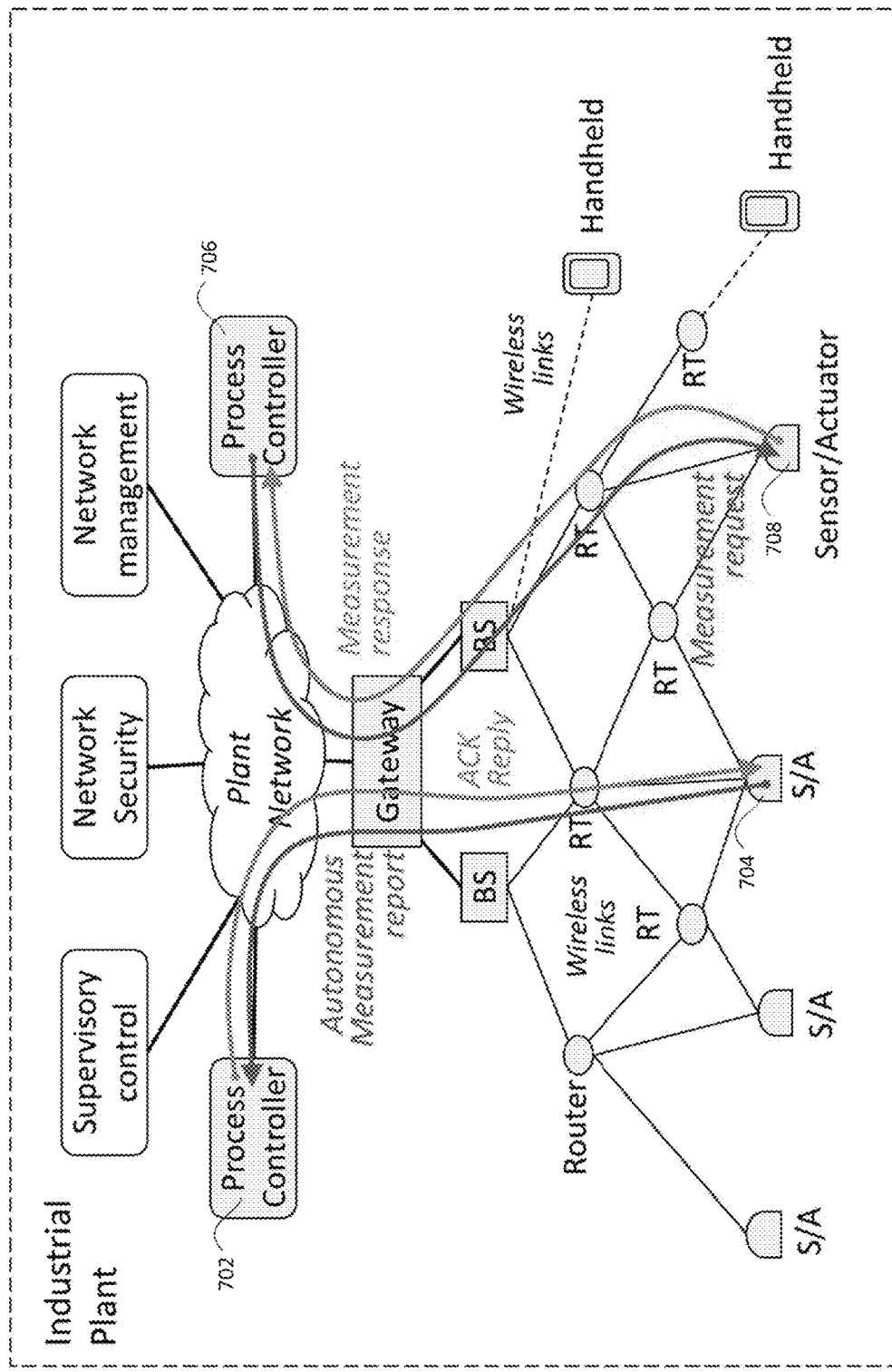
FIG. 7 illustrates an industrial process control example.
Figure 8:
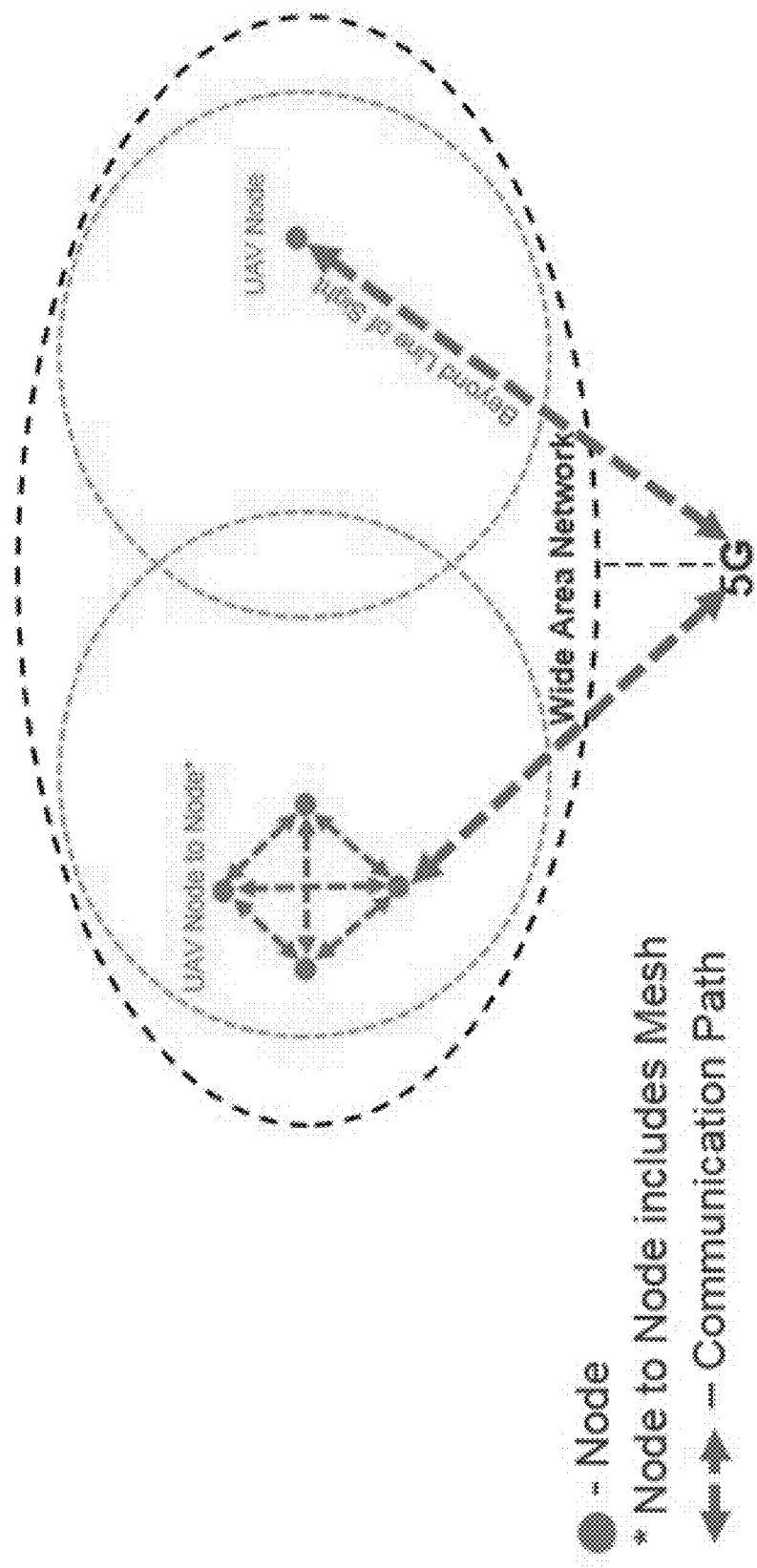
FIG. 8 is a diagram that illustrates a UAV Communication path.
Figure 9:
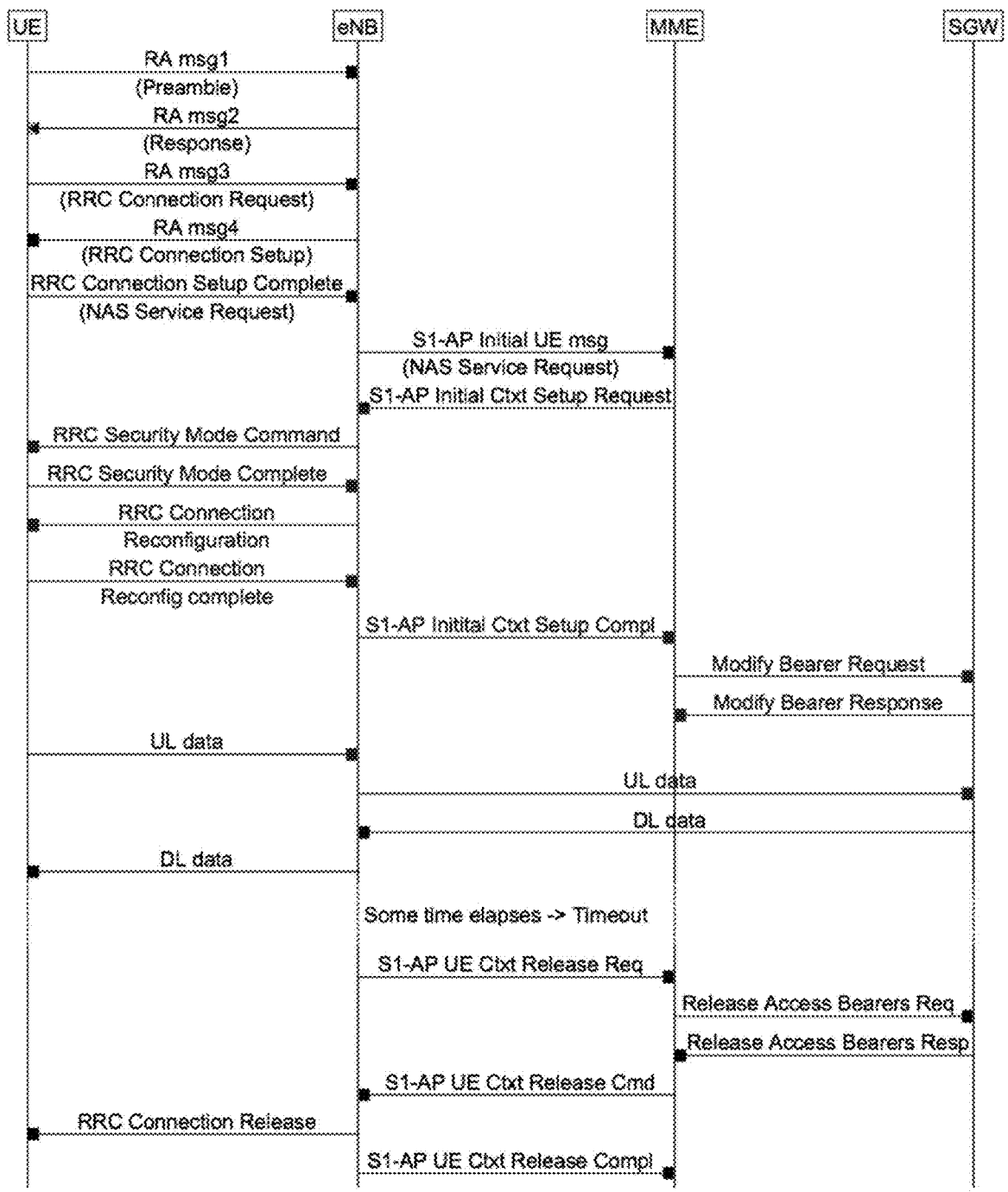
FIG. 9 is a diagram that illustrates Legacy SI Provisioning
Figure 10:
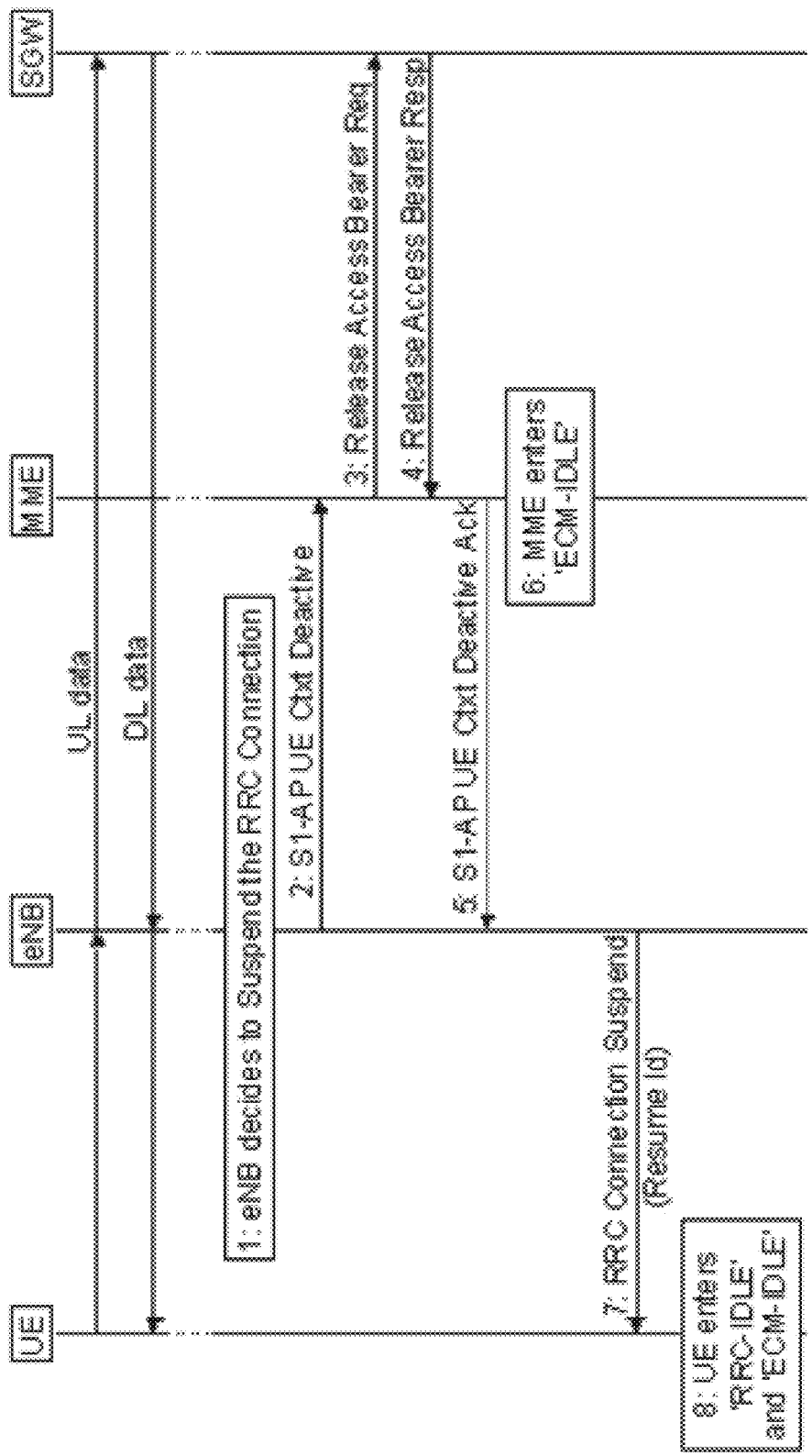
FIG. 10 is a diagram that illustrates example issues with Legacy SI Provisioning.
Figure 11:
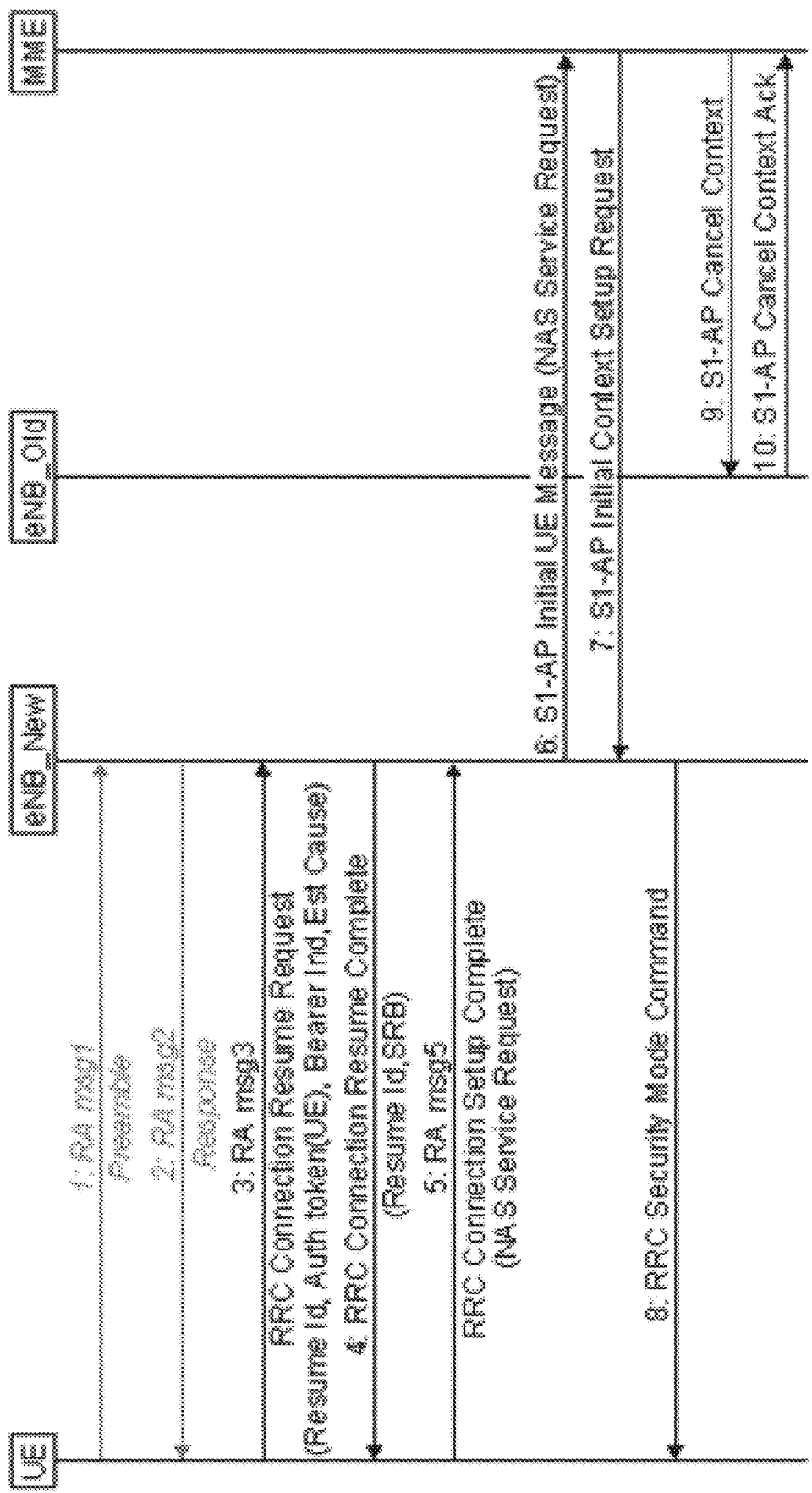
FIG. 11 is a flow chart that depicts methods for SI provisioning in accordance with various example embodiments.
Figure 12:
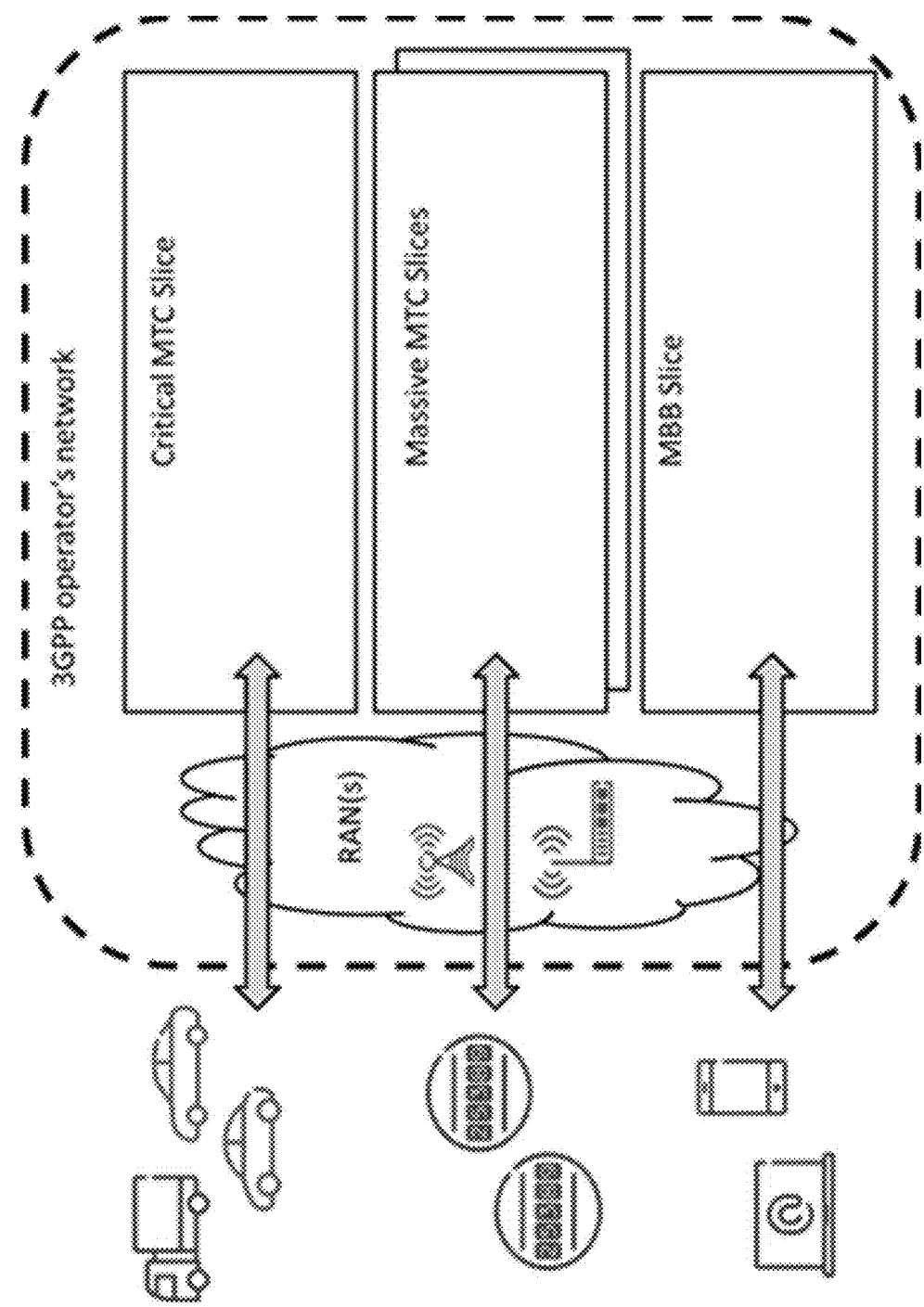
FIG. 12 is a diagram that illustrates a high level illustration of the Network Slicing concept.
Figure 13:
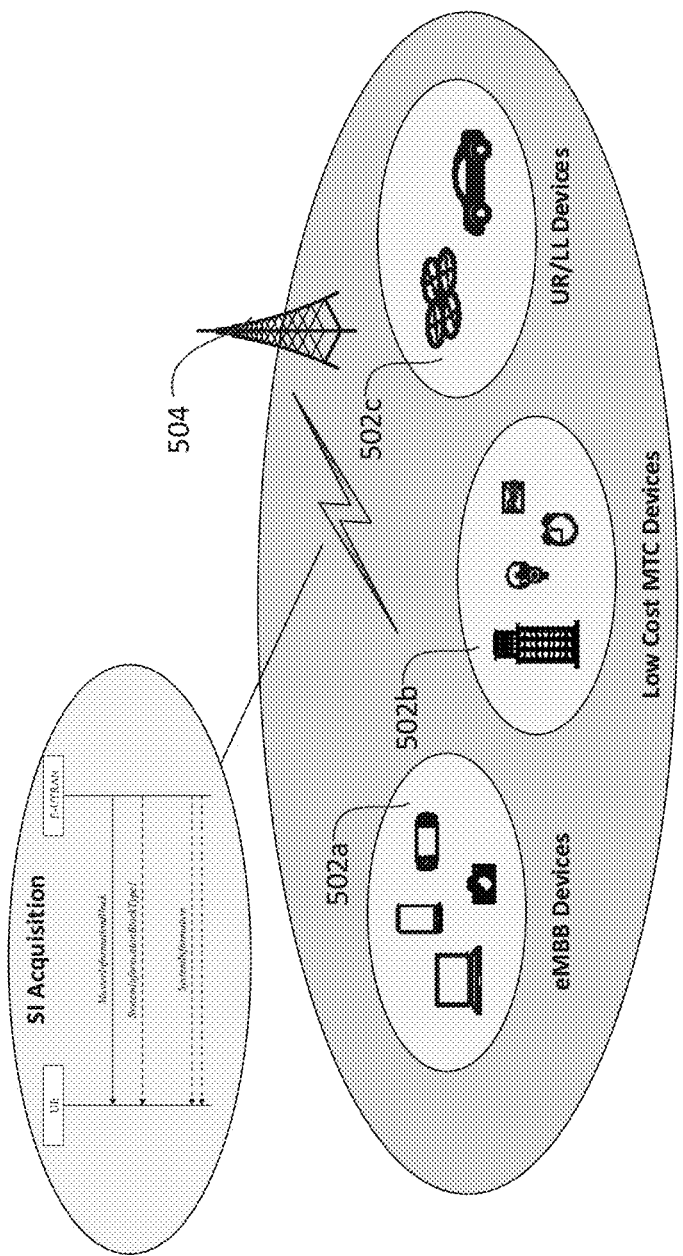
FIG. 13 is a diagram that illustrates a legacy procedure for SRB and DRB setup.
Figure 14:
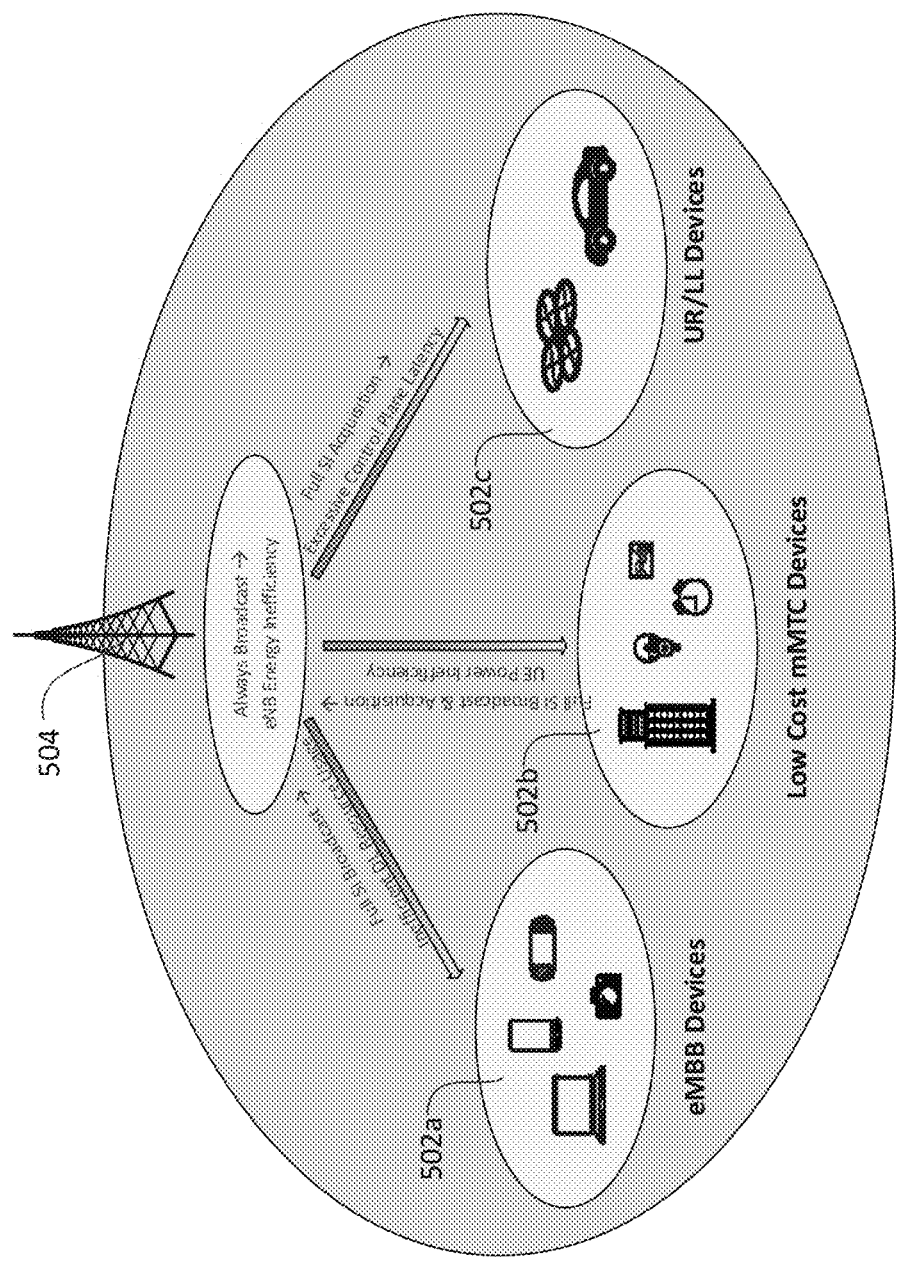
FIG. 14 is a diagram that illustrates suspension of a RRC Connection.

Acronyms
API Application Program Interface
AS Access Stratum
ASME Access Security Management Entity
BCCH Broadcast Control Channel
BCH Broadcast Channel
BL Bandwidth reduced Low complexity
BT-RS Beam formed Training Reference Signal
CCO Cell Change Order
CE Control Element
CMAS Commercial Mobile Alert System
CN Core Network
CoMP Coordinated Multi Point
CP Cyclic Prefix
CQI Channel Quality Indication
C-RNTI Cell Radio-Network Temporary Identifier
CS Circuit Switched
CSI Channel State Information
CSI-RS Channel State Information Reference Signals
CSG Closed Subscriber Group
DCI Downlink Control Information
DCH Dedicated Channel
DL Downlink
DL-SCH Downlink Shared Channel
DM-RS Demodulation Reference Signals
DRX Discontinuous Reception
DRB Data Radio Bearer
E2E End to End
EAB Extended Access Barring eCell Extended Cell
eDRX Extended Discontinuous Reception
eMBB enhanced Mobile Broadband
EMM EPS Mobility Management
eNB evolved Node B
EPC Evolved Packet Core
EPS Evolved Packet System
ESM EPS Session Management
ETWS Earthquake and Tsunami Warning System
E-UTRA Evolved Universal Terrestrial Radio Access
E-UTRAN Evolved Universal Terrestrial Radio Access Network
FACH Forward Access Channel
FD Full-Dimension
FFS For Further Study
GERAN GSM EDGE Radio Access Network
GPRS General Packet Radio Service
GSM Global System for Mobile communications
GUTI Globally Unique Temporary UE Identity
HARQ Hybrid Automatic Repeat Request
HD High Definition
ID Identification
IE Information element
IMS International Mobile Subscriber Identity
IMSI International Mobile Subscriber Identity
IMT International Mobile Telecommunications
IP Internet Protocol
KPI Key Performance Indicators
LC-MTC Low Cost or Low Complexity Machine-Type Communications
LTE Long term Evolution
MAC Medium Access Control
MBB Mobile Broadband
MBSFN Multicast-Broadcast Single-Frequency Network
MCL Maximum Coupling Loss
MIB Master Information Block
MIMO Multiple-Input and Multiple-Output
MTC Machine-Type Communications
MME Mobile Management Entity
mMTCmassive Machine Type Communication
MVNO Mobile Virtual Network Operator
NACC Network Assisted Cell Change
NAS Non-access Stratum
NB Narrow Beam
NGMN Next Generation Mobile Networks
NR New Radio
NR-Node New Radio-Node
NW NetWork
OFDM Orthogonal Frequency Division Multiplexing
PCH Paging Channel
PDCP Packet Data Convergence Protocol
PDN Packet Data Network
PDCCH Physical Downlink Control Channel
PDSCH Physical Downlink Shared Channel
PLMN Public Land Mobile Network
P-GW PDN Gateway
PHY Physical Layer
PRACH Physical Random Access Channel
PRB Physical Resource Block
QoS Quality of Service
RAN Radio Access Network
RAT Radio Access Technology
RB Resource Block
RE Resource Element
RLC Radio Link Control
RNTI Radio Network Temporary Identifier
RRC Radio Resource Control
RRH Remote Radio Head
RS Reference Signal
RSSI Received Signal Strength Indicator
RSRP Reference Signal Received Power
RSRQ Reference Signal Received Quality
SFN System Frame Number
S-GW Serving Gateway
SI System Information
SIB System Information Block
SIBe SIB Essential
SIPF SI Provisioning Function
SI-RNTI System Information RNTI
SMARTER Feasibility Study on New Services and Markets Technology
SPS Semi-Persistent Scheduling
SR Scheduling Request
SRB Signaling Radio Bearer
SRS Sounding Reference Signal
TAU Tracking Area Update
TBS Transport Block Size
TDD Time Division Duplex
TMSI Temporary Mobile Station Identity
TRP Transmission and Reception Point
UE User Equipment
UHD Ultra high definition
UL Uplink
URA UTRAN Registration Area
UR/LL Ultra Reliable—Low Latency
URLLC Ultra-Reliable and Low Latency Communications
UTRAN Universal Terrestrial Radio Access Network
WLANWireless Local Area Network FIG. 13 is a diagram that illustrates Legacy System Information (SI) Provisioning. Referring to FIG. 13 and FIG. 14, in the current 3GPP system, the E-UTRAN 504 repeatedly broadcasts the System Information that is needed by the UEs to be able to access and operate within the network. UEs in RRC_IDLE and RRC_CONNECTED modes apply the System Information Acquisition procedure to obtain the required System Information (e.g., MIB, SIB1, SIB2-SIB8, etc.). UE 502 can be, for example, an eMBB device 502a, a low cost MTC device 502b, or a UR/LL device 502c.

It is recognized herein that currents approaches, where the full set of System Information is repeatedly broadcast by all cells and acquired by all UEs, needs to be enhanced in order to meet the requirements proposed for 5G system. More specifically, it is recognized herein that the current SI provisioning mechanism in 3GPP, where the UE has to acquire the full set of SI broadcast by the eNB before establishing a connection, introduces latency that exceeds the Control Plane Latency requirement of 10 ms defined in section 7.4 of 3GPP TR 38.913. In a typical network configuration, it can take up to 160 ms to acquire SIB1 and SIB2, and up to 640 ms to acquire the full set of required SIBs (e.g., SIB1-SIB8). Furthermore, it is recognized herein that the current SI provisioning mechanism in 3GPP, where the UE has to acquire the full set of SI broadcast by the eNB although only a small subset of SI changes, increases UE power consumption and will negatively impact the ability of the UE to meet the UE Battery Life requirements of 10 years defined in section 7.11 of TR 38.913. Also, it is recognized herein that he current SI provisioning mechanism in 3GPP, where the full set of SI is broadcast whether or not there are UEs within the coverage area of the cell and regardless of if there is update of SIB or not, increases eNB power consumption and will negatively impact the ability of the eNB to meet the Network Energy Efficiency requirements defined in section 7.19 of 3GPP TR 38.913. For example, in the later evening and early morning, cells covering enterprises, urban hot spots, etc. tend to have fewer UEs in the coverage area. There is also a dependency on the day of the week (e.g., typically less activity on weekends). How often the SIBs change can be deployment specific. In some scenarios, the information contained in the SIBs is relatively static and may remain the same for hours or even days. It is further recognized herein that the current SI provisioning mechanism in 3GPP, where the SI is broadcast in a cell-centric manner without differentiation among different UEs, services and Use Cases, does not support network slicing requirements defined in section 5.2 of 3GPP TR 22.891. This can result in the UE acquiring SIBs that might not be needed to access and operate within a given network slice.

It is recognized herein that questions remain to be addressed. For example, it has not been addressed whether all "cells"/TRPs periodically broadcast the minimum; whether the minimum SIs is broadcasted periodically in every cell on which a UE can camp; whether there are cells in the system where the UE cannot camp; or whether the UE should be allowed to camp on a cell that doesn't broadcast the minimum SIs. These questions are addressed below.

Therefore, in order to meet the requirements of the 5G systems that are being proposed, efficient SI provisioning mechanism and procedures that dramatically reduce SI acquisition latency, increase radio resource utilization efficiency, reduce eNB/UE power consumption and support flexible network slicing need to be developed.

In this section, solutions for reduced SI broadcast and on-demand SI provisioning are described.

In an example embodiment, SI is provisioned on-demand. With the expected change of network architecture in the future cellular system, define herein is a new concept called eCell (extended cell) for more efficient SI provisioning as compared to previous approaches. An eCell can be one or a combination of several following entities in the future cellular system. For example, an eCell can be a slice of the network or RAN system that is configured for the UE, if RAN slicing based architecture is used. In some cases, the slicing of network or RAN system can be done on a per user case base or using other criteria. The eCell can be an umbrella cell that covers one or several cells. The eCell can be a Multicast-Broadcast Single-Frequency Network (MBSFN) coverage area that covers one or several cells. The eCell can include cluster of coordinated cells (e.g., CoMP cells) for a UE. In yet another example, the eCell can be a cell as currently defined in the 3GPP standards.

For the convenience of illustration, the term "eCell" is used throughout the document, though it will be understood that an eCell can be one of the above-described entities or a combination thereof. Each eCell can have its own unique ID, which is referred to as an eCellIdentity (eCell ID). In an example, the eCellIdentity is carried by extending the current SIB1, though it will be understood that the implementation of signaling eCellIdentity in the 5G system is not limited to this example below in accordance with various embodiments.

Example SystemInformationBlockType1 Message

```
-- ASN1START
SystemInformationBlockType1 ::=      SEQUENCE {
    cellAccessRelatedInfo                SEQUENCE {
        plmn-IdentityList                    PLMN-IdentityList,
        trackingAreaCode                     TrackingAreaCode,
        cellIdentity                         CellIdentity,
        cellBarred                           ENUMERATED {barred, notBarred},
        intraFreqReselection                 ENUMERATED {allowed, notAllowed},
        csg-Indication                       BOOLEAN,
        csg-Identity                         CSG-Identity,
        OPTIONAL -- Need OR
        eCellIdentity                        Extended CellIdentity
    },
    cellSelectionInfo                    SEQUENCE {
        q-RxLevMin                           Q-RxLevMin,
    q-RxLevMinOffset                     INTEGER (1..8)    OPTIONAL
    -- Need OP
    },
    p-Max                                P-Max
        OPTIONAL, -- Need OP
    freqBandIndicator                    FreqBandIndicator,
    schedulingInfoList                   SchedulingInfoList,
    tdd-Config                             TDD-Config
        OPTIONAL, -- Cond TDD
    si-WindowLength                      ENUMERATED {
                                            ms1, ms2, ms5, ms10, ms15, ms20, ms40},
    systemInfoValueTag                   INTEGER (0..31),
    nonCriticalExtension                 SystemInformationBlockType1-v890-IEs
    OPTIONAL
}
...
-- ASN1STOP
```

An extended SI value tag is now described in accordance with an example embodiment. Similar to the SI or SIBs in the current 3GPP system, it is recognized herein that the SI elements in the future cellular system are important system information that a UE might need to acquire before it can fully access the network or services/functionalities provided by the network. Defined herein is an extended value tag for system information, called eSystemInfoValueTag, as an index corresponding to a system information configuration parameter set of a particular eCell.

In an example embodiment, in SI provisioning, each eSystemInfoValueTag value corresponds to a different SI configuration parameter set of eCell identified by a eCellIdentity (eCell ID). The SI elements in the SI configuration parameter set can exclude dynamic parameters such as, for example, timer or system load that change with system time. The length of eSystemInfoValueTag can be N bits, which can index up to $2^N$ SI configuration parameter sets. For eCells (or cells belonging to eCells) in which a UE frequently visited/stayed, the eSystemInfoValueTag values and corresponding SI configuration parameter sets of those eCells/cells can be configured (pre-loaded) at the UE through a graphical User Interface (GUI) so that the on-demand SI provisioning can be implemented more efficiently.

In an example, the eSystemInfoValueTag is carried by extending the current SIB1 as an example to illustrate one solution, though it will be understood that the implementation of signaling eSystemInfoValueTag in the 5G system is not limited to this example below in accordance with various embodiments.

Example SystemInformationBlockType1 Message

Turning now to SI in a future cellular system, for the purpose of illustration, it is assumed that system information is divided into MIB and a number of SIBs in a similar manner as in 3GPP LTE Rel-13. It will be appreciated, however, that the methods described herein can be applied to a system where system information is alternatively organized.

In an example embodiment, a new SI Block, referred to herein as an SIBe, can contain the set of essential SI elements in the future cellular systems. For example, the SIBe can be carried in one of several SI blocks in the 5G system. In some cases, the SIBe includes most important system information without which a UE cannot (correctly) access the network. For example, the SIBe may include use case specific resources, channel configuration and random access information, etc. In addition, the SIBe can include the value of current eSystemInfoValueTag and an SIRequestAccess Field. An SIRequestAccess field may contain a SIRequestAccess subfield for each use case (for example, but not limited to eMBB, mMTC, UR/LL, etc.). The SIRequestAccess subfield of an example Use Case i is used to indicate how a UE of a specific Use Case i is allowed to send an SI Request to the cell. In one example, the SIRequestAccess subfield uses K bits to represent the probability that the UE is allowed to transmit an SR Request to the cell, $P_{access}(i)$, where the probability is quantized to $2^{Ki}$ levels between $[P_1(i), P_2(i)]$. It is recognized herein that the SIPF already considers factors such as system load, interference, etc. in determining the value of $P_{access}(i)$.

In some cases, the system may allocate reserved or pre-defined physical channel resources for UEs to transmit their SI Requests, which can be carried on either RACH, PUCCH or PUSCH, using dedicated channel resources or

```
-- ASN1START
SystemInformationBlockType1 ::=      SEQUENCE {
   cellAccessRelatedInfo                SEQUENCE {
      plmn-IdentityList                    PLMN-IdentityList,
      trackingAreaCode                     TrackingAreaCode,
      cellIdentity                         CellIdentity,
      cellBarred                           ENUMERATED {barred, notBarred},
      intraFreqReselection                 ENUMERATED {allowed, notAllowed},
      csg-Indication                       BOOLEAN,
      csg-Identity                         CSG-Identity
   OPTIONAL -- Need OR
      eCellIdentity                        Extended CellIdentity
   },
   cellSelectionInfo                    SEQUENCE {
      q-RxLevMin                           Q-RxLevMin,
      q-RxLevMinOffset                     INTEGER (1..8)
   OPTIONAL -- Need OP
   },
   p-Max                                P-Max
      OPTIONAL, -- Need OP
   freqBandIndicator                    FreqBandIndicator,
   schedulingInfoList                   SchedulingInfoList,
   tdd-Config                              TDD-Config
      OPTIONAL, -- Cond TDD
   si-WindowLength                         ENUMERATED {
                                        ms1, ms2, ms5, ms10, ms15, ms20,ms40},
   systemInfoValueTag                      INTEGER (0..31),
   esystemInfoValueTag                     INTEGER (0.. 2N),
   nonCriticalExtension                    SystemInformationBlockType1-v890-IEs
   OPTIONAL
}
...
``` shared/common/random channel resources. In an example, the UE will transmit its SI Request to its eCell (identified by eCell ID). Depending on the specific case of eCell, one or several cells may receive the SI request. For a UE that receives an SIRequestAccess subfield of User Case i, it can transmit an SI Request according to the $P_{access}(i)$.

In one example embodiment, a p-persistent aloha approach is implemented to transmit the SI request. For example, for each TTI until it is allowed to transmit an SI Request, the UE can generate a random number uniformly distributed between (0, 1). Then, the UE can compare the random number with $P_{access}(i)$. If the random number is smaller than $P_{access}(i)$, the UE can transmit an SI request.

In another example embodiment, a delay is generated according to the $P_{access}(i)$, and a wake up is after the delay of SI Request. For example, the delay of SI Request can equal $1/P_{access}(i)$, where the units are one TTI/sub-frame.

An example special case of the SIRequestAccess subfield is when $K^i=1$, $P_1(i)=0$, and $P_2(i)=1$, the SIRequestAccess subfield of User Case i becomes an equivalent of the SIRequestAccess indicator (e.g., allowed $P_{access}(i)=1$ or not allowed $P_{access}(i)=0$).

As an example use case, the SIBe is carried by extending the current SIB1, though it will be understood that implementation of signaling SIBe in the 5G system is not limited to this example below.

With respect to different Use Cases with their own performance requirements, the network may have different access control parameters for their SI requests. For example, the system might not allow mMTC devices to send SI Request frequently. Therefore, the probability of sending SI Request in such a system is lower than in others.

On-Demand SI Provisioning will now be discussed in detail. Without loss of generality, but for purposes of example, the function that is responsible for SI provisioning in a cell or the equivalent of a cell in the future cellular system is defined herein as an SI Provisioning Function (SIPF). The SIPF can be a logical function that can be located within an entity that is appropriate for the RAN architecture or RAN slicing configured for a UE.

In order to address issues related to inefficient resource utilization of SI provisioning, on-demand SI provisioning can be implemented, in accordance with an example embodiment. The SIPF can maintain a list of SI configuration parameter set(s) and corresponding value(s) of eSystemInfoValueTag, which may including its current eSystemInfoValueTag and previously used eSystemInfoValueTag values, if there are any. In some cases, whenever any SI element within the current SI configuration parameter set is changed or updated, the SIPF increases the current eSystemInfoValueTag value by one (modulo by $2^N$) and updates its database of SI configuration parameter set. Similarly, for each cell that it has previously selected or handed over, a UE can also maintain a list of SI configuration parameter set(s) and corresponding value(s) of eSystemInfoValueTag.

Example SystemInformationBlockType1 Message

```
-- ASN1START
SystemInformationBlockType1 ::=       SEQUENCE {
   cellAccessRelatedInfo                  SEQUENCE {
      plmn-IdentityList                      PLMN-IdentityList,
      trackingAreaCode                       TrackingAreaCode,
      cellIdentity                           CellIdentity,
      cellBarred                             ENUMERATED {barred, notBarred},
      intraFreqReselection                   ENUMERATED {allowed, notAllowed},
      csg-Indication                         BOOLEAN,
      csg-Identity                           CSG-Identity
         OPTIONAL -- Need OR
   },
   cellSelectionInfo                      SEQUENCE {
      q-RxLevMin                             Q-RxLevMin,
      q-RxLevMinOffset                       INTEGER (1..8)
         OPTIONAL -- Need OP
   },
   p-Max                                  P-Max
      OPTIONAL, -- Need OP
   freqBandIndicator                      FreqBandIndicator,
   schedulingInfoList                     SchedulingInfoList,
   tdd-Config                             TDD-Config
      OPTIONAL, -- Cond TDD
   si-WindowLength                        ENUMERATED {
                                             ms1, ms2, ms5, ms10, ms15, ms20,
                                                ms40},
   systemInfoValueTag                     INTEGER (0..31),
   esystemInfoValueTag                    INTEGER (0.. 2N),
   SIRequestAccessUseCase 1               ENUMERATED {P1(1), P2(1), ... , P2k(1)}
   SIRequestAccessUseCase 2               ENUMERATED {P1(2), P2(2), ... , P2k(2)}
   ...
   SIRequestAccessUseCase Q               ENUMERATED {P1(Q), P2(Q), ... , P2k(Q)}
   nonCriticalExtension                   SystemInformationBlockType1-v890-IEs
      OPTIONAL
}
...
-- ASN1STOP
```

In current 3GPP standards, a UE considers stored system information to be invalid after 3 hours from the moment it was successfully confirmed as valid. With the usage of eSystemInfoValueTag and database of SI configuration parameter set at both the UE and SIPF sides, a new parameter defined in accordance with an example embodiment. This parameter is referred to herein as a stored SI configuration parameter set validity period, which can be different than the term of "SI validity period" in current 3GPP standards. In an example, the stored SI configuration parameter set validity period can be set to $(2^N/32)$*SI validity period (3 Hours).

In order to allow efficient and flexible SI provisioning, for example, the SIPF at the network can adjust the frequency of SIBe broadcast by switching between several SIBe broadcast periodicity values {SIBeP(1), . . . , SIBeP(i), . . . , SIBeP(L)} (in the ascending order of values) based on the activities in the eCell or demands from the UEs. In some case, it is assumed that a UE needs to acquire certain essential SI elements before it can transmit anything in the uplink due to, for example, the network access rule and/or the air interface constraint.

Figure 15A:
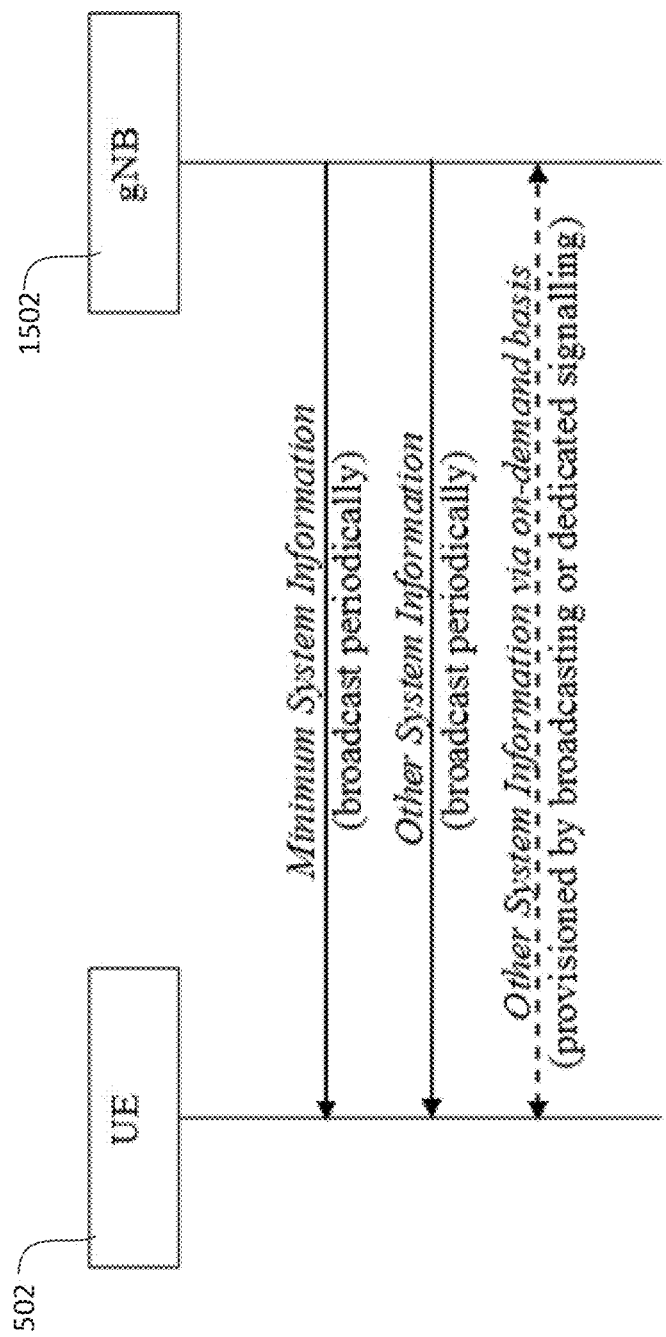
FIG. 15A depicts a high level example of minimum system information (SI) and other SI provisioning.

Referring generally to FIG. 15A, in a 5G New Radio (NR) system, the system information is divided into minimum SI (System Information) and other SI. Minimum SI is periodically broadcast. The minimum system information may at least include basic information required for initial access (for e.g. information to support cell selection including information required to evaluate whether or not the UE 502 is allowed to access the cell [at node B 1502]), information for acquiring other SI and scheduled information for broadcast SI. The other SI encompasses everything not broadcasted in minimum SI. The other SI may either be broadcast, or provisioned in a dedicated manner, either triggered by the network or upon request from the UE 502 as illustrated in the Figure below. For the other SI required by the UE 502, before the UE 502 sends the other SI request the UE 502 needs to know whether it is available in the cell and whether it is broadcast or not (e.g., by checking the minimum SI). The UE 502 in RRC_IDLE or RRC_INACTIVE (aka "new NR state") should be able to request the other SI without requiring a state transition. The other SI may be broadcast at configurable periodicity and for certain duration. Public Warning System (PWS) information can be classified into the other SI.

Figure 15B:
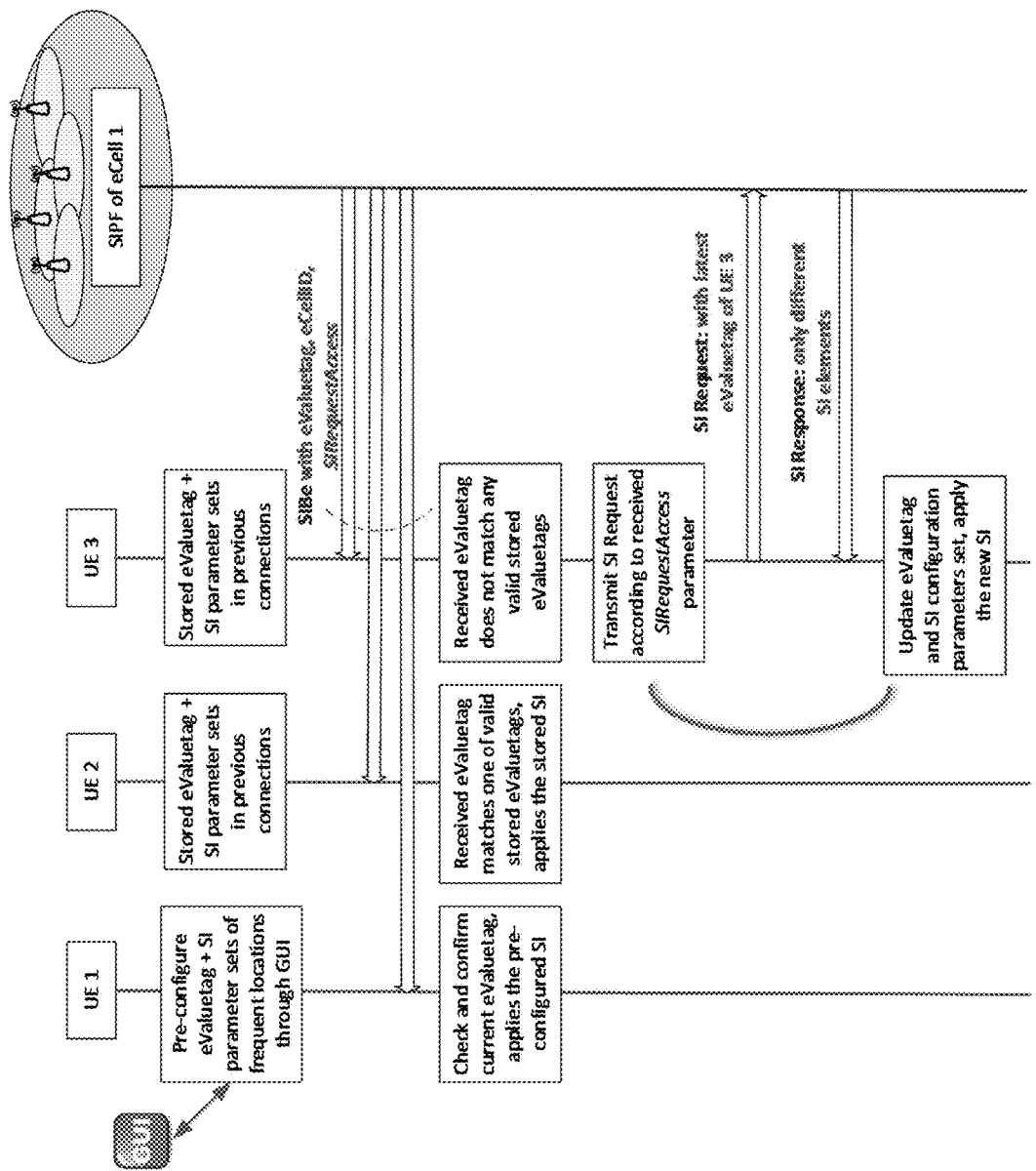
FIG. 15B shows an exemplary use case.

FIG. 15B shows an exemplary use case. Pre-configured and stored tags and SI parameter sets are used to minimize SI acquisition overheads for UEs. UE 1 uses a GUI to pre-configure tags and SI parameter sets of frequent locations. When UE 1 receives a matching tag from a cell, UE 1 can then use a pre-configured SI parameter set for that tag. UE 2 uses stored tags and SI parameter sets from previous connections. When UE 2 receives a matching tag from a cell, UE 2 can then use a stored SI parameter set for that tag. UE 3 uses on-demand SI provisioning to help to reduce SI acquisition latency. UE 3 can transmit a SI request according to a received parameter, such as a SIRequestAcess parameter. The cell can then respond with the SI parameters. In this case only new parameters are sent and the UE3 updates the stored parameters for the current tag.

Figure 16:
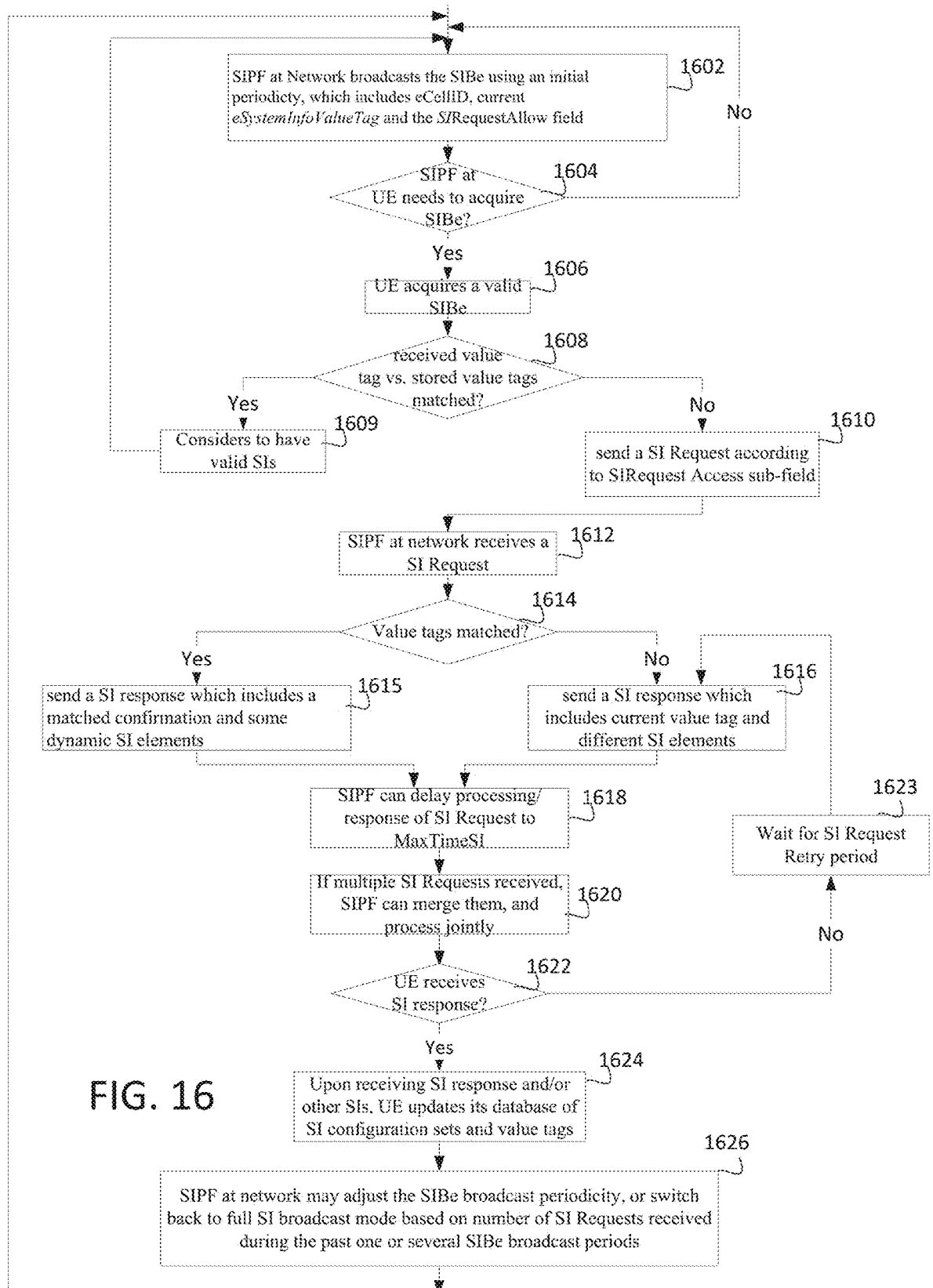
FIG. 16 is a diagram that illustrates the resumption of a previously suspended RRC Connection (MO case).

Referring to FIG. 16, in accordance with the illustrated embodiment, at step 1602 the SIPF at the network starts to broadcast the SIBe using an initial value of SIBe broadcast periodicity, say SIBeP(i). The periodicity may be adjusted later on based on the eCell activity, number of received SI requests, etc. Within the SIBe, the eCellidentity, the value of current eSystemInfoValueTag and the SIRequestAccessfield can be transmitted. At step 1604, the SIPF at the UE determines whether it needs to acquire SI. When a UE is in a state that needs to acquire the SI information (for example, cell selection or re-selection, wakes up from DRX or idle state, etc.), it might need to acquire the SIBe first. If it does not, the process can return to step 1602. If it does, the process can proceed to step 1604, where the UE acquires a valid SIBe. Upon successful reception of the SIBe, the UE can perform the one or more of the following (depending on different cases). In accordance with the illustrated example, if the UE has at least one valid SI Configuration set of this cell stored in its SIPF, it can compare the values of eSystemInfoValueTag of those valid SI Configuration set stored locally with the value of eSystemInfoValueTag received in SIBe (at step 1608).

With continuing reference to FIG. 16, if one of the stored valid eSystemInfoValueTag matches the eSystemInfoValueTag received in SIBe, then the UE might consider that it has acquired the valid system information (at step 1609). Thus, the UE might apply the SI Configuration set corresponding to the matched eSystemInfoValueTag to its current system information in the cell. The UE can update the value of current eSystemInfoValueTag with the value of eSystemInfoValueTag received in SIBe, and store the previous value in the stored valid eSystemInfoValueTag. If none of the stored valid eSystemInfoValueTag values match the eSystemInfoValueTag received in SIBe, then the UE might think that it does not have the valid system information of this cell. The UE can check the SIRequestAccess field received in the SIBe, and send a SI Request, at step 1610, according to the parameters in the SIRequestAccess sub-field.

In an example, the SI Request sent to the eCell by the UE may contain the most recent valid eSystemInfoValueTag that the UE stored locally (e.g., before it entered DRX, idle state, handover, etc.). In the SI Request, the UE may specify a maximum amount of time it can wait for SI acquisition (MaxTimeSIAcquisition). The value of this parameter can be determined by the UE based on its use case, applications, and corresponding requirements (e.g., latency and power savings/consumptions). In some cases, in the SI Request, the UE may specify a list of SI elements that it wants to acquire (e.g., the list can be much shorter than all SIBs that eNB typically broadcast in current standards). It may list some cell selection criteria as well, for example. If the UE does not have any valid SI Configuration set of this cell stored in its SIPF, it can check the SIRequestAccess field received in the SIBe, and send a SI Request according to the parameters in the SIRequestAccess sub-field.

In another example, the SI Request sent to the eCell by the UE may specify a list of SI elements that it wants to acquire (e.g., the list could be much shorter than all SIBs that eNB typically broadcast in current standards). It may lists some cell selection criteria as well. In the SI Request, the UE may specify a maximum amount of time it can wait for SI acquisition (MaxTimeSIAcquisition).

At step 1612, in accordance with the illustrated example, the SIPF at the network receives the SI Request. Upon receiving a SI Request from a UE, the SIPF may process in accordance with the illustrated example. For example, at step 1614, for a received SI Request with an eSystemInfoValueTag included in it, the SIPF compares its current eSystemInfoValueTag with the received eSystemInfoValueTag. If the two eSystemInfoValueTag values are the same, an eNB or the like, at step 1615, can send an SI response that includes a confirmation for the matched tag and the dynamic SI elements that the UE wants to acquire (e.g., which can be specified in the UE's SI Request). Alternatively, if the two eSystemInfoValueTag values are different, an eNB or the like can send, at step 1616, an SI response which includes the value of current eSystemInfoValueTag, the different parts of SI configuration sets of these two corresponding eSystemInfoValueTags, and the dynamic SI elements that the UE wants to acquire (e.g., specified in the UE's SI Request).

With respect to a received SI Request without an eSystemInfoValueTag included in it, the SIPF can send a SI response which includes the value of current eSystemInfoValueTag, the SI elements that the UE wants to acquire (e.g. specified in the UE's SI Request). As shown, at step 1618, in accordance with an example, the SIPF can delay the processing of the received SI Request as long as its response to the SI Request is within the window specified by MaxTimeSIAcquisition in the received SI Request. During this period of time, at step 1620, if there are several SI Requests received from the same or different UEs, for example, the SIPF can process them and merge the required SI responses jointly to save radio resources.

In an example, in order to reduce the amount of SI responses within a short time, the SIPF can transmit the SI response on the downlink (data) channel with a common RNTI (e.g., such as SI-RNTI) to allow multiple UEs to acquire these SI elements. In some cases, if the number of received SI requests exceeds a predefined threshold within a certain time duration, the SIPF may switch the on-demand SI provisioning mode to the conventional SI broadcast, as described herein.

At step 1622, in accordance with the illustrated example, the UE determines whether it has received at least one SI response. If the UE does not receive at least one SI response or other SIBs (SIBs update) within MaxTimeSIAcquisition, it can delay (at step 1623) for a pre-defined SI Request Retry Period, and re-transmit its SI Request according to the received SIRequestAccess field. If the UE receives at least one SI response within MaxTimeSIAcquisition, the process can proceed to step 1624. Upon reception of SI Response or other SIBs (or SIBs update) from the SIPF, the UE can update its database of SI configuration sets and corresponding values of eSystemInfoValueTag. If the SI Response does not have a confirmation of matched tag values, the UE can apply the received SI elements to its valid SI configuration, and update its current value of eSystemInfoValueTag to be the received tag value. At step 1626, the SIPF at the network can adjust the SIBe broadcast periodicity, or switch back to full SI broadcast mode based on, for example, the number of SI requests received during the past one or more SIBe broadcast periods.

Figure 17:
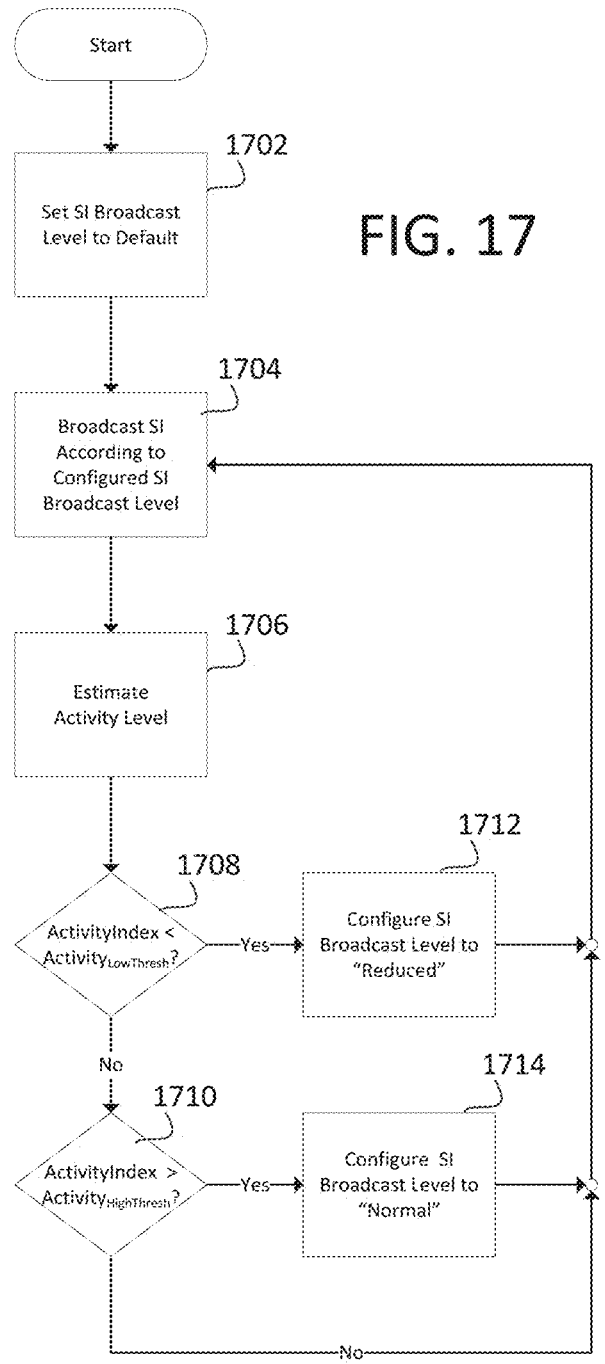
FIG. 17 is a diagram that illustrates RRC Signaling statistics collected in several live LTE network.

Turning now to triggering normal/reduced SI broadcasts, with reference to FIG. 17, Normal/Reduced SI Broadcast an eNB/cell can be triggered to switch from normal to reduced SI broadcast and visa-versa. The On-Demand SI provisioning mechanisms described above can be used in a cell that is configured for either SI Broadcast level.

In an example embodiment, triggering mechanism is based on a schedule, such as date/time-of-day. The SI Broadcast Level can be configured to be "Reduced" during the time of day when the service demand is expected to be low and "Normal" when the service demand is expected to be higher. Alternatively, a dynamic approach based on the activity level within the cell can also be defined. For example, when configured for "Normal" SI broadcast, an activity level below a threshold can be used to trigger a transition to a "Reduced" SI broadcast. Further, when configured for a "Reduced" SI broadcast, an activity level above a threshold can be used to trigger a transition to "Normal" SI broadcast.

Referring in particular to FIG. 17, in accordance with the example embodiment, at step 1702, the eNB/cell is initialized to the default SI Broadcast Level, which can be "Normal" or "Reduced". At step 1704, the eNB/cell then broadcasts the SI according to the configured SI Broadcast Level for a period of time that corresponds to the SI Broadcast Level Modification Period. The modification period boundaries can be defined by SFN values for which SFN mod m=0, where m is the number of radio frames comprising the modification period. In one embodiment, the SI Broadcast Modification Period coincides with the BCCH Modification Period. Alternatively, the SI Broadcast Modification Period can be defined independent of the BCCH Modification Period.

At step 1706, an activity level can be estimated, which can be referred to as an ActivityIndex. In one example, the ActivityIndex is determined based on metrics that represent the number of UEs in RRC_IDLE and/or RRC_CONNECTED at a given time. Alternatively, or additionally the ActivityIndex can be based on metrics such as the number of PRACH attempts, paging attempts, Tracking Area Updates (TAU), System Information Requests, etc. that occur during a given estimation interval (TEST_INT). In one embodiment, TEST_INT is aligned with the boundaries of the SI Broadcast Level Modification Period. Alternatively, the estimation interval TEST_INT can be shorter or longer than the SI Broadcast Level Modification Period and might not be aligned with the boundaries of the SI Broadcast Level Modification Period.

An exemplary set of ActivityMetrics used to determine the ActivityIndex can be defined as follows, without limitation:

ActivityMetricRRC_IDLE: # of UEs in RRC_IDLE at a given time
ActivityMetricRRC_CONNECTED: # of UEs in RRC_CONNECTED at a given time
ActivityMetricPRACH_ATTEMPTS: # of PRACH attempts occurring during TEST_INT
ActivityMetricPAGING_ATTEMPTS: # of paging attempts occurring during TEST_INT
ActivityMetricTAU: # of TAUs occurring during TEST_INT
ActivityMetricSI_REQS: # of System Information Requests occurring during TEST_INT In some cases, the ActivityIndex can be based on one or more of these ActivityMetrics, where each ActivityMetric is optionally scaled by a weighting factor that can be used to adjust the relative weight of a given ActivityMetric, for example;

$$ActivityIndex = \sum_{All\ ActivityMetrics} w_i \cdot ActivityMetric_i$$

At step 1708 and step 1710, the ActivityIndex can be compared with the low activity threshold (ActivityLowThresh) and the high activity threshold (ActivityHighThresh), respectively. If the ActivityIndex is less than ActivityLowThresh, the SI Broadcast Level for the next SI Broadcast Modification Period can be set to "Reduced" at step 1712. If the ActivityIndex is greater than ActivityHighThresh, the SI Broadcast Level for the next SI Broadcast Modification Period can set to "Normal" at step 1714.

Otherwise, the process can return to step 1704 and the SI Broadcast Level for the next SI Broadcast Modification Period can be the same as what was used in the current SI Broadcast Modification Period. It will be appreciated that the thresholds are configurable and could be tuned over time to make the system more or less responsive to instantaneous changes in the activity level. At the start of the next SI Broadcast Modification Period, the eNB/cell broadcasts the SI according to the new SI Broadcast Level, which is set at step 1702, for a period of time that corresponds to the SI Broadcast Level Modification Period. The process of estimating the activity (step 1706), determining the SI Broadcast Level, and reconfiguring the SI Broadcast Level can then repeat.

Thus described above are various mechanisms for efficient SI provisioning. An extended value tag for system information is defined, where each of such value tags correspond to a system information configuration parameter set of a cell. An entity that can be responsible for SI provisioning in a cell or the equivalent of a cell in the future cellular system is defined as a SI Provisioning Function (SIPF). As described, the SIPF and UE can utilize extended value tag to perform on-demand SI provisioning. In accordance with another embodiment, normal or reduced SI broadcasts can be triggered based time or activity levels within a cell. For example, an activity index can be determined, and the activity index can be compared to various thresholds. The SI broadcast level can be modified based on the comparison.

Figure 18:
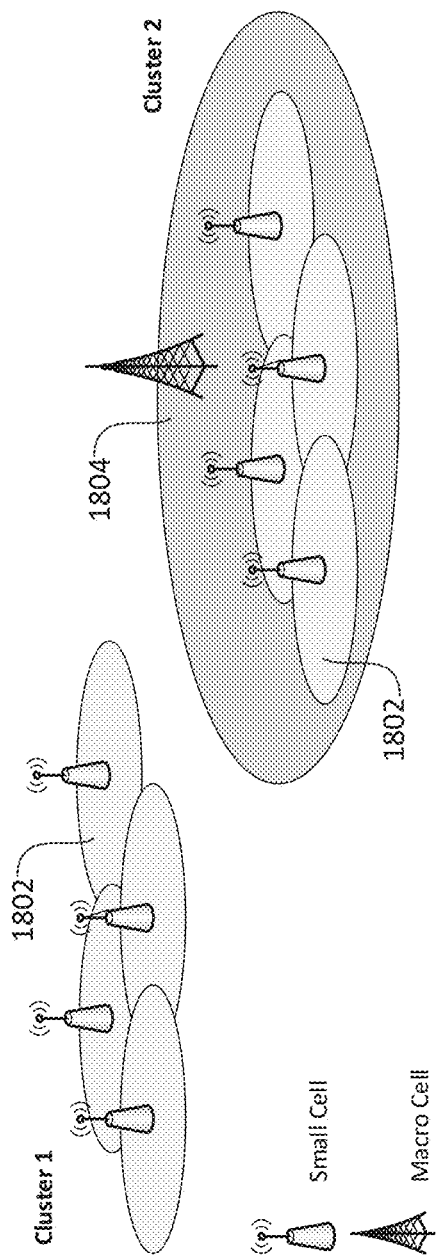
FIG. 18 is a diagram that illustrates cells that makeup a common area.

FIG. 18 is a diagram that illustrates cells (small cells 1802 and large cell 1804) that makeup common areas (cluster 1 and cluster 2). Cluster 1 is made of small cells and cluster 2 is made of a large cell and several small cells. To improve the efficiency of acquiring the required SI following cell re-selection, a Common Area that consists of a set of cells with coverage areas that are in proximity to each other is defined. The cells of the Common Area form a cluster, where some the Information Elements (IEs) broadcast as the SI by each cell may be common; i.e. the value for a given IE broadcast by cells within the cluster are the same. When a UE 502 re-selects a cell that is in the same cluster as the serving cell, the UE 502 is not required to re-acquire the SI that is common to the cluster. The set of cells that makeup the Common Area may be from the same layer or different layers; e.g. small cell layer, macro layer, as shown in FIG. 18.

It is understood that the functionality illustrated in FIG. 18 may be implemented in the form of software (i.e., computer-executable instructions) stored in a memory of, and executing on a processor of, a wireless device or other apparatus (e.g., a server, gateway, device, or other computer system), such as one of those illustrated in FIGS. 32B and F described below.

Figure 19A:
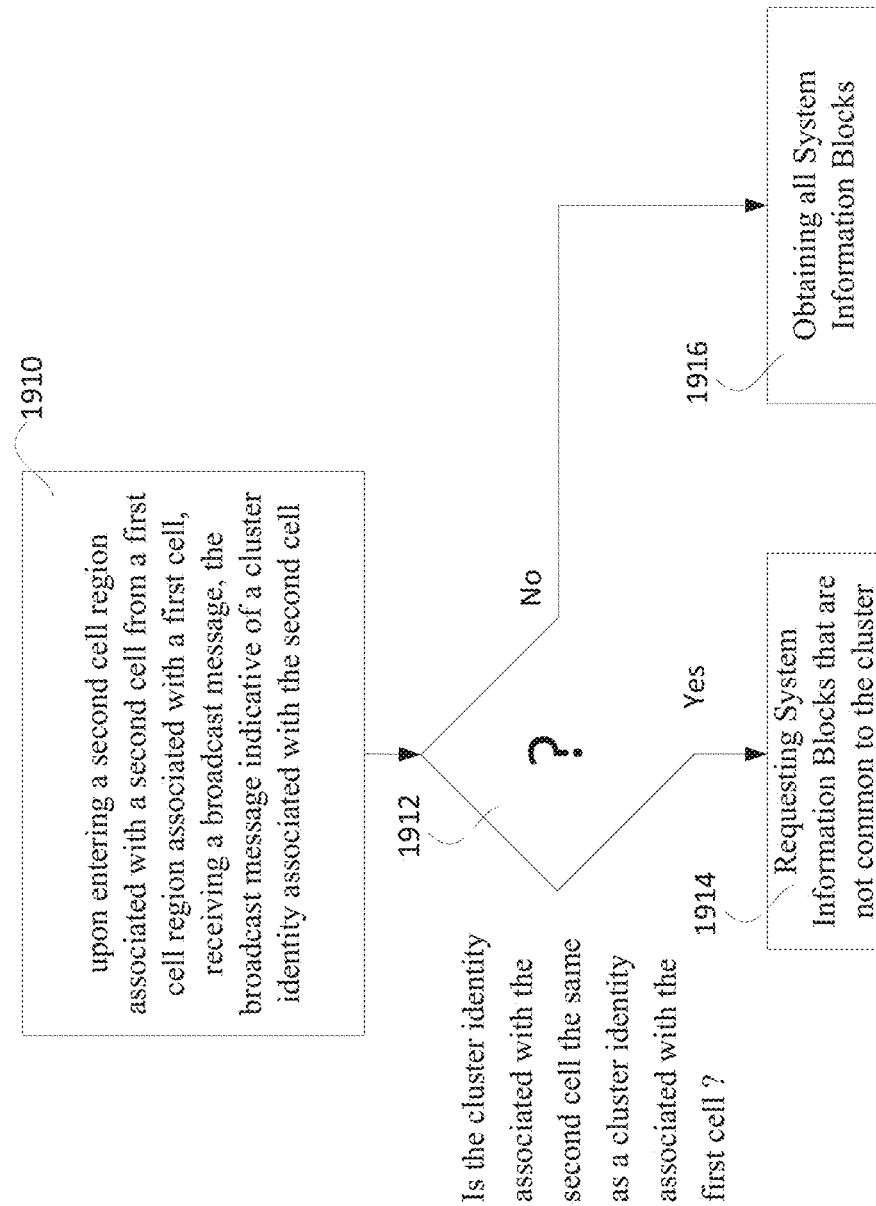
FIG. 19A is a flow chart that illustrates a system information acquisition procedure.

FIG. 19A is a flow chart that illustrates a system information acquisition procedure. In step 1910, upon entering a second cell region associated with a second cell from a first cell region associated with a first cell, a broadcast message can be received indicative of a cluster identity associated with the second cell.

The SI broadcast by a cell may include an IE that is used to indicate to which cluster the cell belongs; e.g. a cluster-Identity IE. Alternatively, the cluster identity could be indicated implicitly using an existing IE such as the cellIdentity signaled in SIB1; e.g. one or more bits in the cellIdentity could be used to indicate the cluster to which the cell belongs. If a cluster-Identity IE is used, it could be included in an existing SIB, e.g. SIB1, SIB2, etc. or a new SIB could be defined to carry this IE, on its own or together with new or existing IEs. The SI broadcast by a cell may also include one or more IEs to indicate if a SIB is "cell specific" or "common" to the cluster. In one embodiment, SIB1 could include cluster-Identity and sib-CommonInfo IEs defined as shown below.

System InformationBlockType1 Message

```
-- ASN1START
SystemInformationBlockType1 ::=      SEQUENCE {
    cellAccessRelatedInfo                SEQUENCE {
        plmn-IdentityList                    PLMN-IdentityList,
        trackingAreaCode                     TrackingAreaCode,
        cellIdentity                         CellIdentity,
        cellBarred                           ENUMERATED {barred, notBarred},
        intraFreqReselection                 ENUMERATED {allowed, notAllowed},
        csg-Indication                       BOOLEAN,
        csg-Identity                         CSG-Identity
    OPTIONAL, -- Need OR
        cluster-Identity                     ClusterIdentity
    },
    ...,
SchedulingInfoList ::= SEQUENCE (SIZE (1..maxSI-Message)) OF SchedulingInfo
SchedulingInfo ::= SEQUENCE {
    si-Periodicity                       ENUMERATED {
                                             rf8, rf16, rf32, rf64, rf128, rf256, rf512},
    sib-MappingInfo                      SIB-MappingInfo,
    sib-CommonInfo                       SIB-CommonInfo
}
SIB-MappingInfo ::= SEQUENCE (SIZE (0..maxSIB-1)) OF SIB-Type
SIB-Type ::=                         ENUMERATED {
                                             sibType3, sibType4,
    sibType5, sibType6,
                                             sibType7, sibType8,
    sibType9, sibType10,
                                             sibType11,
    sibType12-v920, sibType13-v920,
                                             sibType14-v1130,
    sibType15-v1130,
                                             sibType16-v1130,
```

```
sibType17-v1250, sibType18-v1250,
                                        ..., sibType19-v1250,
sibType20-v13xy}
ClusterIdentity ::=                     INTEGER (0..31)
SIB-CommonInfo ::= SEQUENCE (SIZE (0..maxSIB-1)) OF SIB-Common
SIB-Common ::=                          ENUMERATED {false, true}
...,
-- ASN1STOP
```

In step 1912, it is determined if cluster identity associated with the second cell the same as a cluster identity associated with the first cell. In one embodiment, before acquiring the System Information of the new serving cell following cell reselection, the UE 502 compares the cluster-Identity of the new serving cell with the cluster-Identity of the prior serving cell. If they are the same, then only the cell-specific SIBs need to be acquired from the new serving cell (in step 1914). The UE 502 checks the value of the sib-CommonInfo IE for a given SIB to determine if it is a common SIB or a cell-specific SIB. The UE 502 then uses the System Information Acquisition procedure defined in section 5.2.3 of 3GPP TS 36.331 to acquire SI messages to which a cell-specific SIB is mapped. If the new serving cell belongs to a different cluster, then the UE 502 acquires all the required SIBs from new serving cell (in step 1916).

Figure 19B:
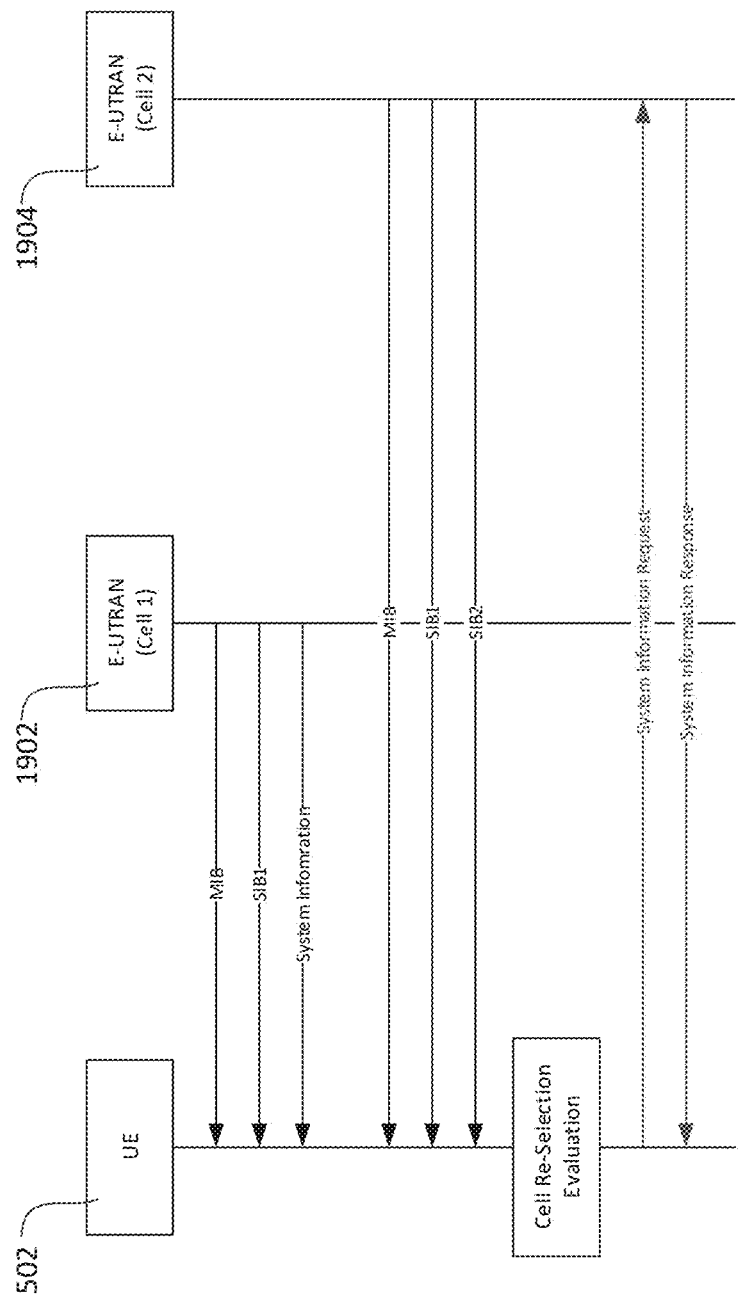
FIG. 19B illustrates a system information acquisition procedure with system information request.

The broadcast period for some of the SIBs that may need to be acquired can be hundreds of milliseconds. To allow the UE 502 to acquire the required SIBs more quickly following cell-reselection, the UE 502 can send a System Information Request message to the eNB/cell (Cell 1 (cell 1902) and Cell 2 (cell 1904)) as shown in FIG. 19B. The signaling shown in FIG. 19B shows the MIB, SIB1 and SIB2 of Cell 2 (cell 1904) being acquired before performing the cell reselection evaluation process. If SIB2 is a common SIB, it may not need to be acquired prior to performing the cell reselection evaluation process.

Figure 32A:
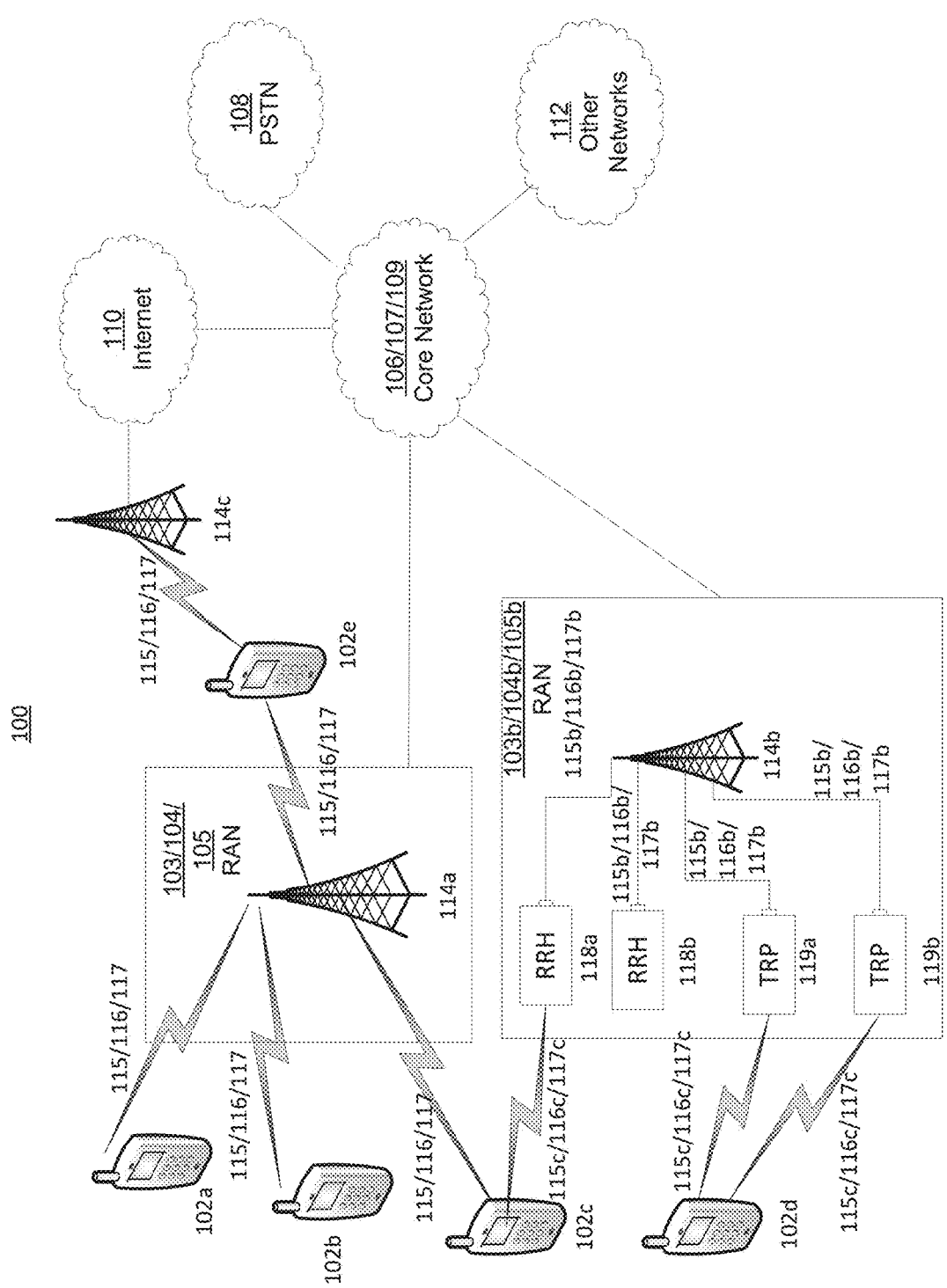
FIG. 32A illustrates one embodiment of an example communications system in which the methods and apparatuses described and claimed herein may be embodied.
Figure 32B:
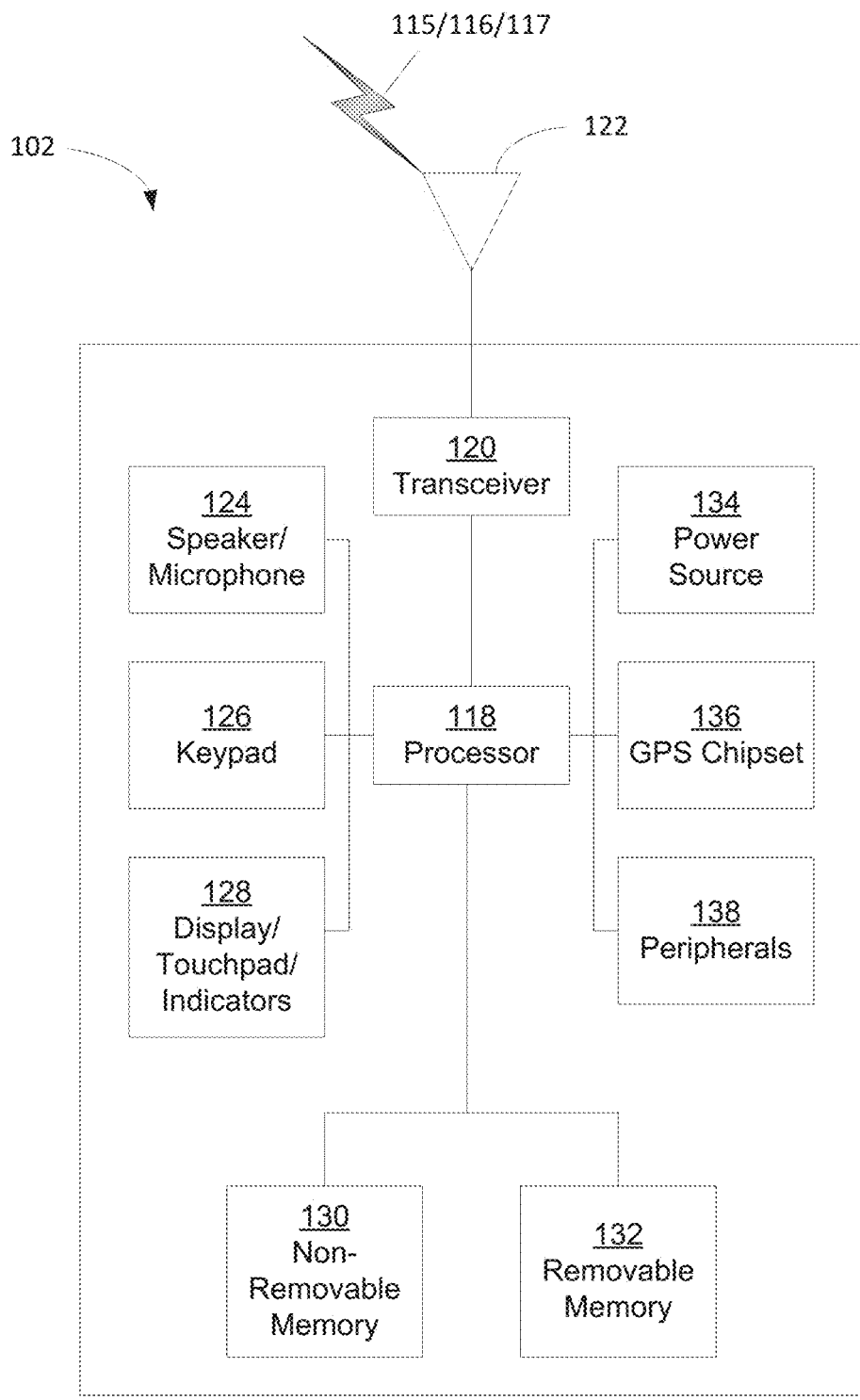
FIG. 32B is a block diagram of an example apparatus or device configured for wireless communications in accordance with the embodiments illustrated herein.

It is understood that the entities performing the steps illustrated in FIGS. 19A and 19B may be logical entities that may be implemented in the form of software (i.e., computer-executable instructions) stored in a memory of, and executing on a processor of, an apparatus configured for wireless and/or network communications or a computer system such as those illustrated in FIGS. 32B and F. That is, the method(s) illustrated in FIGS. 19A and 19B may be implemented in the form of software (i.e., computer-executable instructions) stored in a memory of an apparatus, such as the apparatus or computer system illustrated in FIGS. 32B and F, which computer executable instructions, when executed by a processor of the apparatus, perform the steps illustrated in FIGS. 19A and 19B. It is also understood that any transmitting and receiving steps illustrated in FIGS. 19A and 19B may be performed by communication circuitry of the apparatus under control of the processor of the apparatus and the computer-executable instructions (e.g., software) that it executes.

In one embodiment of the invention, the eNB includes all the common SIBs in the SystemInformationResponse message. Alternatively, the SystemInformationRequest message may include a field or fields to indicate which common SIBs should be included in the SystemInformationRequest message.

System Information Request Message

```
-- ASN1START
SystemInformationRequest    ::=         CHOICE {
    allCommonSIBs                       NULL,
    explicitList                        ::= SEQUENCE (SIZE (0..maxSIB-1)) OF SIB-Type
}
-- ASN1STOP
```

SystemInformationResponse Message

```
-- ASN1START
SystemInformationResponse : :=  Sequence{
    SIB3 SystemInformationBlockType3           OPTIONAL,
    SIB4 SystemInformationBlockType3           OPTIONAL,
    ...
    SIBN SystemInformationBlockTypeN           OPTIONAL
}
-- ASN1STOP
```

The System Information Request may not be supported by all eNB/cells in network. Therefore, the SI broadcast by the cell may include an IE that indicates whether or not the cell supports the System Information Request. In one embodiment, a new IE called SysInfoReqAllowed could be optionally included in SIB1 to indicate System Information Request messages are allowed in the cell.

Figure 20:
FIG. 20 is a diagram that illustrates RRC Signaling statistics collected in several live LTE network.

It has been observed in RP-160301 that RRC connection setup is the main contributor to the high signaling load. As shown in FIG. 20, in one study the RRC connection setup comprises 51.4% of the signaling load.

As discussed above, solutions have been proposed in LTE release 13 in the context of NB-IOT (Solution 2 and Solution 18 discussed above) to reduce RRC Connection Setup and subsequent RRC reconfigurations signaling load, but these solution are non-optimal, rather an after-thought and patched solutions.

In order to meet 5G system requirements (for e.g. signaling load reduction despite significant increase in connection density, very low control plane latency, extended UE battery life, increased network energy so as to minimize CapEx and OpEx, much higher data rate in comparison to legacy systems), a reduction of RRC Connection Setup and Subsequent RRC Connection Reconfiguration Signaling load needs to be addressed.

The new 5G systems specification initiative in 3GPP offers the opportunity to explore novel ideas without backward compatibility constraints for signaling load reduction in the next generation networks.

In this disclosure, 5G, 5G System, NexGen, Next generation System are used interchangeably. Also, in this disclosure, the term Node B or eNode B or 5G RAN node are used to generically denote a 5G Radio Access Network Node, which could be either located in the control plane, or in the user plane, and could be located in a centralized location (e.g. data center, cloud, i.e. central controller or central unit in support of virtualization) or could be located at the edge of the RAN as a distributed RAN unit for e.g. a Transmit Reception Point (TRP) with RAN functions located at the edge of the RAN. Similarly, the term Mobile Management Entity (MME), or 5G CN control node are used generically in reference, to a 5G network control entity or control unit located in the control plane. The term S-GW, P-GW or 5G core network equivalent node are used in reference to 5G core network gateway or user data processing unit located in the data plane or user plane.

In this document, the term Data radio Bearer (DRB) is used in a broader sense to denote end-to-end bearer i.e. user data path channel and all its segments in the user plane covering the user data path channel between the UE and the core network. This might be for e.g. data path channel in support of user data at IP flow granularity level. Similarly, the term Signaling Radio Bearer (SRB) in used in a broader sense to denote control data path channel in the control plane covering, the control data path channel between the UE and the eNodeB or the equivalent 5G RAN node, and the control data path channel between the UE and the core network including the control data path channel between the radio access network and the core network.

New Light-Weight Connection Signaling Procedure—Use of Preconfigured SRB and DRB configuration Parameter Sets A framework and mechanisms for establishing a light-weight signaling connection are described. A forward looking solution makes use of an index-based combined SRB/DRB establishment procedure. An index-based Access Stratum (AS) configuration procedure can be an extension of the legacy RRC Connection Control procedures; e.g. RRC Connection Establishment, RRC Connection Reconfiguration.

Index-Based Combined SRB/DRB Establishment Procedure

Figure 21A:
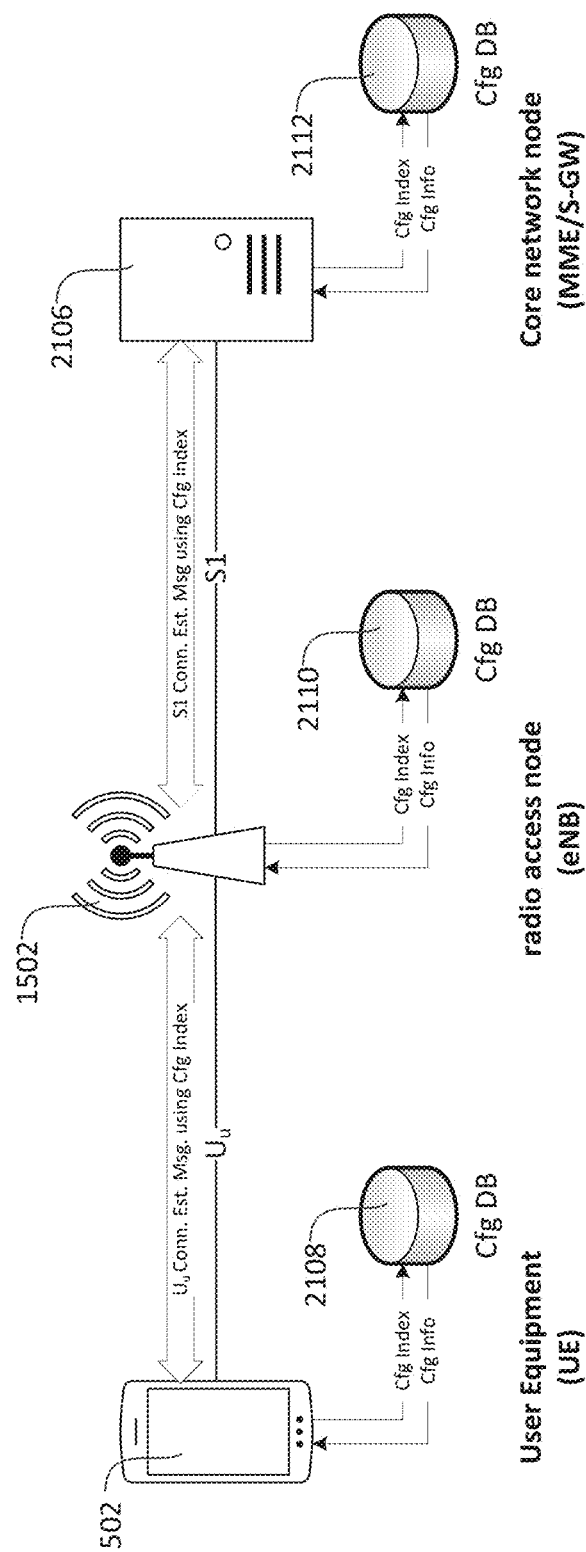
FIGS. 21A-B are diagrams that illustrate a framework for Index-Based Configuration.

An exemplary framework for index-based configuration is shown in FIG. 21A. For devices requiring a light-weight connection, a novel index-based connection establishment procedure can be used to establish the required Radio Bearers (RB); e.g. SRB, DRB. An N-bit configuration index can be signaled to/from the UE 502 and used to "lookup" the corresponding set of configuration parameters needed to establish the connection, where the value N is dependent on the number of configurations that need to be supported. The same index can be signaled between the radio access node 1502 (or eNB) and Core Network (CN) nodes 2106; e.g. MME, S-GW, P-GW in the Evolved Packet Core (EPC) or NexGen_CN_Control_Node and NexGen_CN_Data_Plane nodes in a 5G network, and used to "lookup" the corresponding set of configuration parameters needed by the nodes. The index values can be used to obtain configuration information from memory locations such as configuration databases 2108, 2110 and 2112.

The UE 502 may provide a single configuration index toward the network (radio access node 1502 or core node 2106) or provide more than one configuration index toward the network. The network in its response to the UE 502, might use any or a subset of the configuration index from the UE 502 or an index or index set completely different from the one(s) suggested by the UE 502.

The UE 502 need not provide any configuration index in the connection setup request toward the network. The network in its response to the UE 502 may provide one or more configuration index(es) to UE. The network has the ability to initiate the setup of a light connection procedure between the network and the UE 502 and is not necessarily bound to the presence of a configuration index in the request message from the UE 502. Furthermore, the network may initiate the procedure on its own for e.g. for reconfiguration an existing connection whether it is an existing legacy connection between the UE 502 and the network or an existing light-weight connection between the UE 502 and the network.

Figure 21B:
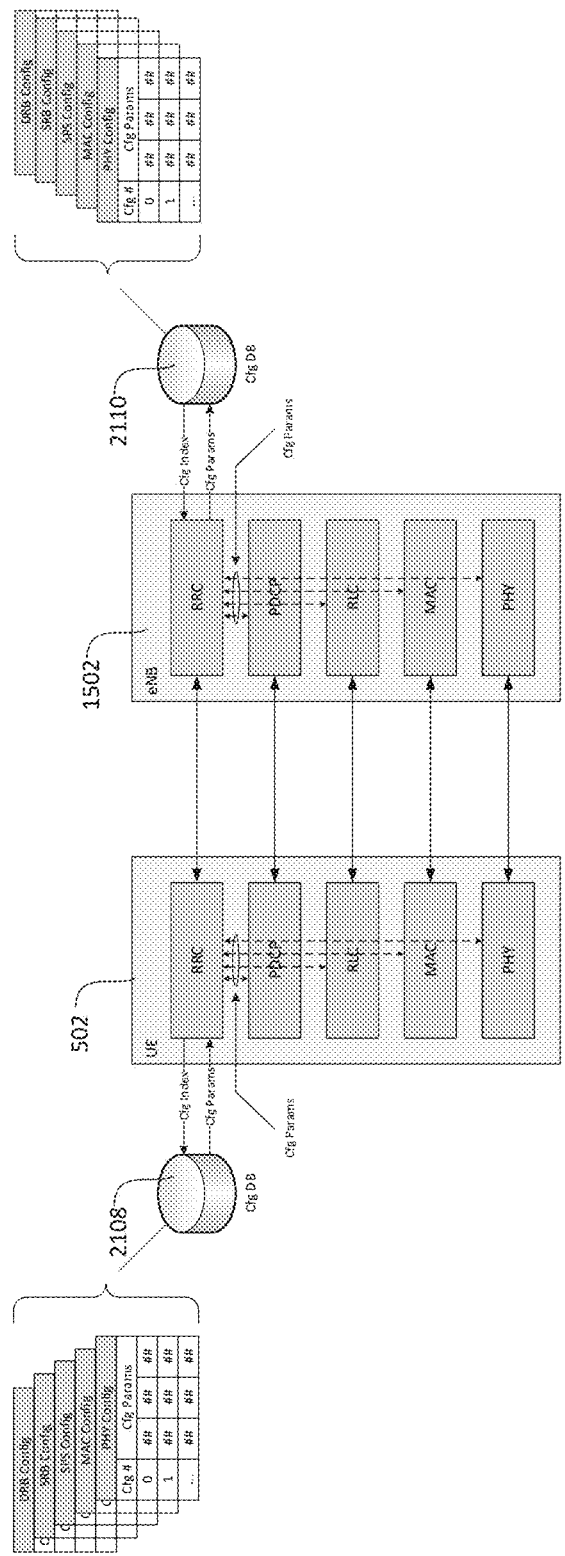

FIG. 21B illustrates an example that illustrates how the configuration parameters for the different layers in the radio communication stack including physical layer (PHY), Media Access Control (MAC), Radio Link Control (RLC), Packet Data Convergence Protocol (PDCP), and Radio Resource Control (RRC) that are obtained using an index.

The UE 502, radio access node 1502, and core network node 2106 can be, or be implemented on, an apparatus including a processor and a memory. The apparatus including computer-executable instructions stored in the memory of the apparatus which, when executed by the processor of the apparatus, cause the apparatus to use an index value to look up a configuration parameters for a connection. The configuration parameters can be used to set up a connection.

It is understood that the functionality illustrated in FIGS. 21A-B may be implemented in the form of software (i.e., computer-executable instructions) stored in a memory of, and executing on a processor of, a wireless device or other apparatus (e.g., a server, gateway, device, or other computer system), such as one of those illustrated in FIGS. 32B and F described below.

Figure 22:
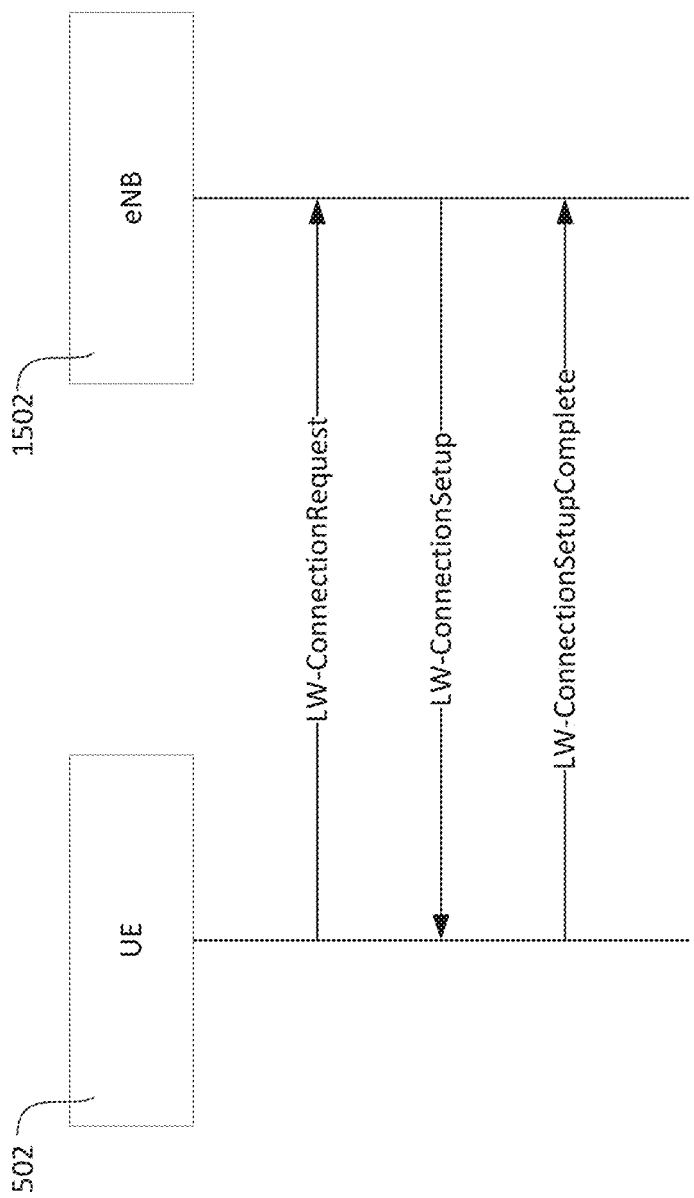
FIG. 22 is a diagram that illustrates Light-Weight (LW) connection establishment.

An exemplary Light-Weight Connection Establishment signaling diagram is shown in FIG. 22. In this example, the number of exchanged messages can be as small as 3 messages, each with a size as small as 6 octets. Such Light-Weight Connection Establishment signaling can replace intensive signaling of the legacy procedure for SRB and DRB setup shown in FIG. 13.

The UE 502 initiates the procedure by transmitting the LW-ConnectionRequest message, which is defined as shown below. The LW-ConnectionRequest message includes the ue-Identity and optionally includes a cfgIndex, where the cfgIndex may be used to indicate the UE's preferred configuration. Alternatively, the UE 502 may signal a cfgIndex list where the list may be used to indicate the UE's preferred configurations thereby enabling the network to select a configuration from the list of preferred configurations.

The eNB (radio access node 1502) responds with a LW-ConnectionSetup message as defined below. The LW-ConnectionSetup message optionally includes a cfgIndex that is used to indicate the network selected configuration, where the selected configuration may or may not correspond to a UE 502 preferred configuration. For scenarios where the UE signals a single cfgIndex in the LW-ConnectionRequest message, the eNB (radio access node 1502) may omit the cfgIndex, thereby implying the network selected the UE 502 preferred configuration signaled by the UE 502 in the LW-ConnectionRequest message. Alternatively, the eNB (radio access node 1502) may respond with a cfgIndex list, where the list corresponds to a set of allowed configurations, thereby enabling the UE 502 to select a preferred configuration from the list.

Upon reception of the LW-ConnectionSetup message the UE 502 can apply the selected configuration as follows:

1. If the LW-ConnectionSetup message does not include a cfgIndex, the UE 502 applies the UE preferred configuration corresponding to cfgIndex signaled by the UE 502 in the LW-ConnectionRequest message.
2. If the LW-ConnectionSetup message includes a single cfgIndex, the UE 502 applies the network selected configuration corresponding to the cfgIndex signaled in the LW-ConnectionSetup message.
3. If the LW-ConnectionSetup message includes a cfgIndex list, the UE 502 selects a configuration from one of the allowed configurations corresponding to the cfgIndex list signaled in the LW-ConnectionSetup message.

After successfully applying the selected configuration, the UE 502 responds with a LW-ConnectionSetupComplete message as defined below. For scenarios where cfgIndex list is signaled in the LW-ConnectionSetup message, the LW-ConnectionSetupComplete message includes a cfgIndex to indicate the configuration that was selected and successfully applied by the UE 502. The LW-ConnectionSetupComplete message may optionally include the mobilityState, where the mobility state of the UE 502 is determined as defined TS 36.304.

It is understood that the entities performing the steps illustrated in FIG. 22 may be logical entities that may be implemented in the form of software (i.e., computer-executable instructions) stored in a memory of, and executing on a processor of, an apparatus configured for wireless and/or network communications or a computer system such as those illustrated in FIGS. 21B and F. That is, the method(s) illustrated in FIG. 22 may be implemented in the form of software (i.e., computer-executable instructions) stored in a memory of an apparatus, such as the apparatus or computer system illustrated in FIGS. 32B and F, which computer executable instructions, when executed by a processor of the apparatus, perform the steps illustrated in FIG. 22. It is also understood that any transmitting and receiving steps illustrated in FIG. 22 may be performed by communication circuitry of the apparatus under control of the processor of the apparatus and the computer-executable instructions (e.g., software) that it executes.

LW-Connection Request Message

```
-- ASN1START
LW-ConnectionRequest ::=    Sequence{
    ue-Identity                 CHOICE {
        sTMSI                       S-TMSI,
        mTMSI                       M-TMSI,
        imsi                        IMSI
    },
    cfgIndex                    BIT STRING (SIZE (8)) OPTIONAL
}
-- ASN1STOP
```

LW-ConnectionSetup Message

```
-- ASN1START
LW-ConnectionSetup ::=      Sequence{
    transactionIdentifier       INTEGER (0..3),
    cfgIndex                    BIT STRING (SIZE (8)) OPTIONAL
}
-- ASN1STOP
```

LW-Connection Setup Complete Message

```
-- ASN1START
LW-ConnectionSetupComplete ::=  Sequence{
    transactionIdentifier       INTEGER (0..3),
    cfgIndex                    BIT STRING (SIZE (8))          OPTIONAL
    mobilityState               ENUMERATED (Normal-mobility, Medium-mobility,
                                High-Mobility, Static, Nomadic} OPTIONAL
}
-- ASN1STOP
```

While the solution is described in terms of SRB or DRB system parameters pre-configuration, the solution is equally applicable to pre-configuration of data flow or pre-configuration of IP flow, or pre-configuration of logical channel or any other pre-configuration of system parameters that can be used to configure the protocol stack (including the PHY) in each node of the system (including the UE 502) without having to explicitly signal all or nearly all the configuration parameters over the air interface.

Index-Based AS Configuration

The RRC Connection Establishment procedure is used to establish a connection between the UE 502 and the E-UTRAN 504. Execution of this procedure involves establishment of SRB1 and transferring the initial NAS dedicated information/message from the UE 502 to the E-UTRAN 504. The RRC Connection Reconfiguration procedure is used to establish additional Radio Bearers (RBs); e.g. SRB2, DRBs, so data can be transmitted/received on the user plane. The main contributor to the signaling overhead in these procedures is the RRCConnectionSetup and RRCConnectionReconfiguration messages.

To reduce the payload size of the RRCConnectionSetup and RRCConnectionReconfiguration messages, and thereby reduce the signaling overhead for light-weight connections, a mechanism to signal an indicator or indicators that can be used to "lookup" the set of configuration parameters used to setup the necessary RBs and to optionally modify the MAC main configuration, the SPS configuration and/or the dedicated physical configuration.

The Configuration DB may contain multiple configuration sets used for configuration of the RBs and lower layers. This could be based off the default radio configurations defined in section 9.2 of 36.331 (V13.1.0). The configuration sets for the RBs/lower layers may be based on the IEs signaled in the legacy RadioResourceConfigDedicated IE as shown below:

DRB Config
Specifies the DRB configuration. Based off the DRB-ToAddMod type as defined in the RadioResourceConfigDedicated IE defined in TS 36.331.

SRB Config
Specifies the SRB configuration. Based off the SRB-ToAddMod type as defined in theRadioResourceConfigDedicated IE defined in TS 36.331.

SPS Config
Specifies the semi-persistent scheduling configuration. Based off the SPS-Config IE defined in TS 36.331.

MAC Config
Specifies the MAC main configuration for SRBs and DRBs. Based off the MAC-MainConfig IE defined in TS 36.331.

PHY Config
Specifies the physical channel configuration. Based off the PhysicalConfigDedicated IE defined in TS 36.331.

While the solution is described in terms of SRB or DRB system parameters pre-configuration, the solution is equally applicable to pre-configuration of data flow or pre-configuration of IP flow, or pre-configuration of logical channel or any other pre-configuration of system parameters that can be used to configure the protocol stack (including the PHY) in each node of the system (including the UE 502) without having to explicitly signal all or nearly all the configuration parameters over the air interface.

Definition of Extended Establishment Cause IE

The EstablishmentCause field signaled in the RRCConnectionRequest message provides the establishment cause for the RRC connection request. The RRC connection establishment cause may be used for differentiated handling of data and signaling in the AS. The definition of the EstablishmentCause IE can be extended to include a new cause that enables the use of index-based UE configuration for light-weight connections. An exemplary Extended Establishment Cause IE is described below.

Extended Establishment Cause Information Element

Definition of Extended RRC Connection Setup Message

In this embodiment, the RRCConnectionSetup message is extended to optionally include a set of configuration index fields that can be used to "lookup" the set of configuration parameters used to setup SRB1 and modify the MAC main configuration and/or the dedicated physical configuration. Although the exemplary extension includes configuration index fields for SRB1, MAC, and PHY, index-based configuration can be used for any combination of these entities/functions. Furthermore, the range of the configuration index fields in the example provides support for up to 4 different configurations; i.e. configurations 0-3. This range can be extended or reduced to support the desired number of configurations. An exemplary Extended RRCConnectionSetup message is described below.

Extended RRC Connection Setup Message

```
-- ASN1START
RRCConnectionSetup ::=            SEQUENCE {
    rrc-TransactionIdentifier     RRC-TransactionIdentifier,
    criticalExtensions            CHOICE {
        c1                            CHOICE {
            rrcConnectionSetup-r8         RRCConnectionSetup-r8-IEs,
            spare7 NULL,
            spare6 NULL, spare5 NULL, spare4 NULL,
            spare3 NULL, spare2 NULL, spare1 NULL
        },
        c2                            SEQUENCE 1
            srb1CfgIndex                  Integer (0..3),
            macCfgIndex                   Integer (0..3)
                                          OPTIONAL,
            phyCfgIndex                   Integer (0..3)
                                          OPTIONAL
        }
        criticalExtensionsFuture      SEQUENCE { }
    }
}
RRCConnectionSetup-r8-IEs ::=     SEQUENCE {
    radioResourceConfigDedicated      RadioResourceConfigDedicated,
    nonCriticalExtension              RRCConnectionSetup-v8a0-IEs
        OPTIONAL
}
RRCConnectionSetup-v8a0-IEs ::= SEQUENCE {
    lateNonCriticalExtension          OCTET STRING
        OPTIONAL,
    nonCriticalExtension              SEQUENCE { }
        OPTIONAL
}
-- ASN1STOP
```

Alternatively, a single cfgIndex field could be used, where a specified set of bits in the field corresponds to the configuration index for the various entities/functions. An exemplary encoding of a 6-bit cfgIndex field is shown in Table 1.

```
-- ASN1START
EstablishmentCause ::=            ENUMERATED {
                                      emergency,
highPriorityAccess, mt-Access, mo-Signalling,
                                      mo-Data,
delayTolerantAccess-v1020, mo-VoiceCall-v1280,
                                      light-weight}
-- ASN1STOP
```

TABLE 1

Exemplary Encoding of cfgIndex Field

| Index | Bits |
|---|---|
| srb1CfgIndex | Bits {0, 1} |
| macCfgIndex | Bits {2, 3} |
| phyCfgIndex | Bits {4, 5} |

An alternate extension of the RRCConnectionSetup message using a single cfgIndex field is shown below.

Alternate Extension of RRC Connection Setup Message

```
-- ASN1START
RRCConnectionSetup ::=              SEQUENCE {
    rrc-TransactionIdentifier           RRC-TransactionIdentifier,
    criticalExtensions                  CHOICE {
        c1                                  CHOICE {
            rrcConnectionSetup-r8               RRCConnectionSetup-r8-IEs,
            spare7 NULL,
            spare6 NULL, spare5 NULL, spare4 NULL,
            spare3 NULL, spare2 NULL, spare1 NULL
        },
        cfgIndex                            Integer (0..63),
        criticalExtensionsFuture            SEQUENCE { }
    }
}
RRCConnectionSetup-r8-IEs ::=       SEQUENCE {
    radioResourceConfigDedicated        RadioResourceConfigDedicated,
    nonCriticalExtension                RRCConnectionSetup-v8a0-IEs
    OPTIONAL
}
RRCConnectionSetup-v8a0-IEs ::= SEQUENCE {
    lateNonCriticalExtension            OCTET STRING
        OPTIONAL,
    nonCriticalExtension                SEQUENCE { }
        OPTIONAL
}
-- ASN1STOP
```

Definition of Extended RadioResourceConfigDedicated IE

In this embodiment, the RadioResourceConfigDedicated IE is extended to include configuration index fields that can be optionally provided to devices that require light-weight connections. In the example shown below, support for index-based configuration is provided for the RB configurations, MAC main configuration, SPS configuration and dedicated physical configuration. However, index-based configuration is supported for any combination of these entities/functions. Furthermore, the range of cfgIndex field in the example provides support for up to 4 different configurations; i.e. configurations 0-3. This range can be extended or reduced to support the desired number of configurations.

Figure 23:
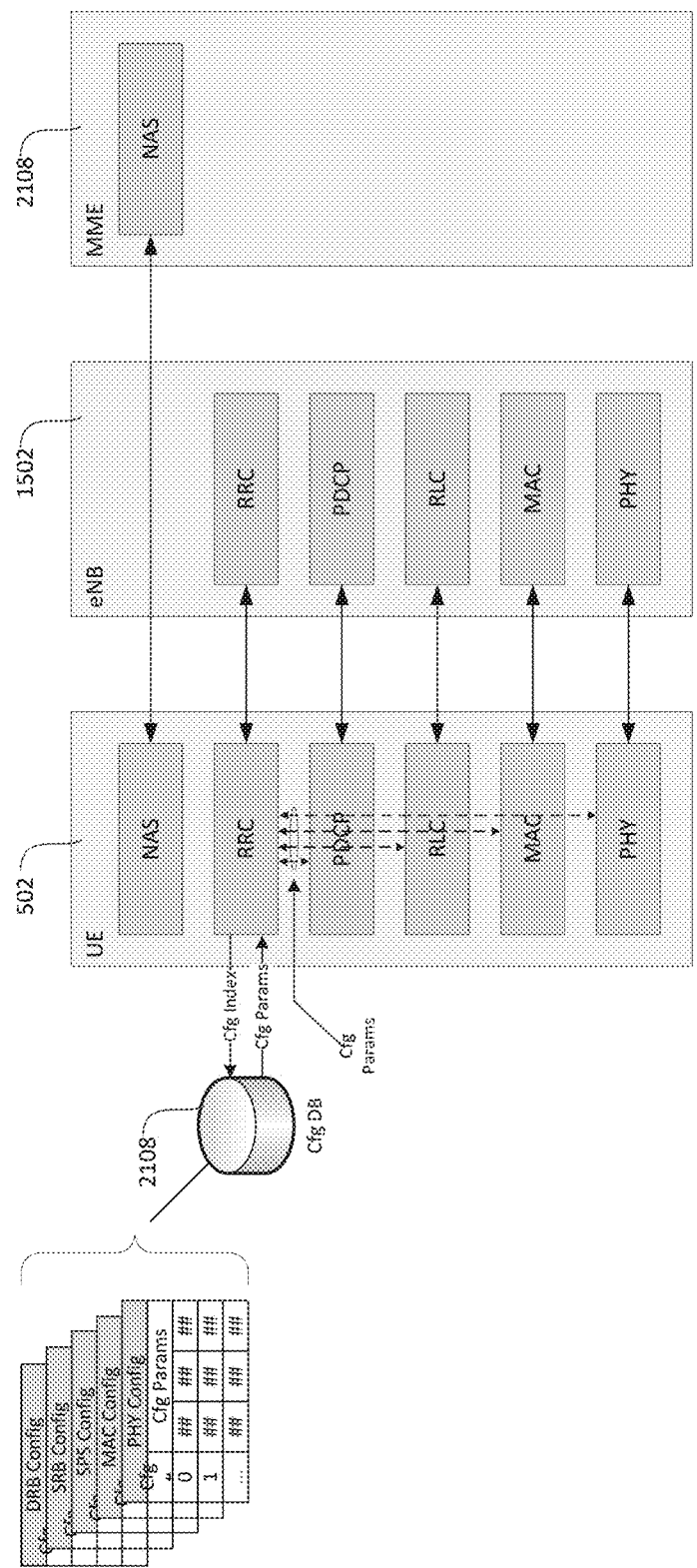
FIG. 23 is a diagram that illustrates an index-based access stratum configuration.

When the UE 502 receives an RRC message with the extended RadioResourceConfigDedicated IE containing a cfgIndex field, it uses the cfgIndex to lookup the configuration parameters from a local database containing configuration parameter sets as shown in FIG. 23. The configuration database may contain configuration parameter sets for the RBs, the MAC main configuration, the SPS configuration and/or the dedicated physical configuration.

It is understood that the functionality illustrated in FIG. 23 may be implemented in the form of software (i.e., computer-executable instructions) stored in a memory of, and executing on a processor of, a wireless device or other apparatus (e.g., a server, gateway, device, or other computer system), such as one of those illustrated in FIGS. 32B and F described below.

Extended RadioResourceConfigDedicated Information Element

```
-- ASN1START
RadioResourceConfigDedicated ::=        SEQUENCE {
    srb-ToAddModList                                            SRB-ToAddModList
        OPTIONAL,            -- Cond HO-Conn
    drb-ToAddModList                                            DRB-ToAddModList
        OPTIONAL,            -- Cond HO-toEUTRA
    drb-ToReleaseList                                           DRB-ToReleaseList
        OPTIONAL,            -- Need ON
    mac-MainConfig                                              CHOICE {
                explicitValue                                       MAC-MainConfig,
                defaultValue                                        NULL,
                cfgIndex                                            Integer (0..3)
    }           OPTIONAL,
                                                            -- Cond HO-toEUTRA2
    sps-Config                                                  CHOICE {
                explicitValue                                       SPS-Config,
                cfgIndex                                            Integer (0..3)
    }           OPTIONAL,            -- Need ON
    physicalConfigDedicated                                     Choice {
                explicitValue                                       PhysicalConfigDedicated,
                cfgIndex                                            Integer (0..3)
    }           OPTIONAL,            -- Need ON
    ...,
    [[  rlf-TimersAndConstants-r9                               RLF-TimersAndConstants-r9
        OPTIONAL            -- Need ON
    ]],
    [[  measSubframePatternPCell-r10                            MeasSubframePatternPCell-r10
        OPTIONAL            -- Need ON
    ]],
    [[  neighCellsCRS-Info-r11                                  NeighCellsCRS-Info-r11
        OPTIONAL            -- Need ON
    ]],
    [[  naics-Info-r12                                          NAICS-AssistanceInfo-r12
```

```
    OPTIONAL    -- Need ON
  ]],
  [[         neighCellsCRS-Info-r13              NeighCellsCRS-Info-r13
             OPTIONAL   -- Cond CRSIM
  ]]
}
RadioResourceConfigDedicatedPSCell-r12 ::=        SEQUENCE {
  -- UE specific configuration extensions applicable for an PSCell
  physicalConfigDedicatedPSCell-r12               PhysicalConfigDedicated
    OPTIONAL,    -- Need ON
  sps-Config-r12                                  SPS-Config
             OPTIONAL,            -- Need ON
  naics-Info-r12                                  NAICS-AssistanceInfo-r12
    OPTIONAL,    -- Need ON
  ...,
  [[         neighCellsCRS-InfoPSCell-r13         NeighCellsCRS-Info-r13
    OPTIONAL    -- Need ON
  ]]
}
RadioResourceConfigDedicatedSCG-r12 ::=           SEQUENCE {
  drb-ToAddModListSCG-r12                         DRB-ToAddModListSCG-r12
             OPTIONAL,  -- Need ON
  mac-MainConfigSCG-r12                           MAC-MainConfig
             OPTIONAL,  -- Need ON
  rlf-TimersAndConstantsSCG-r12                   RLF-TimersAndConstantsSCG-r12
    OPTIONAL,   -- Need ON
  ...
}
RadioResourceConfigDedicatedSCell-r10 ::=         SEQUENCE {
  -- UE specific configuration extensions applicable for an SCell
  physicalConfigDedicatedSCell-r10                PhysicalConfigDedicatedSCell-r10
    OPTIONAL,    -- Need ON
  ...,
  [[         mac-MainConfigSCell-r11              MAC-MainConfigSCell-r11
    OPTIONAL    -- Cond SCellAdd
  ]],
  [[         naics-Info-r12                       NAICS-AssistanceInfo-r12
    OPTIONAL    -- Need ON
  ]],
  [[         neighCellsCRS-InfoSCell-r13          NeighCellsCRS-Info-r13
    OPTIONAL    -- Need ON
  ]]
}
SRB-ToAddModList ::=                              SEQUENCE (SIZE (1..2)) OF SRB-ToAddMod
SRB-ToAddMod ::= SEQUENCE {
  srb-Identity                                    INTEGER (1..2),
  srb-Config                                      CHOICE {
           explicitValue                          SEQUENCE {
             rlc-Config                           CHOICE {
                    explicitValue                 RLC-Config,
                    defaultValue                  NULL
             }                     OPTIONAL,
                                                  -- Cond Setup
             logicalChannelConfig                 CHOICE {
                    explicitValue
  LogicalChannelConfig,
                    defaultValue                  NULL
             }                     OPTIONAL,
                                                  -- Cond Setup
             cfgIndex                             Integer (0..3)
  }
  ...
}
DRB-ToAddModList ::=                              SEQUENCE (SIZE (1..maxDRB)) OF DRB-
ToAddMod
DRB-ToAddModListSCG-r12 ::=           SEQUENCE (SIZE (1..maxDRB)) OF DRB-
ToAddModSCG-r12
DRB-ToAddMod ::= SEQUENCE {
  eps-BearerIdentity                              INTEGER (0..15)
    OPTIONAL,              -- Cond DRB-Setup
  drb-Identity                                    DRB-Identity,
  drb-Config                                      CHOICE {
           explicitValue                          SEQUENCE {
             pdcp-Config                          PDCP-Config
                  OPTIONAL,        -- Cond PDCP
             rlc-Config                           RLC-Config
```

```
                    OPTIONAL,               -- Cond SetupM
            logicalChannelIdentity                  INTEGER (3..10)
                    OPTIONAL,               -- Cond DRB-SetupM
            logicalChannelConfig                    LogicalChannelConfig
    OPTIONAL,           -- Cond SetupM
        },
            cfgIndex                                Integer (0..3)
    }
    ...,
    [[      drb-TypeChange-r12                      ENUMERATED
{toMCG}         OPTIONAL,       -- Need OP
            rlc-Config-v1250                        RLC-Config-v1250
    OPTIONAL            -- Need ON
    ]],
    [[      rlc-Config-v13xx                        RLC-Config-v13xx
    OPTIONAL            -- Need ON
    ]]
}
DRB-ToAddModSCG-r12 ::=         SEQUENCE {
    drb-Identity-r12                                DRB-Identity,
    drb-Type-r12                                    CHOICE {
            split-r12                                       NULL,
            scg-r12                                         SEQUENCE {
                    eps-BearerIdentity-r12                  INTEGER (0..15)
    OPTIONAL,           -- Cond DRB-Setup
                    pdcp-Config-r12                         PDCP-Config
    OPTIONAL            -- Cond PDCP-S
            }
    }
                            OPTIONAL,   -- Cond SetupS2
    rlc-ConfigSCG-r12                               RLC-Config
    OPTIONAL,           -- Cond SetupS
    rlc-Config-v1250                                RLC-Config-v1250
    OPTIONAL,           -- Need ON
    logicalChannelIdentity SCG-r12                  INTEGER (3..10)
    OPTIONAL,           -- Cond DRB-SetupS
    logicalChannelConfigSCG-r12                     LogicalChannelConfig
    OPTIONAL,           -- Cond SetupS
    ...
}
DRB-ToReleaseList ::=                           SEQUENCE (SIZE (1..maxDRB)) OF DRB-
Identity
MeasSubframePatternPCell-r10 ::=        CHOICE {
    release                                         NULL,
    setup                                           MeasSubframePattern-r10
}
NeighCellsCRS-Info-r11 ::=              CHOICE {
    release                                         NULL,
    setup                                           CRS-AssistanceInfoList-r11
}
CRS-AssistanceInfoList-r11 ::=          SEQUENCE (SIZE (1..maxCellReport)) OF CRS-
AssistanceInfo-r11
CRS-AssistanceInfo-r11 ::= SEQUENCE {
    physCellId-r11                                  PhysCellId,
    antennaPortsCount-r11                           ENUMERATED {an1, an2, an4, spare1},
    mbsfn-SubframeConfigList-r11                    MBSFN-SubframeConfigList,
    ...
}
NeighCellsCRS-Info-r13 ::=              CHOICE {
    release                                         NULL,
    setup                                           CRS-AssistanceInfoList-r13
}
CRS-AssistanceInfoList-r13 ::=          SEQUENCE (SIZE (1..maxCellReport)) OF CRS-
AssistanceInfo-r13
CRS-AssistanceInfo-r13 ::= SEQUENCE {
    physCellId-r13                                  PhysCellId,
    antennaPortsCount-r13                           ENUMERATED {an1, an2, an4, spare1},
    mbsfn-SubframeConfigList-r13                    MBSFN-SubframeConfigListOPTIONAL, --
Need ON
    ...
}
NAICS-AssistanceInfo-r12 ::=            CHOICE {
    release                                         NULL,
    setup                                           SEQUENCE {
            neighCellsToReleaseList-r12             NeighCellsToReleaseList-r12
```

-continued

```
        OPTIONAL    ,        -- Need ON
            neighCellsToAddModList-r12              NeighCellsToAddModList-r12
            OPTIONAL,   -- Need ON
            servCellp-a-r12                         P-a
                    OPTIONAL    -- Need ON
    }
}
NeighCellsToReleaseList-r12 ::=     SEQUENCE (SIZE (1..maxNeighCell-r12)) OF PhysCellId
NeighCellsToAddModList-r12 ::=      SEQUENCE (SIZE (1..maxNeighCell-r12)) OF
NeighCellsInfo-r12
NeighCellsInfo-r12 ::=              SEQUENCE {
    physCellId-r12                              PhysCellId,
    p-b-r12                                     INTEGER (0..3),
    crs-PortsCount-r12                          ENUMERATED {n1, n2, n4, spare},
    mbsfn-SubframeConfig-r12        MBSFN-SubframeConfigList
        OPTIONAL, -- Need ON
    p-aList-r12                                 SEQUENCE (SIZE (1..maxP-a-PerNeighCell-
r12)) OF P-a,
    transmissionModeList-r12        BIT STRING (SIZE(8)),
    resAllocGranularity-r12                     INTEGER (1..4),
    ...
}
P-a ::= ENUMERATED {    dB-6, dB-4dot77, dB-3, dB-1dot77,
                                                dB0, dB1, dB2, dB3}
-- ASN1STOP
```

RRC Connection Establishment Using Index-Based AS Configuration

An RRC Connection Establishment procedure can make use of the index-based AS configuration mechanisms to signal an indicator or indicators that can be used to "lookup" the set of configuration parameters used to setup SRB1 and optionally modify the MAC main configuration and/or the dedicated physical configuration. An exemplary RRC Connection Establishment signaling diagram is shown in FIG. 24.

Figure 24:
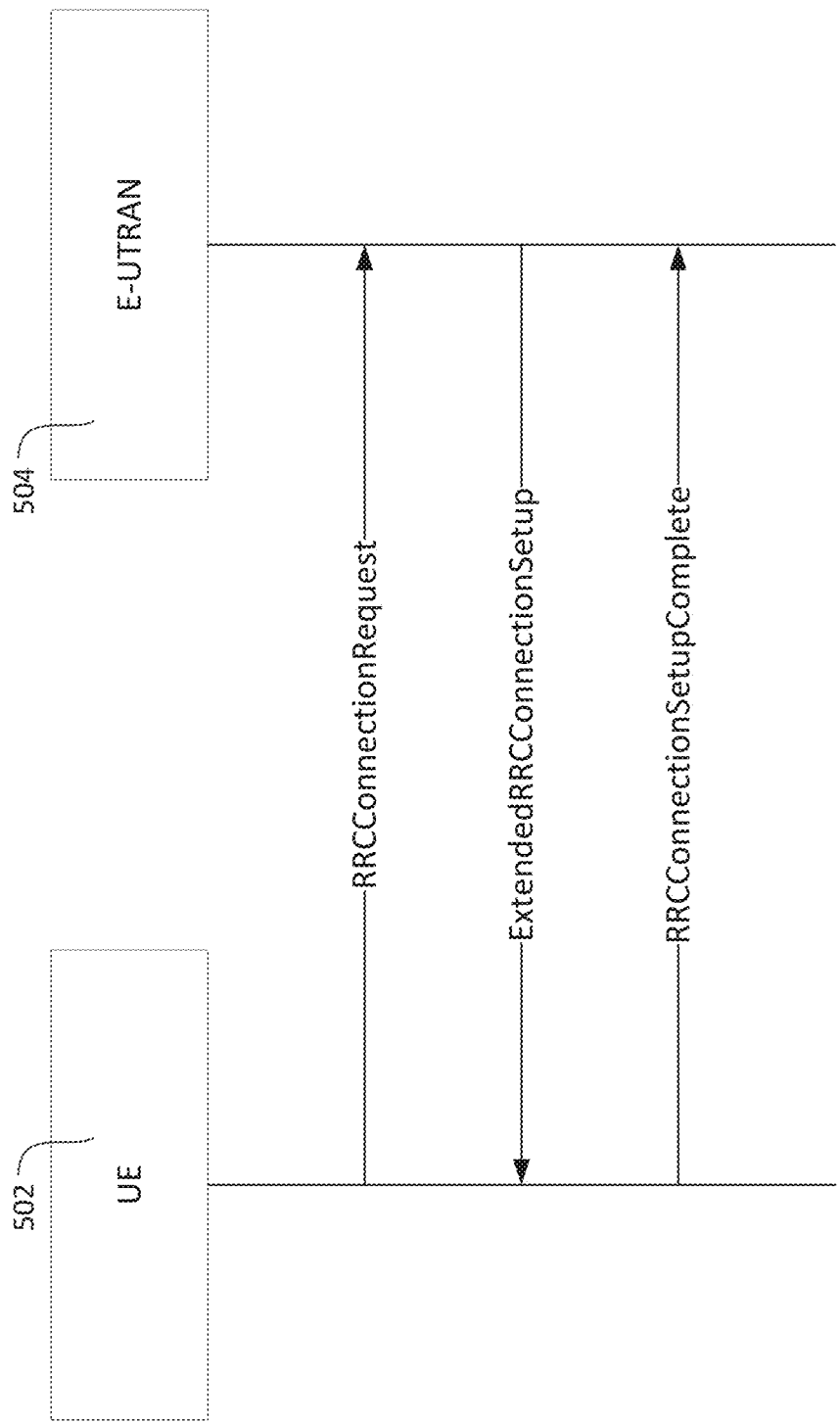
FIG. 24 is a diagram that illustrates an RRC Connection Establishment Using Index-Based AS Configuration.

It is understood that the entities performing the steps illustrated in FIG. 24 are logical entities that may be implemented in the form of software (i.e., computer-executable instructions) stored in a memory of, and executing on a processor of, an apparatus configured for wireless and/or network communications or a computer system such as those illustrated in FIGS. 32 B and F. That is, the method(s) illustrated in FIG. 24 may be implemented in the form of software (i.e., computer-executable instructions) stored in a memory of a communications apparatus, such as the apparatus or computer system illustrated in FIGS. 32 B and F, which computer executable instructions, when executed by a processor of the apparatus, perform the steps illustrated in FIG. 24. It is also understood that any transmitting and receiving steps illustrated in FIG. 24 may be performed by communication circuitry of the apparatus under control of the processor of the apparatus and the computer-executable instructions (e.g., software) that it executes.

A UE 502 requiring a light-weight connection initiates the RRC Connection Establishment procedure by transmitting an RRCConnectionRequest message to the E-UTRAN 504. The UE 502 sets the contents of the RRCConnectionRequest message and submits it to lower layers for transmission in accordance with the steps defined in section 5.3.3.3 of 3GPP TS 36.331, where the establishmentCause provided by upper layers is 'light-weight'.

The E-UTRAN 504 responds with an Extended RRCConnectionSetup message with the fields populated as shown in Table 2. Upon reception of this message, the UE 502 executes the steps defined in section 5.3.3.4 of 3GPP TS 36.331, which are modified to include the additional step(s) to "look up" the dedicated configuration parameters for SRB1, the MAC and the PHY.

TABLE 2

Contents of Extended RRCConnectionSetup Message

| Field | Value |
|---|---|
| rrc-TransactionIdentifier | 0 |
| srb1CfgIndex | 0 |
| macCfgIndex | 0 |
| phyCfgIndex | 1 |

The UE 502 responds with an RRCConnectionSetupComplete message with the contents set as described in section 5.3.3.4 3GPP TS 36.331.

RRC Connection Control Using Index-Based AS Configuration with the Extended RadioResourceConfigDedicated IE In this section, index-based UE configuration using the extended RadioResourceConfigDedicated IE is further illustrated with a connection setup example that makes use of the RRC Connection Establishment and RRC Connection Reconfiguration procedures. An exemplary signaling diagram is shown in FIG. 25.

Figure 25:
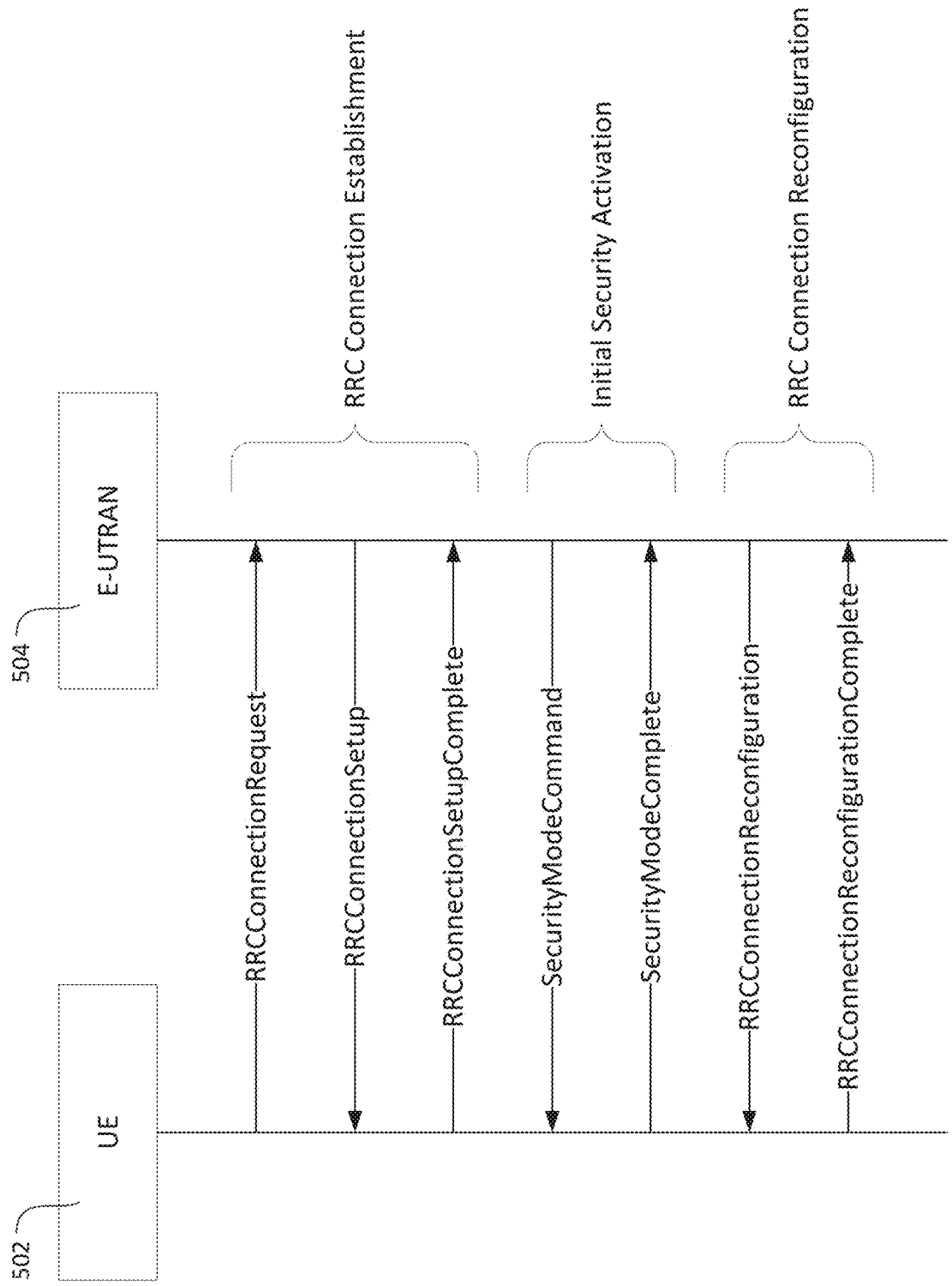
FIG. 25 is a diagram that illustrates a connection setup.

It is understood that the entities performing the steps illustrated in FIG. 25 are logical entities that may be implemented in the form of software (i.e., computer-executable instructions) stored in a memory of, and executing on a processor of, a network apparatus or computer system such as those illustrated in FIGS. 32 B and F. That is, the method(s) illustrated in FIG. 25 may be implemented in the form of software (i.e., computer-executable instructions) stored in a memory of a network apparatus, such as the apparatus or computer system illustrated in FIGS. 32 B and F, which computer executable instructions, when executed by a processor of the apparatus, perform the steps illustrated in FIG. 25. It is also understood that any transmitting and receiving steps illustrated in FIG. 25 may be performed by communication circuitry of the apparatus under control of the processor of the apparatus and the computer-executable instructions (e.g., software) that it executes.

The RRC Connection Procedure is initiated by a UE 502 requiring a light-weight connection. The UE 502 sets the contents of the RRCConnectionRequest message and submits it to lower layers for transmission in accordance with the steps defined in section 5.3.3.3 of 3GPP TS 36.331.

The E-UTRAN 504 responds with an RRCConnectionSetup message that includes the extended RadioResourceConfigDedicated IE with the fields populated as shown in Table 3. Upon reception of this message, the UE 502 executes the steps defined in section 5.3.3.4 of 3GPP TS 36.331, which are modified to include the additional step(s) to "look up" the dedicated configuration parameters for SRB1, the MAC and the PHY.

TABLE 3

Contents of Extended RadioResourceConfigDedicated
IE Signaled in RRCConnectionSetup Message

| Field | Value |
| --- | --- |
| srb-ToAddModList | |
| srb-Identity | 1 |
| srb-Config | |
| cfgIndex | 0 |
| Mac-MainConfig | |
| cfgIndex | 0 |
| physicalConfigDedicated | |
| cfgIndex | 2 |

The UE 502 responds with an RRCConnectionSetupComplete message with the contents set as described in section 5.3.3.4 3GPP TS 36.331.

If AS security needs to be established, the E-UTRAN 504 initiates the Initial Security Activity procedure in accordance with section 5.3.4 of 3GPP TS 36.331. This procedure consists of transmission of the SecurityModeCommand message from the E-UTRAN followed by transmission of the SecurityModeComplete message from the UE 502.

The E-UTRAN 504 then initiates the RRC Configuration Reconfiguration procedure to establish SRB2 and the required DRBs. This procedure consists of transmission of the RRCConnectionReconfiguration message that includes the extended RadioResourceConfigDedicated IE with the fields populated as shown in Table 3. Upon reception of this message, the UE 502 executes the steps defined in section 5.3.5.3 of 3GPP TS 36.331, which are modified to include the additional step(s) to "look up" the dedicated configuration parameters. In this example, SRB2 and a single DRB are setup using the RRC Reconfiguration procedure. The SRB1, MAC and PHY configurations are unchanged.

TABLE 4

Contents of Extended RadioResourceConfigDedicated
IE Signaled in RRCConnectionReconfiguration Message

| Field | Value |
| --- | --- |
| drb-ToAddModList | |
| drb-ToAddModList | 0 |
| drb-Identity | 1 |
| drb-Config | |
| cfgIndex | 0 |

RRC Connection Suspend-Resume Using Index-Based AS Configuration with the Extended RadioResourceConfigDedicated IE Stage 2 and Stage 3 agreements reached on NB-IOT include RRC enhancements to support efficient signaling for devices requiring frequent small data transmissions. The User Plane Solution, documented as Solution 18 in TR 23.720, realizes the signaling overhead reduction by introducing two new procedures RRC Suspend and RRC Resume.

The UE 502 initiates the RRC Connection Resume procedure by transmitting the RRCConnectionResumeRequest message. The E-UTRAN 504 responds by sending an RRCConnectionResumeComplete message. To facilitate a low overhead mechanism to reconfigure the UE 502 when resuming the RRC connection, the Extended RadioResourceConfigDedicated IE can be optionally included in this messages for devices that require reconfiguration. After "looking up" and applying the configuration, the UE 502 responds with an RRCConnectionReconfigurationComplete message to indicate the configuration was applied successfully. An exemplary signaling diagram is shown in FIG. 26.

Figure 26:
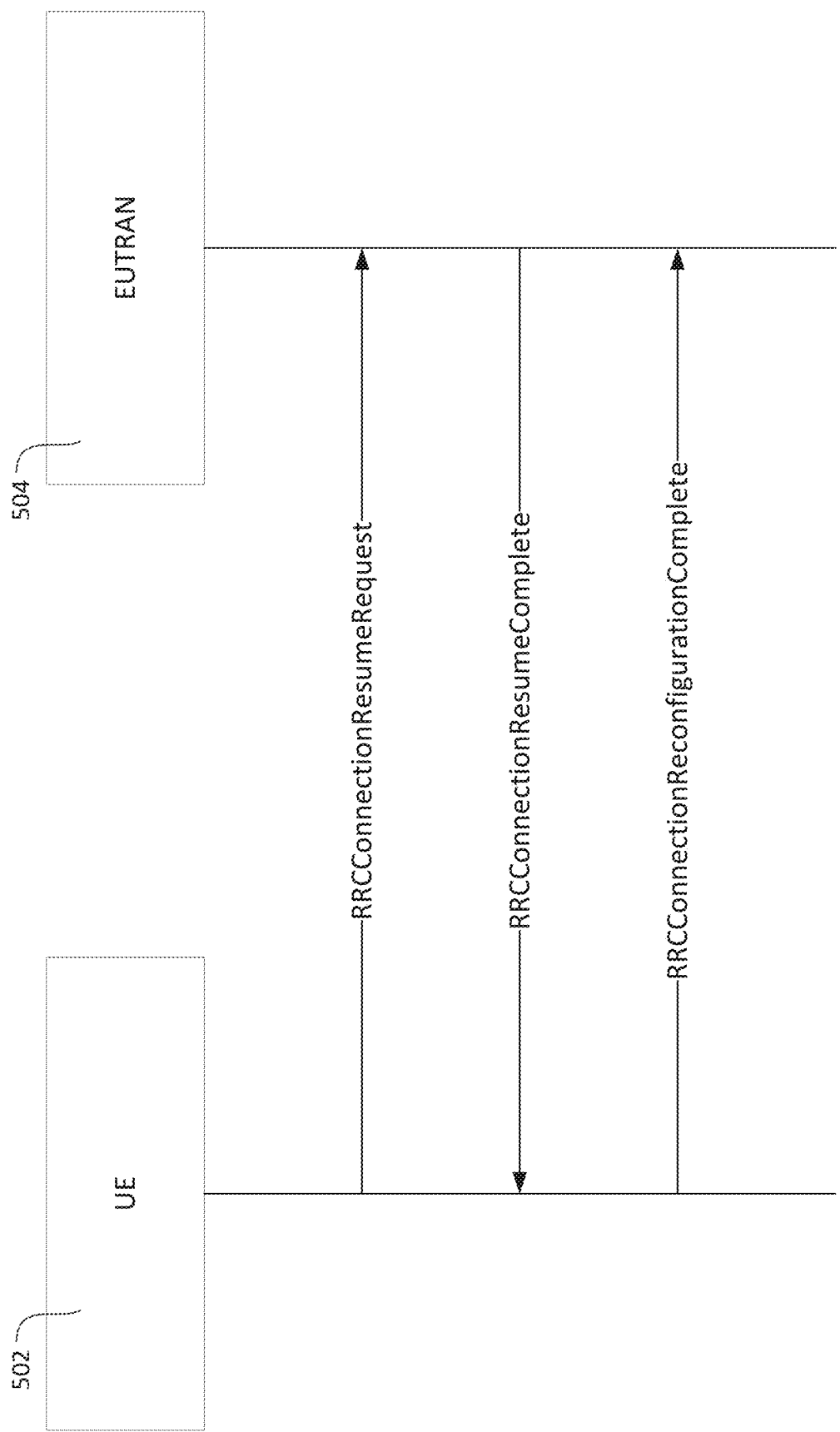
FIG. 26 is a diagram that illustrates an RRC connection resume with reconfiguration.

It is understood that the entities performing the steps illustrated in FIG. 26 may be logical entities that may be implemented in the form of software (i.e., computer-executable instructions) stored in a memory of, and executing on a processor of, an apparatus configured for wireless and/or network communications or a computer system such as those illustrated in FIGS. 32B and F. That is, the method(s) illustrated in FIG. 26 may be implemented in the form of software (i.e., computer-executable instructions) stored in a memory of an apparatus, such as the apparatus or computer system illustrated in FIGS. 32 B and F, which computer executable instructions, when executed by a processor of the apparatus, perform the steps illustrated in FIG. 26. It is also understood that any transmitting and receiving steps illustrated in FIG. 26 may be performed by communication circuitry of the apparatus under control of the processor of the apparatus and the computer-executable instructions (e.g., software) that it executes.

While the proposed solution is described in terms of SRB or DRB system parameters reconfiguration, the solution is equally applicable to reconfiguration of data flow or reconfiguration of IP flow, or any other reconfiguration of system parameters that can be used to configure the protocol stack (including the PHY)_in each node of the system (including the UE 502) without having to explicitly signal all or nearly all the configuration parameters over the air interface.

Triggers and Procedures for Switching Between Light-Weight Connection and Legacy Connection Trigger for Establishing a Light-Weight Connection In this section, the triggers for establishing a light-weight signaling connection are described. In one embodiment, the UE 502 higher layers determine the connection type based on the amount of data, traffic profile, etc. For data packets with a size below a given threshold or for specific traffic profiles, higher layers command the lower layers to establish a light-weight signaling connection. The lower layers may then use one of the mechanisms described above to establish the light-weight connection.

Figure 27:
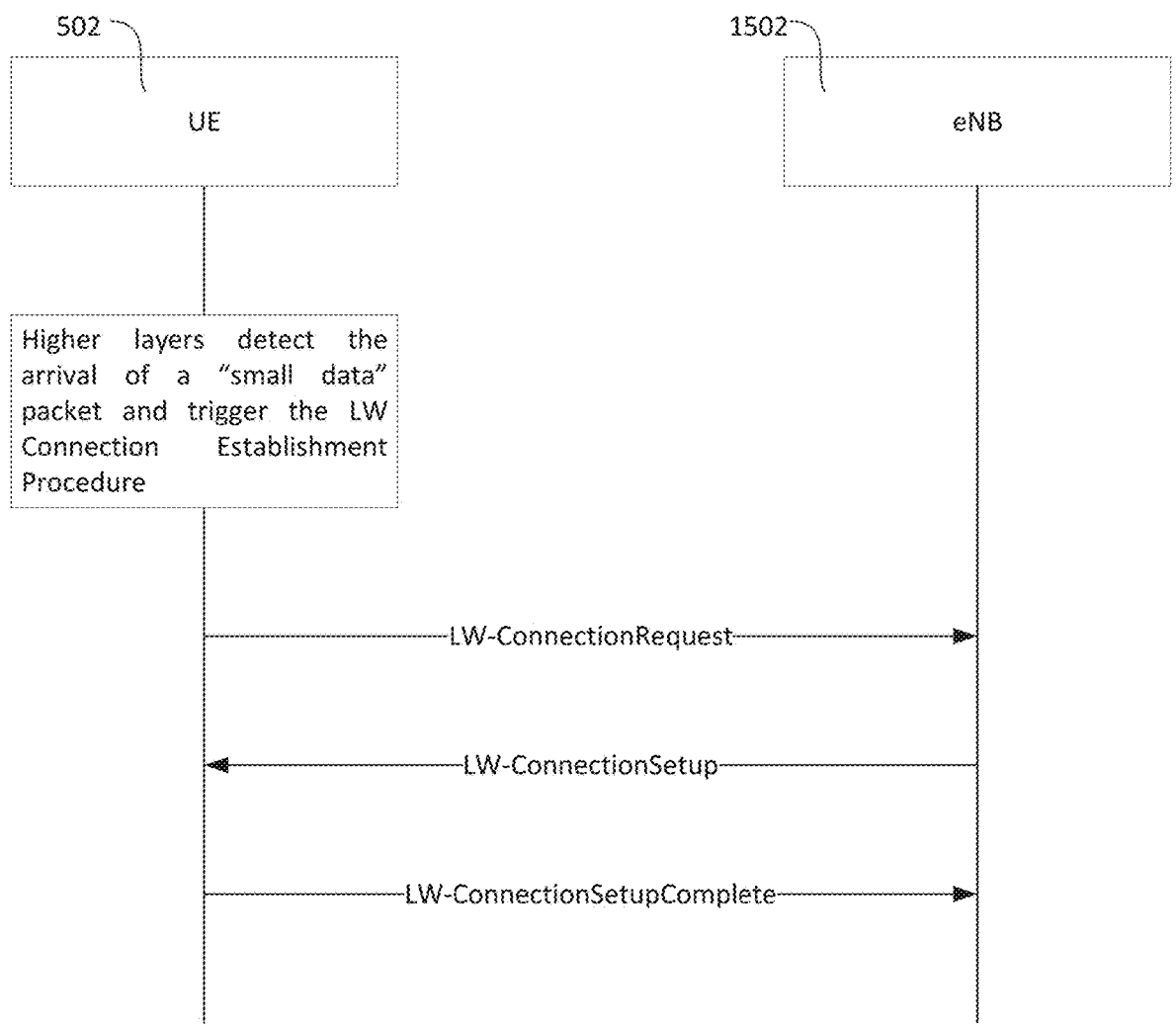
FIG. 27 is a diagram that illustrates triggering of Light-Weight (LW) connection establishment.

FIG. 27 is an exemplary signaling diagram that shows the triggering of the LW Connection Establishment procedure in response to the arrival of a "small data" packet.

It is understood that the entities performing the steps illustrated in FIG. 27 are logical entities that may be implemented in the form of software (i.e., computer-executable instructions) stored in a memory of, and executing on a processor of, a network apparatus or computer system such as those illustrated in FIGS. 32 B and F. That is, the method(s) illustrated in FIG. 16 may be implemented in the form of software (i.e., computer-executable instructions) stored in a memory of a network apparatus, such as the apparatus or computer system illustrated in FIGS. 32 B and F, which computer executable instructions, when executed by a processor of the apparatus, perform the steps illustrated in FIG. 27. It is also understood that any transmitting and receiving steps illustrated in FIG. 27 may be performed by communication circuitry of the apparatus under control of the processor of the apparatus and the computer-executable instructions (e.g., software) that it executes.

Figure 28:
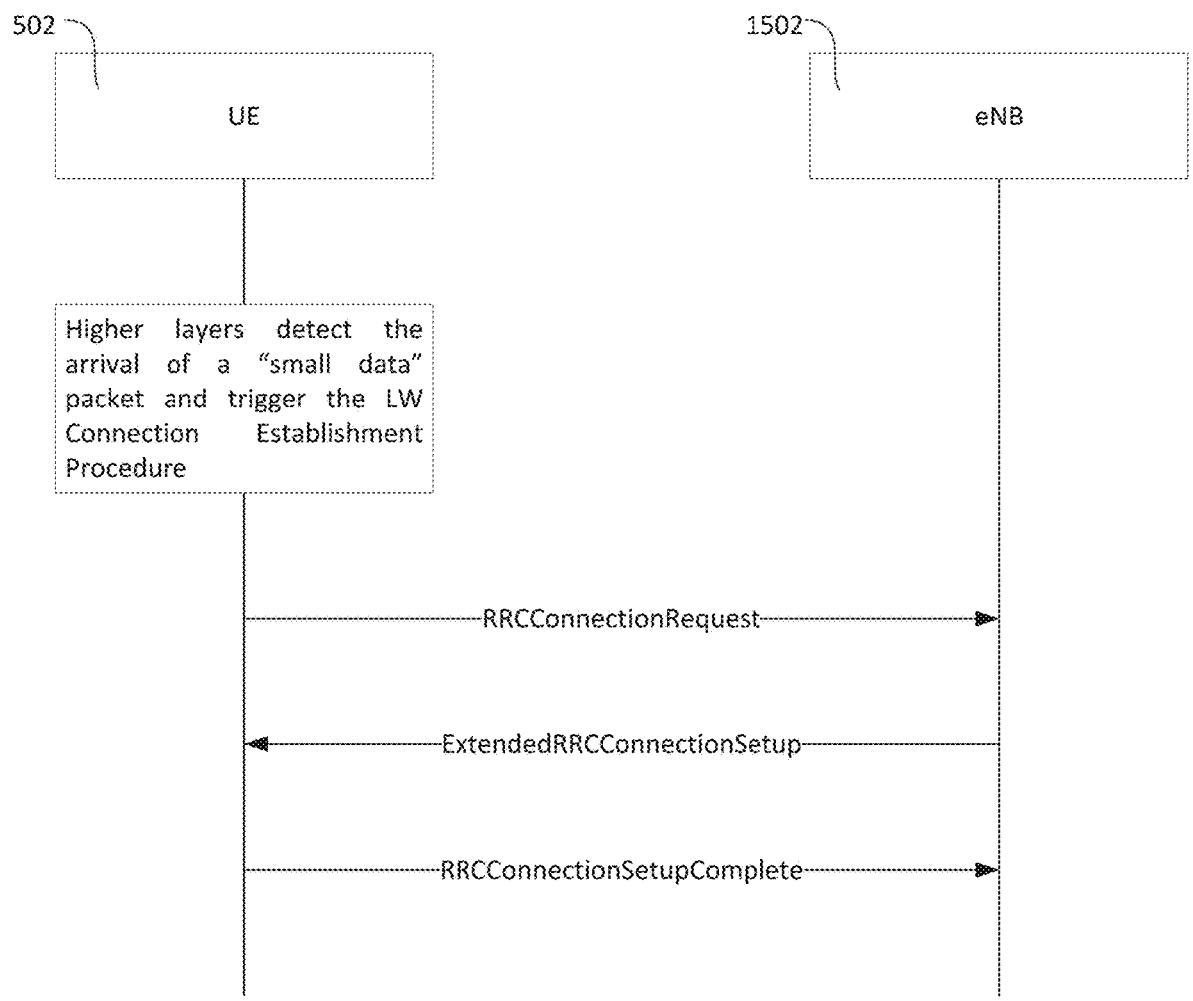
FIG. 28 is a diagram that illustrates triggering of RRC connection establishment using index-based AS configuration

The same triggering mechanisms may also be used for UEs supporting the index-based AS configuration mechanisms. FIG. 28 is an exemplary signaling diagram that shows the triggering of the RRC Connection Establishment Using Index-Based AS Configuration procedure in response to the arrival of a "small data" packet. In this embodiment of the solution, the establishmentCause is set to 'light-weight' by higher layers and then signaled in the RRCConnectionRequest message.

It is understood that the entities performing the steps illustrated in FIG. 28 are logical entities that may be implemented in the form of software (i.e., computer-executable instructions) stored in a memory of, and executing on a processor of, a network apparatus or computer system such as those illustrated in FIGS. 32 B and F. That is, the method(s) illustrated in FIG. 28 may be implemented in the form of software (i.e., computer-executable instructions) stored in a memory of a network apparatus, such as the apparatus or computer system illustrated in FIGS. 32 B and F, which computer executable instructions, when executed by a processor of the apparatus, perform the steps illustrated in FIG. 28. It is also understood that any transmitting and receiving steps illustrated in FIG. 28 may be performed by communication circuitry of the apparatus under control of the processor of the apparatus and the computer-executable instructions (e.g., software) that it executes.

Switching Between Light-Weight and Legacy Connections

In this section, a procedure that may be used to switch between light-weight and legacy connections for UEs that have established an RRC connection is described.

The RRC Connection Reconfiguration procedure can be used to modify an existing RRC connection. An Extended RadioResourceConfigDedicated IE can include configuration index fields that may be optionally provided to devices that require light-weight connections. The Extended RadioResourceConfigDedicated IE in the RRCConnectionReconfiguration message can trigger a switch between light-weight and legacy connections.

Figure 29:
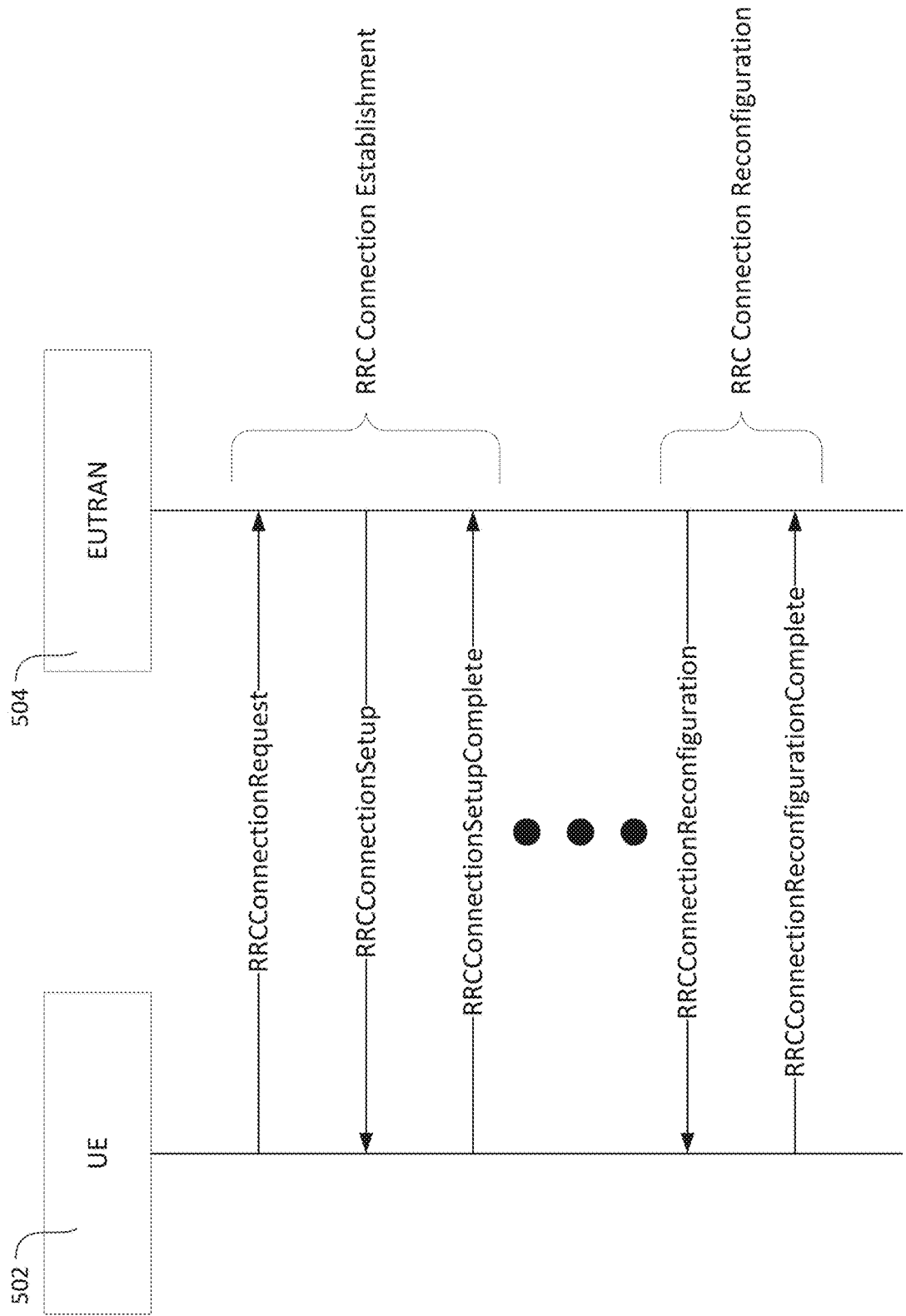
FIG. 29 is a signaling diagram that illustrates switching between light-weight and legacy connections

An exemplary signaling diagram for switching between light-weight and legacy connections is shown in FIG. 29, where the RRC Configuration Reconfiguration procedure is assumed to be initiated at some time in the future, but while the connection is still established.

It is understood that the entities performing the steps illustrated in FIG. 29 are logical entities that may be implemented in the form of software (i.e., computer-executable instructions) stored in a memory of, and executing on a processor of, a network apparatus or computer system such as those illustrated in FIGS. 32 B and F. That is, the method(s) illustrated in FIG. 29 may be implemented in the form of software (i.e., computer-executable instructions) stored in a memory of a network apparatus, such as the apparatus or computer system illustrated in FIGS. 32 B and F, which computer executable instructions, when executed by a processor of the apparatus, perform the steps illustrated in FIG. 29. It is also understood that any transmitting and receiving steps illustrated in FIG. 29 may be performed by communication circuitry of the apparatus under control of the processor of the apparatus and the computer-executable instructions (e.g., software) that it executes.

Switch from Light-Weight to Legacy Connection

In this scenario, the UE 502 establishes a light-weight connection in accordance with the RRC Connection Establishment Using Index-Based AS Configuration procedure.

At some time in the future, but while the light-weight connection is still established, the E-UTRAN 504 signals the UE 502 to use a legacy connection by initiating the RRC Connection Reconfiguration procedure, where the RRCConnectionReconfiguration message transmitted by the E-UTRAN 504 makes use of the legacy mechanisms in the Extended RadioResourceConfigDedicated IE to signal the configuration to the UE 502. Alternatively, the legacy RadioResourceConfigDedicated IE could be used to signal the configuration to the UE 502.

Upon reception of this message, the UE 502 executes the steps defined in section 5.3.5.3 of 3GPP TS 36.331. After successfully applying the new configuration, the UE 502 transmits the RRCConnectionReconfigurationComplete message.

The E-UTRAN 504 may initiate RRC Connection Reconfiguration procedure at a later time to switch back to a light-weight connection.

Switch from Legacy to Light-Weight Connection

In this scenario, the UE 502 establishes a legacy connection in accordance with the RRC Connection Establishment procedure described in section 5.3.3.3 of 3GPP TS 36.331, where the establishmentCause provided by upper layers is set to a value other than 'light-weight'.

At some time in the future, but while the legacy connection is still established, the E-UTRAN 504 signals the UE 502 to use a light-weight connection by initiating the RRC Connection Reconfiguration procedure, where the RRCConnectionReconfiguration message transmitted by the E-UTRAN 504 includes the Extended RadioResourceConfigDedicated IE with the fields populated as shown in Table 1. Upon reception of this message, the UE 502 executes the steps defined in section 5.3.5.3 of 3GPP TS 36.331, which are modified to include the additional step(s) to "look up" the dedicated configuration parameters. After successfully applying the new configuration, the UE 502 transmits the RRCConnectionReconfigurationComplete message.

The E-UTRAN 504 may initiate RRC Connection Reconfiguration procedure at a later time to switch back to a legacy connection.

Switching Between Light-Weight and Legacy Connections During Connection Resume

For UEs supporting the Connection Suspend/Resume procedures described in 3GPP TS 23.401, the RRCConnectionResume message can be extended to include a field to indicate if a switch from a light-weight connection to a legacy connection or vice versa is required. An exemplary signaling diagram is shown in FIG. 30.

Figure 30:
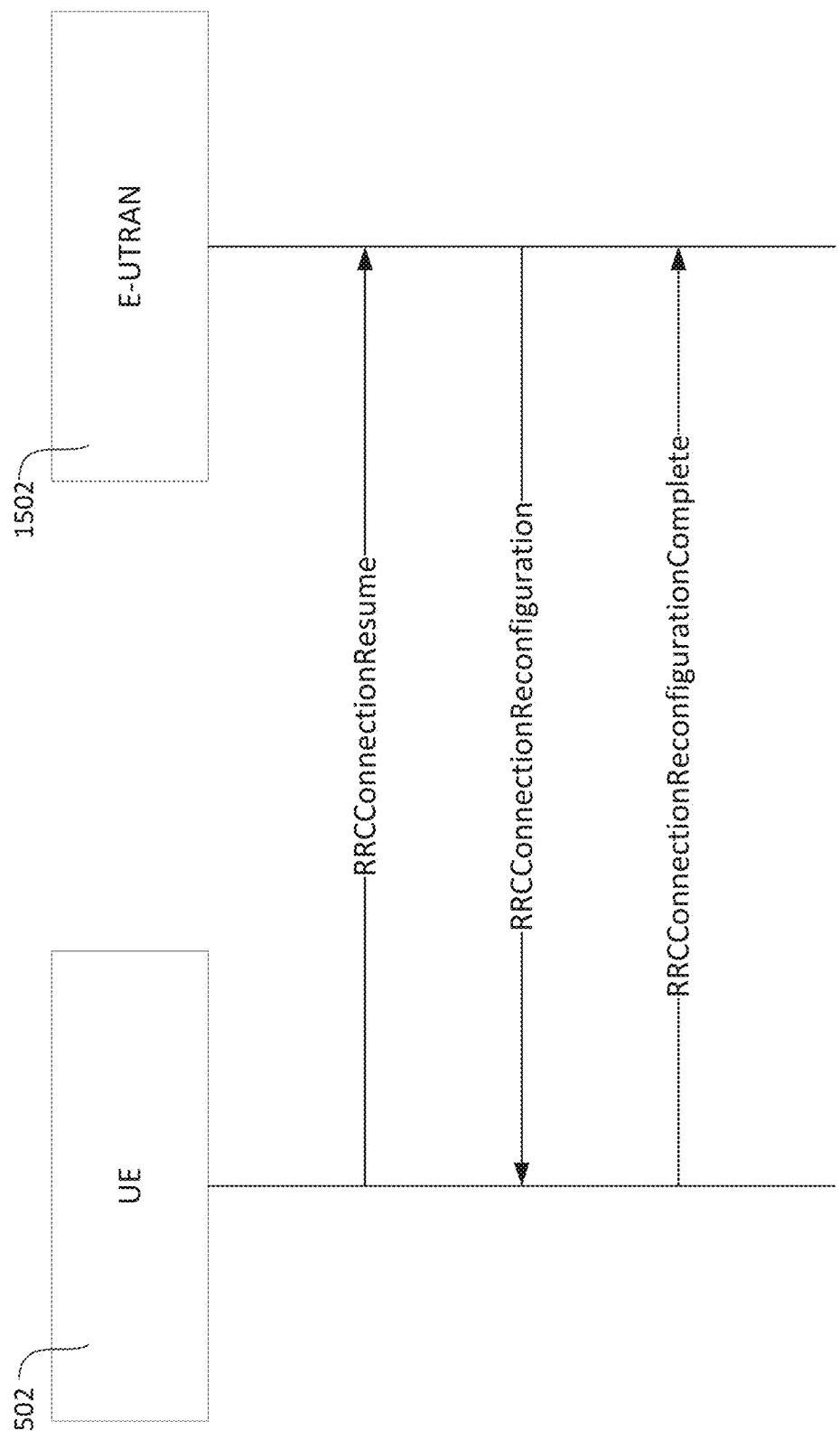
FIG. 30 is a signaling diagram that illustrates switching between light-weight and legacy connections during connection resume.

It is understood that the entities performing the steps illustrated in FIG. 30 are logical entities that may be implemented in the form of software (i.e., computer-executable instructions) stored in a memory of, and executing on a processor of, a network apparatus or computer system such as those illustrated in FIGS. 32 B and F. That is, the method(s) illustrated in FIG. 30 may be implemented in the form of software (i.e., computer-executable instructions) stored in a memory of a network apparatus, such as the apparatus or computer system illustrated in FIGS. 32 B and F, which computer executable instructions, when executed by a processor of the apparatus, perform the steps illustrated in FIG. 30. It is also understood that any transmitting and receiving steps illustrated in FIG. 30 may be performed by communication circuitry of the apparatus under control of the processor of the apparatus and the computer-executable instructions (e.g., software) that it executes.

When the E-UTRAN 504 receives an RRCConnectionResume message with this indicator, it responds with an RRCConnectionReconfiguration message with the new configuration parameters. When switching from a light-weight connection to a legacy connection, the E-UTRAN 504 makes use of the legacy mechanisms in the Extended RadioResourceConfigDedicated IE to signal the configuration to the UE 502. Alternatively, the legacy RadioResourceConfigDedicated IE could be used to signal the configuration to the UE 502. When switching from a legacy connection to a light-state connection, the E-UTRAN 504 makes use of the new configuration index fields in the Extended RadioResourceConfigDedicated IE. After successfully applying the new configuration, the UE 502 transmits the RRCConnectionReconfigurationComplete message.

With respect to SI, as described above, it has not been addressed whether all "cells"/TRPs periodically broadcast the minimum; whether the minimum SIs is broadcasted periodically in every cell on which a UE can camp; whether there are cells in the system where the UE cannot camp; or whether the UE should be allowed to camp on a cell that doesn't broadcast the minimum SIs. With respect to these questions, as used herein, the term serving cell is used to denote the cell the UE is camped on, or the cell serving the UE in RRC INACTIVE CONNECTED state or the cell serving the UE in RRC CONNECTED state. As a general design principle, it is recognized herein that the system information distribution should be flexible to ensure future proofness and smooth introduction of new services and features. With beamforming, the system information transmission overhead (time/frequency resources) is N times the overhead of transmission without beamforming. The overhead of SI transmission even when only minimum SI is periodically broadcasted might still be significant for always broadcast. In addition, control plane latency including system access latency, a key KPI to consider will be much more stringent than that of the current cellular systems for many targeted use cases.

It is recognized herein that solutions that are flexible enough to scale and adapt to various deployment scenarios across the many verticals targeted by the NR should be considered. Some SIs may be common across cells, the UE might not be required to re-acquire these common SIs as it moves across cells. Similarly, the network (Cells/TRPs) should have the flexibility to avoid redundant SI transmission within localized geographical areas and not be required to periodically broadcast the minimum SI. Upon mobility even, initial cell selection or cell reselection, the UE determines if the minimum system information stored previously either through pre-configuration or acquired from previously visited cells are still valid. If the UE determined the stored minimum system information to be valid, the UE may re-used the previously stored minimum system information to evaluate the newly detected cell and decide whether the UE is allowed or not to access the cell. All "cells/TRPs" are not required to periodically broadcast the minimum SI. The NR system may include cells that provides system information on behalf of some other cells.

A cell broadcasting System information for e.g. minimum SIs (may be multiple minimum SIs configuration set) or other SIs (may be multiple other SIs configuration sets) may also broadcast additional information on the applicability of the broadcasted SI. Such information may include one or more of the following, for example and without limitation:

The identities of cells, or TRPs, or geographical area composed of multiple cells e.g. SIB validity area or SIB validity zone. The UE may use the received identities to identify the cells where the received SIs for e.g. minimum SIs apply. Furthermore the UE may use the received identity might not be cell identity or TRP identity. In such case, the UE may use the received identity to derive or retrieve the identity of the cells to which the received SIs (minimum SI or other SI) applies.

The frequencies/frequency bands to which the broadcasted SIs applies. For e.g. the UE may use this information to determine whether or not the received/stored system information applies to cells detected on a given frequency layer. The cell may also provide an indication together with the frequency/band information that excludes certain cells from a frequency layer to which a system information applies. Such indication may be for e.g. cell Physical Cell Identity (PCI).

The validity time/period of the system information. With this parameter, a cell broadcasting system information (e.g. minimum SI), may indicates the duration of the validity of the system information and/or the time period of the day where the system information applies. Furthermore, the cell may provide the time/period information at the granularity level of cell, TRP or frequency where the system information applies. Alternatively, the cell may provide the validity time/period information globally i.e. applicable to all cells and/or frequencies/bands where the system information applies.

The UE may use one or more of the information above to determine the applicability of the received/stored system information (e.g., minimum SI or other SI).

In some cases, the UE needs to be able to determine unambiguously whether it may camp on a detected cell and whether/how it may access it. The minimum SI content may at least include information to support cell selection, for acquiring other SI, for accessing the cell. Therefore, a UE that has a valid minimum SI for a detected cell, may have the necessary information to determine unambiguously whether it may camp on that cell and whether/how it may access it. However, in an example, the minimum SI the UE uses to camp on a cell may not be broadcasted by that cell. This information may be a stored SI that the UE has previously acquired for e.g. from an overlay cell or the UE is pre-configured with through other means. For e.g. an overlay macro cell operating on a low frequency range (e.g. NR cell or LTE cell) may be used to provide minimum SI applicable to underlay micro/pico cells operating on high frequency range.

In LTE, purposes for camping on a cell in idle mode includes the following, for example:

It enables the UE to receive system information from the PLMN ("objective a").

When registered and if the UE wishes to establish an RRC connection, it can do this by initially accessing the network on the control channel of the cell on which it is camped ("objective b").

It allows the PLMN to know (in most cases) for the registered UE, the set of tracking areas in which the UE is camped. The network can therefore page the UE on the control channels of all the cells in this set of tracking areas and the UE can respond on the control channel of the cell on which it is camped ("objective c").

It enables the UE to receive ETWS and CMAS notifications ("objective d").

It enables the UE to receive MBMS services ("objective e").

It is recognized herein that one or more of the above objectives for camping are likely to also be applicable for NR. For one objective ("objective a"), the UE must be able to continue to monitor the system information and acquire any required update once it has camped on a cell. Assuming the cell serving cell (i.e. the cell the UE is camped on) is not broadcasting the minimum SI, the UE still needs to know when there is a change to the previously acquired/stored minimum SI and then acquire the update from another cell. The UE may learn about change of minimum SI from a cell (e.g. overlay cell) providing minimum SI applicable to the serving cell (e.g. underlay cell), or the UE may learn about the change directly from the serving cell, even if this cell is not broadcasting the minimum SI. An approach similar to that used in Long Term Evolution (LTE) system for notification of system information change (e.g. concept of modification period & paging, value tag) may be used. For example, if the concept of modification period and paging is used, the UE will receiving a paging message that notifies the UE of the change of the System information (for e.g. minimum SI change). The non-serving cell providing system information (e.g. minimum SI) on behalf of the cell serving cell (for e.g. cell the UE is camping on or cell serving the UE in RRC inactive connected state or RRC connected state) pages the UE. Alternatively, the serving cell may directly page the UE for system information change notification. The non-serving cell may indicate in the system information (e.g. minimum SI), where (e.g. which cell, carrier) the UE should monitor system information change notification on. The serving cell may also indicate to the UE where (e.g. which cell, carrier) the UE should monitor system information change notification on. The UE may use this information to determine on which cell, on which cell and/or carrier and/or frequency and or/band the UE may monitor for system information paging notification.

Upon receiving the change notification, the UE then acquires from a non-serving cell, the new system information (e.g. minimum SI) or update to the system information (e.g. update to minimum SI) at the next modification period boundary.

If the concept of value tag is used, the UE may receive a value tag that notifies the UE of the change of the System information (for e.g. minimum SI change). This might be the case, for example, if the UE was out of coverage or at power-up. The non-serving cell providing system information (e.g. minimum SI) on behalf of the cell serving cell (for e.g. cell the UE is camping on or cell serving the UE in RRC inactive connected state or RRC connected state) signals the value tag to the UE. Alternatively, the serving cell may directly signal the value tag to the UE for system information change notification. The value tag may be an integer from a predefined integer range values. The value tag may indicate a change without further detail on the exact change. Alternatively value tag may be defined per system information SI message. In this case the UE may use the value tag to identify the SI that has changed and make the determination of whether or not to acquire an update. The non-serving cell may indicate in the system information (e.g. minimum SI), where (e.g. which cell, carrier) the UE should monitor system information change value tag on. The serving cell may also indicate to the UE where (e.g. which cell, carrier) the UE should monitor system information change value tag on. The UE may use this information to determine on which cell, on which cell and/or carrier and/or frequency and or/band the UE may monitor for system information change notification. The compare the received value tag to the stored value tag. If the value tags doesn't match, the UE acquire the updated system information (e.g., minimum SI) from a non-serving cell.

In case the notification of change is provided from a cell other than the serving cell, there might be an additional power consumption penalty as oppose to the scenario where the change notification is provided by the serving cell. In either case, the UE will acquire the update to the minimum SI from another cell. Furthermore, once the UE is notified of system information change, acquiring system information update from a cell other than the serving cell may also require the UE to perform additional steps compare to the scenario where the minimum SI is broadcast by the serving cell, such as detection and DL synchronization on that non-serving cell. These extra tasks might translate into additional power consumption penalty but this is likely outweigh by the UE power consumption penalty should the UE have to require minimum SI on underlay micro/pico cells. In this regard, it should be noted that in a deployment of overlay cells and underlay cells, beamforming in underlay cells may be more extensive than in overlay cell which means there is a potential UE power consumption penalty in receiving minimum SI on underlay cells even in just one-to-one comparison with overlay macro cells. Furthermore, the additional UE power consumption penalty may be avoided if the UE already has multiple version of stored minimum SIs possibly together with associated value tags and/or minimum SI indexes where each index point to a minimum SI configuration in the system information table. Upon minimum SI change notification (possibly from the serving cell), the UE may retrieve from its set of stored set of minimum SIs, the updated minimum SI without needs to detect or synchronized on a non-serving cell. In this case, the system information change notification received by the UE from the network may include an index that point to the new system information configuration in the system information configuration table already stored by the UE. In one embodiment, the network may actually use only this index to indicate system information change. The index may be provided by the non-serving cell or the serving cell. The UE use the received index to retrieve from its system information configuration table, the updated system information. For e.g. in the case of system information change via the use of value tag, the value tag may actually be the system information configuration index that point to system information configuration in the system information configuration table. The UE start using immediately the new system information. In the case of system information change via the use of modification period and change notification via paging, after receiving the index of the updated system information configuration, the UE may start using the new system information (e.g. minimum SI) from the next modification period boundary.

At least for deployment consisting of overlay macro cells (e.g. LTE cells) with underlay micro/pico cells where beamforming is extensively used in the under micro/pico cells, it is recognized herein that there are benefits in allowing UE to camp on cells that don't broadcast the Minimum SI in terms of network energy efficiency, interference reduction, shorter system access latency with little or no power consumption penalty to the UE. The UE may camp on a cell not broadcasting the minimum SI, for e.g. if the UE has a valid minimum SI for the cell UE is deciding to camp on, the UE may camp on that cell after a successful evaluation of the suitability of the cell.

Turning now to another UE camping objective ("objective b"), taking LTE design as a baseline, regardless of whether or not the minimum SI is broadcasted by the cell the UE camps on, assuming the UE has valid system information, once the UE acquire DL synchronization with the serving cell and has knowledge of the serving PCI, the UE knows the CRS. From this point on, and like any other UE which would have had similar set of information in a cell broadcasting the minimum SI, the UE has knowledge of the necessary control channels to initial RRC connection establishment and so this objective can be fulfilled by UE that camps on a cell not broadcasting minimum SI. When the UE camps on a cell not broadcasting minimum SI, the UE may use configuration information from the stored minimum SI to construct and initiate RRC connection establishment.

Regarding UE camping objective c, the UE may use configuration information from the stored minimum SI to construct and perform location registration. The PLMN may derived the set of tracking areas in which the UE is camped from the location registration message. The UE may monitor paging from the cell the UE is camped on by monitoring P-RNTI within PDCCH (or NR equivalent control channel) of subframe that belongs to paging occasion. The paging configuration including the serving cell DRX configuration parameters for e.g. cell level DRX cycle may be include in the minimum SI. The UE may use DRX configuration form minimum SI to calculate paging frames and paging occasions. The serving cell paging configuration parameter may also be signaled to the UE in the other SI information. In this case, the information received in other SI override the one received in minimum SI.

Turning now to yet another UE camping objective ("objective e"), the system information required to acquire the MBMS control information can be considered other SI. UE may obtain other SI from network either via broadcast signaling or dedicated signaling. As a result, the UE can received MBMS control information from the serving cell regardless of whether or not Minimum SI is broadcasted by the cell. The UE may request MBMS control information as other SI information.

Another open issue recognized herein is whether there are cells in the system where the UE cannot camp.

In LTE, a barred cell is a cell a UE is not allowed to camp on, and a cell is barred if it is so indicated in the system information. For e.g. in LTE, the network can indicate that a cell is barred in SIB1 (for access to all UE) if the cell is under maintenance. In NR, like in LTE, the operator may have need to bar a cell so that no UE can camp on that cell for operator specific reasons (e.g., network maintenance reason), regardless of system information distribution scheme. Whether the Cell is barred or not barred may be signaled to the UE as part of minimum SI. In some cases, the UE should not camp on an NR cell, if the cell is indicated as barred in the minimum SI.

User equipment (UE) 502 can be any device used by an end-user to communicate. It can be a hand-held telephone, a laptop computer equipped with a mobile broadband adapter, or any other device. For example, the UE 502 can be implemented as the wireless transmit/receive units (WTRUs) 102 (such as 102a, 102b, 102c, and/or 102d) of FIGS. 32 A-F.

Radio Access nodes can include Node B, eNode B, 5G RAN nodes or any other node to provide access, which could be either located in the control plane, or in the user plane, and could be located in a centralized location (e.g. data center, cloud, i.e. central controller or central unit in support of virtualization) or could be located at the edge of the RAN as a distributed RAN unit for e.g. a Transmit Reception Point (TRP) with RAN functions located at the edge of the RAN. Radio access nodes (radio access nodes 103/1004/105) can be implemented as one of the apparatus of FIGS. 32 A-F.

Similarly, core/control nodes can include MME, 5G CN control node, 5G network control entity, control unit located in the control plane, S-GW, P-GW or 5G core network equivalent node, 5G core network gateway or user data processing unit located in the data plane or user plane. Core/control nodes (core network 106/107/109) can be implemented as one of the apparatus of FIGS. 32 A-F.

Interfaces, such as Graphical User Interfaces (GUIs), can be used to assist user to control and/or configure functionalities related to efficient system information provisioning in common areas.

Figure 31A:
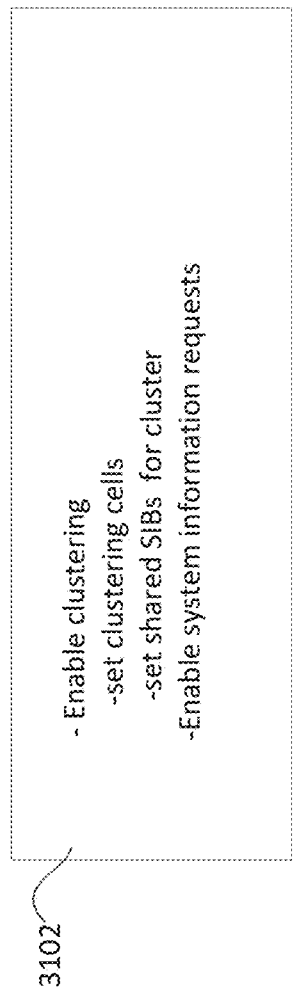
FIG. 31A-B are diagrams of Graphical User Interfaces.

FIG. 31A is a diagram that illustrates an interface 3102 that allows a user to enable/view clustering, set/view clustering cells, set/view shared SIBs for a cluster and enable system information requests. It is to be understood that interface 3102 can be produced using displays such as those shown in FIGS. 32 B and F described below.

Figure 31B:
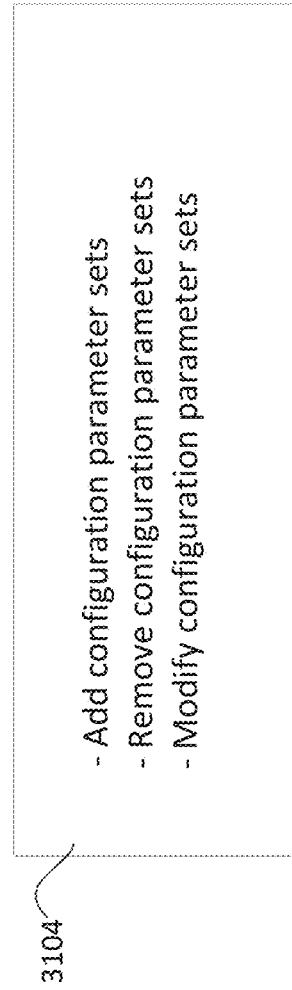

FIG. 31B is a diagram that illustrates an interface 3104 that allows a user to update parameters corresponding to an index value. For example, interface 3104 may be used to add to the UE configuration parameter sets database, one or more configuration parameter sets. Similarly, interface 3104 may be used to remove from the UE 502 configuration parameter sets database, one or more configuration parameter sets. Interface 3104 may also be used to modify an existing configuration parameter set in the UE 502 configuration parameter sets database. It is to be understood that interface 3104 can be produced using displays such as those shown in FIGS. 32 B and F described below.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to affect the methods described herein. As used herein, the terms "apparatus," "network apparatus," "node," "device," and "network node" may be used interchangeably. The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

FIG. 32A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of apparatus or device configured to operate and/or communicate in a wireless environment. Although each WTRU 102a, 102b, 102c, 102d is depicted in FIGS. 32A-32E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (remote radio heads) 118a, 118b and/or TRPs (transmission and reception points) 119a, 119b to facilitate access to one or more communication networks, such as the core network 106/107/109, the Internet 110, and/or the other networks 112. RRHs 118a, 118b may be any type of device configured to wirelessly interface with at least one of the WTRUs 102c, to facilitate access to one or more communication networks, such as the core network 106/107/109, the Internet 110, and/or the other networks 112. TRPs 119a, 119b may be any type of device configured to wirelessly interface with at least one of the WTRUs 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b* and TRPs 119*a*, 119*b* in the RAN 103*b*/104*b*/105*b* and the WTRUs 102*c*, 102*d*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c*, or RRHs 118*a*, 118*b* and TRPs 119*a*, 119*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A). In the future, the air interface 115/116/117 may implement 3GPP NR technology.

In an embodiment, the base station 114*a* and the WTRUs 102*a*, 102*b*, 102*c*, or RRHs 118*a*, 118*b* and TRPs 119*a*, 119*b* in the RAN 103*b*/104*b*/105*b* and the WTRUs 102*c*, 102*d*, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 32A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114*c* and the WTRUs 102*e*, may implement a radio technology such as IEEE 802.11 to establish a wireless local area network (WLAN). In an embodiment, the base station 114*c* and the WTRUs 102*d*, may implement a radio technology such as IEEE 802.15 to establish a wireless personal area network (WPAN). In yet an embodiment, the base station 114*c* and the WTRUs 102*e*, may utilize a cellular-based RAT (e.g., WCDMA, CDMA2000, GSM, LTE, LTE-A, etc.) to establish a picocell or femtocell. As shown in FIG. 32A, the base station 114*b* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication.

Although not shown in FIG. 32A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d*, 102*e* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103*b*/104*b*/105 or a different RAT.

Some or all of the WTRUs 102*a*, 102*b*, 102*c*, 102*d* in the communications system 100 may include multi-mode capabilities, e.g., the WTRUs 102*a*, 102*b*, 102*c*, 102*d*, and 102*e* may include multiple transceivers for communicating with different wireless networks over different wireless links. For example, the WTRU 102*e* shown in FIG. 32A may be configured to communicate with the base station 114*a*, which may employ a cellular-based radio technology, and with the base station 114*c*, which may employ an IEEE 802 radio technology.

FIG. 32B is a block diagram of an example apparatus or device configured for wireless communications in accordance with the embodiments illustrated herein, such as for example, a WTRU 102. As shown in FIG. 32B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 32B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 32B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in an embodiment, the transmit/receive element 122 may be an antenna configured to transmit and/or receive RF signals. In an embodiment, the transmit/receive Although not shown in FIG. 32A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102*a*, 102*b*, 102*c*, 102*d* in the communications system 100 may include multi-mode capabilities, e.g., the WTRUs 102*a*, 102*b*, 102*c*, and 102*d* may include multiple transceivers for communicating with different wireless networks over different wireless links. For example, the WTRU 102*c* shown in FIG. 32A may be configured to communicate with the base station 114*a*, which may employ a cellular-based radio technology, and with the base station 114*b*, which may employ an IEEE 802 radio technology.

FIG. 32B is a block diagram of an example apparatus or device configured for wireless communications in accordance with the embodiments illustrated herein, such as for example, a WTRU 102. As shown in FIG. 32B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 32B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 32B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 32B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 32C:
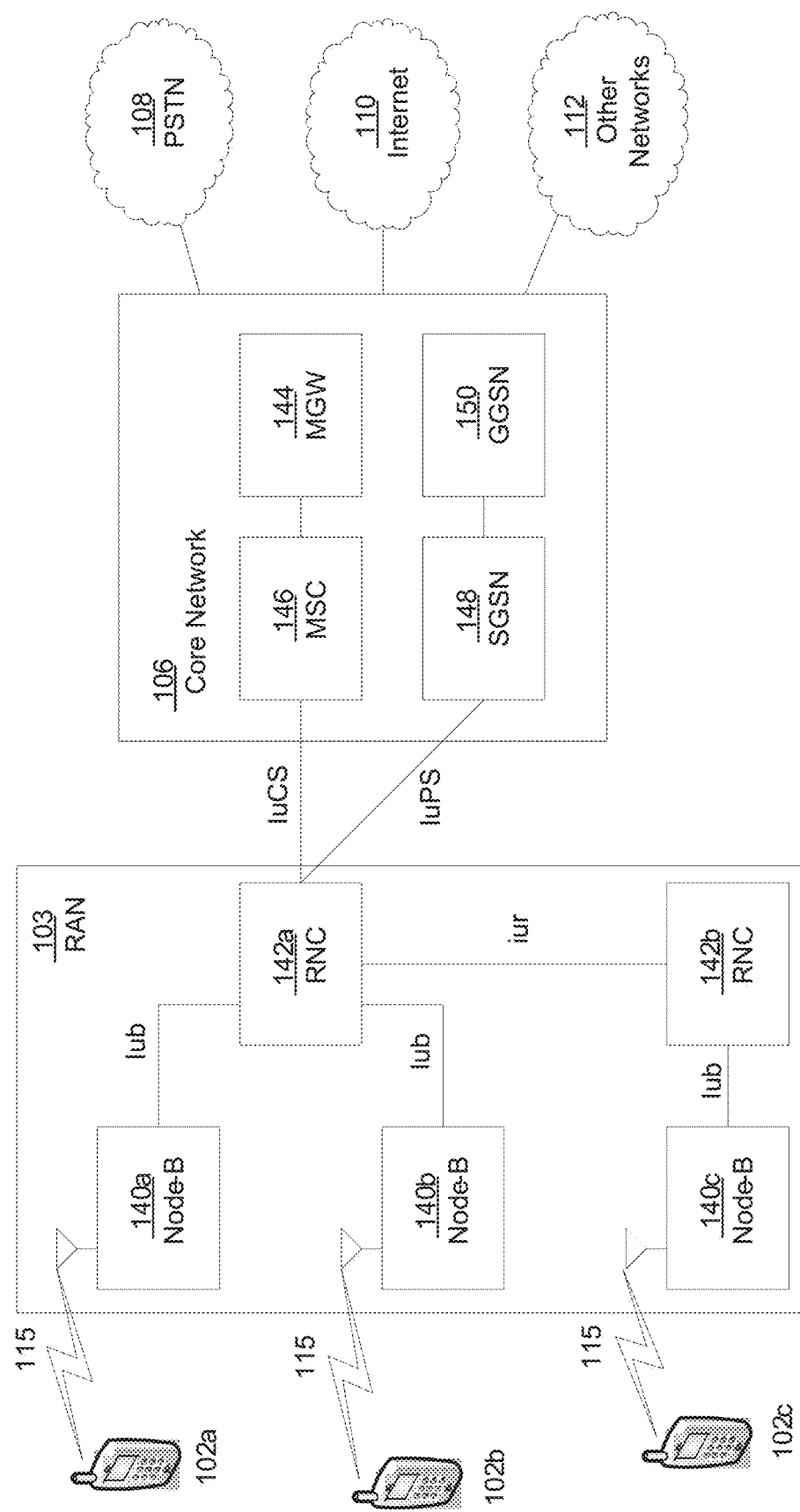
FIG. 32C is a system diagram of an example radio access network (RAN) and core network in accordance with an example embodiment.

FIG. 32C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 32C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 32C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 32C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 32D:
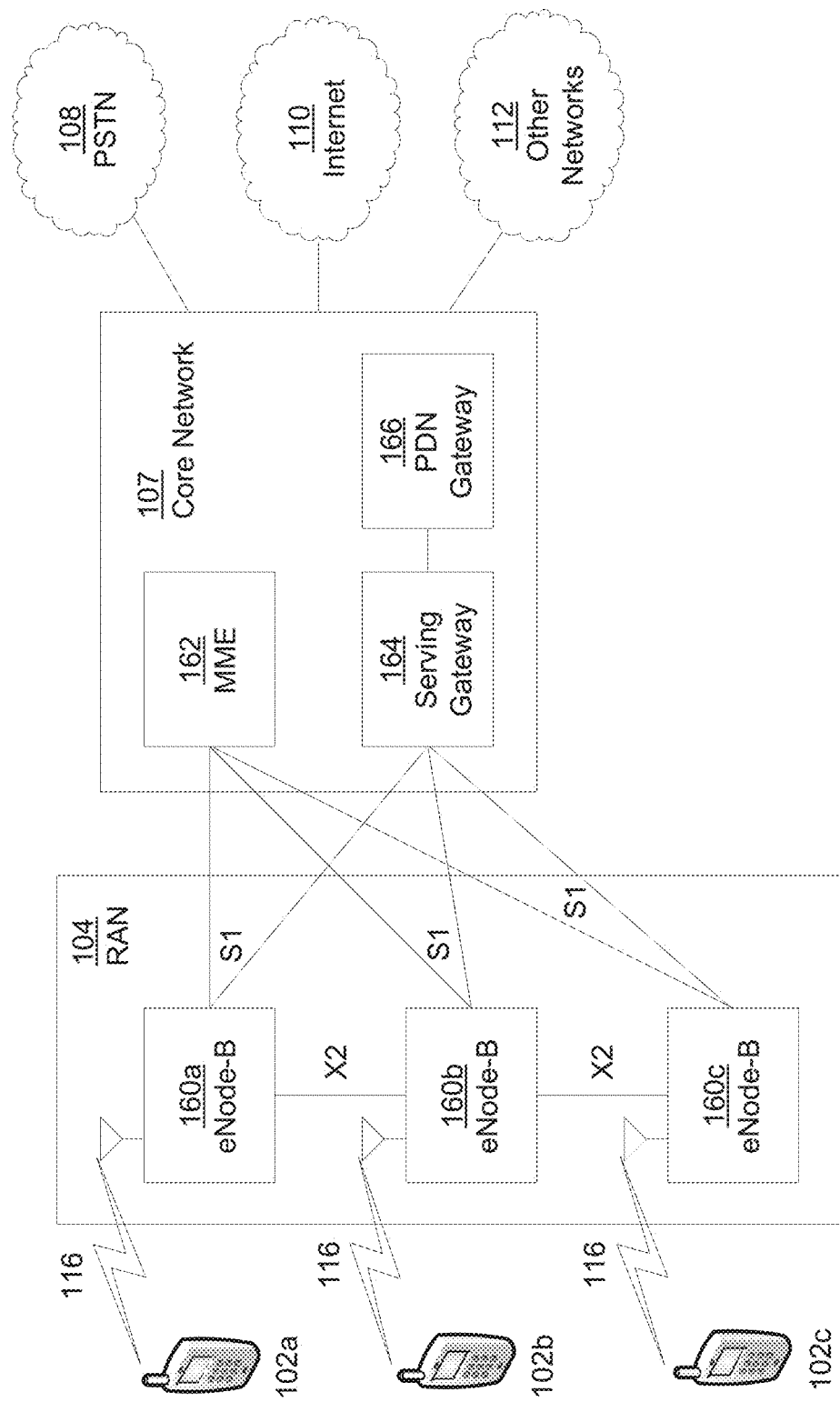
FIG. 32D is another system diagram of a RAN and core network according to another embodiment.

FIG. 32D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 32D, the eNode-Bs 160a, 160b, 160c may communicate with one another over an X2 interface.

The core network 107 shown in FIG. 32D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 32E:
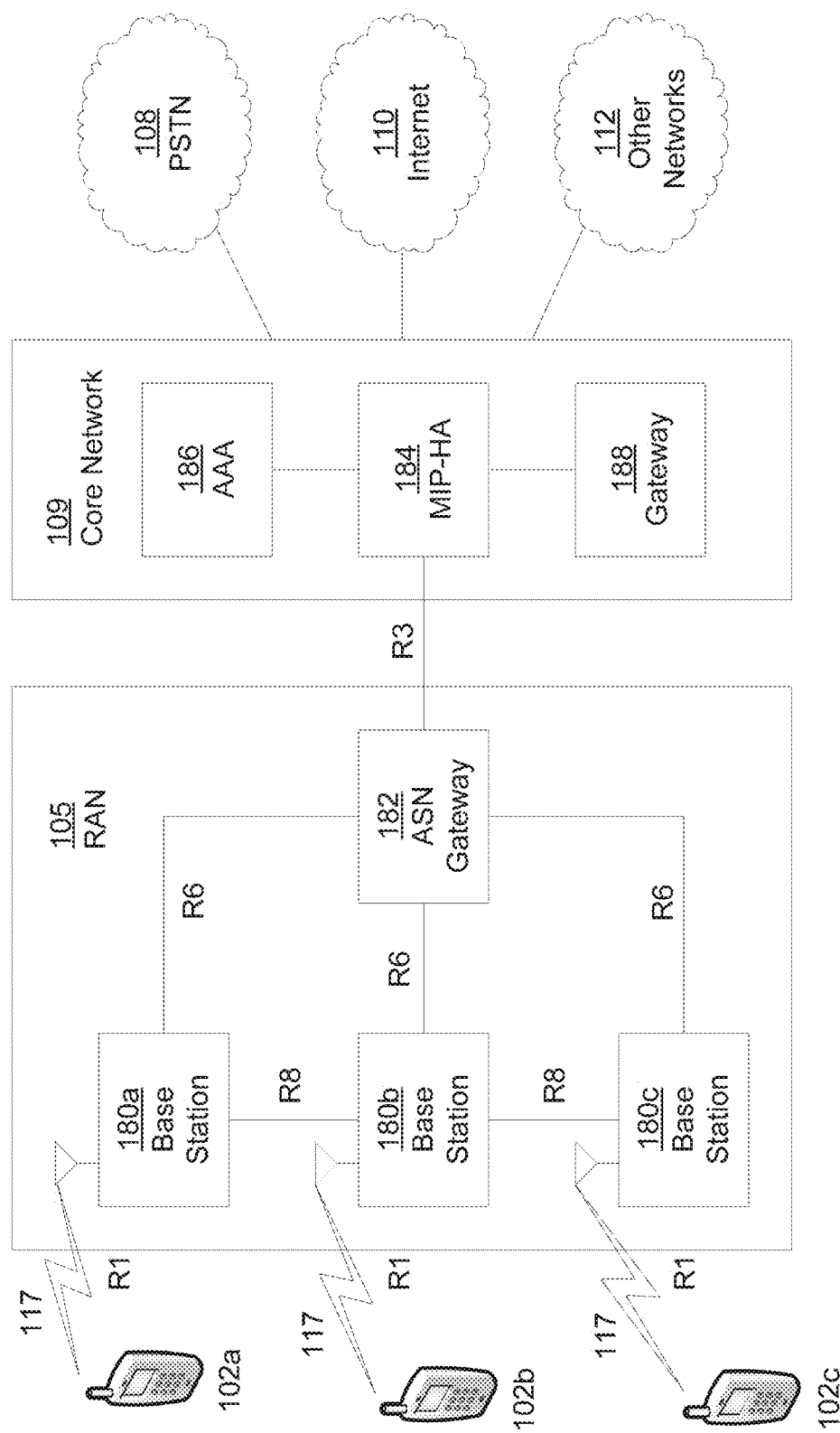
FIG. 32E is another system diagram of a RAN and core network according to another embodiment.

FIG. 32E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 32E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 32E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 32E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 32A, 32C, 32D, and 32E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 32A, 32B, 32C, 32D, and 32E are provided by way of example only, and it is understood that the subject matter disclosed and claimed herein may be embodied or implemented in any similar communication system, whether presently defined or defined in the future.

Figure 32F:
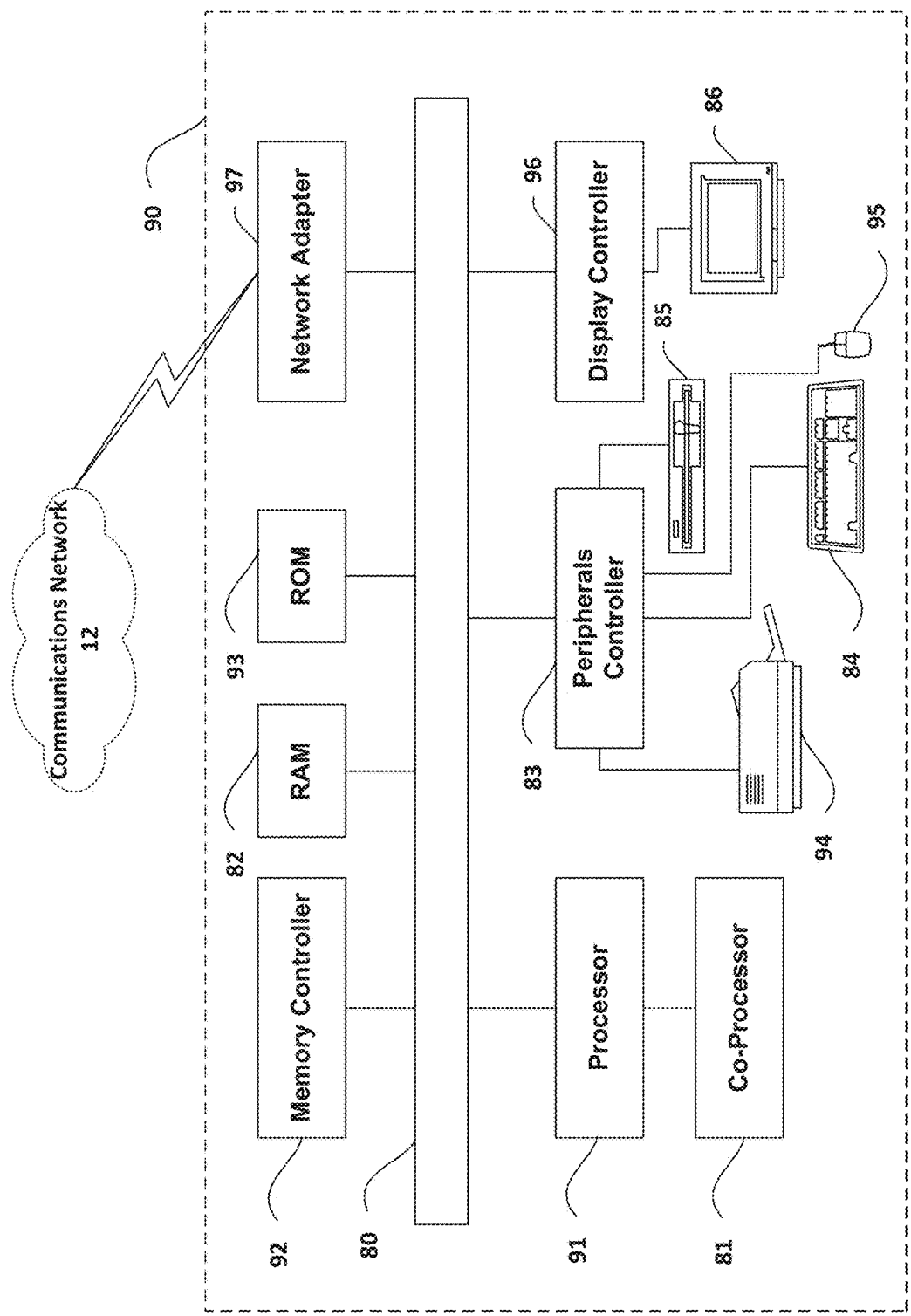
FIG. 32F is a block diagram of an exemplary computing system 90 in which one or more apparatuses of the communications networks illustrated in FIGS. 32A, 32C, 32D and 32E may be embodied.

FIG. 32F is a block diagram of an exemplary computing system 90 in which one or more apparatuses of the communications networks illustrated in FIGS. 32A, 32C, 32D and 32E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 32A, 32B, 32C, 32D, and 32E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:
   receiving, on a broadcast channel of a cell of the network, a first set of system information broadcast periodically in the network, the first set of system information comprising first information for initial access to the network, second information indicating at least one other set of system information available for request by the apparatus, and third information concerning scheduling of the at least one other set of system information available for request by the apparatus;
   storing the received first set of system information in the memory;
   sending, to the network using a physical channel resource reserved by the cell, based on the second information and the third information, a message requesting the at least one other set of system information, wherein the message contains a list of the at least one other set of system information requested by the apparatus; and
   receiving, from the network, the at least one other set of system information.

2. The apparatus of claim 1, wherein the apparatus comprises user equipment.

3. The apparatus of claim 1, wherein the reserved physical channel resource comprises one of a physical random access channel resource, a physical uplink shared channel resource, or a physical uplink control channel resource.

4. The apparatus of claim 1, wherein the apparatus uses at least some of the first set and the at least one other set of system information in another cell.

5. The apparatus of claim 1, wherein the reserved physical channel resource is associated with one of a plurality of different network use cases.

6. The apparatus of claim 1, wherein the first set of system information comprises information to support cell selection by the apparatus.

7. The apparatus of claim 1, wherein the apparatus receives the at least one other set of system information in a state of RRC_IDLE or RRC_INACTIVE.

8. The apparatus of claim 1, wherein the information concerning availability of the at least one other set of system information indicates that at least a second other set of system information is available from the cell, and wherein the instructions further cause the apparatus to receive the at least second other set of system information from the cell.

9. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:
   transmitting, to a user equipment, on a broadcast channel of a cell of the network, a first set of system information, the first set of system information comprising first information for initial access to the network, second information indicating at least one other set of system information available for request by the user equipment, and third information concerning scheduling of the at least one other set of system information available for request by the user equipment, wherein the first set of system information is broadcast in the network periodically,
   receiving, from the user equipment using a physical channel resource reserved by the cell, based on the second information and the third information, a message requesting the at least one other set of system information, wherein the message contains a list of the at least one other set of system information requested by the apparatus; and
   transmitting, to the user equipment, the requested at least one other set of system information.

10. The apparatus of claim 9, wherein the reserved physical channel resource comprises one of a physical random access channel resource, a physical uplink shared channel resource, or a physical uplink control channel resource.

11. The apparatus of claim 9, wherein the reserved physical channel resource is associated with one of a plurality of different network use cases.

12. The apparatus of claim 9, wherein the first set of system information comprises information to support cell selection by the user equipment.

13. The apparatus of claim 9, wherein transmitting the first set of system information comprises broadcasting the first set of system information periodically.

14. The apparatus of claim 9, wherein transmitting the requested at least one other set of system information comprises transmitting the requested at least one other set of system information via broadcast or dedicated signaling.

15. A method for wireless communication in a network, the method comprising:
   transmitting, to a user equipment, on a broadcast channel of a cell of the network, a first set of system information, the first set of system information comprising first information for initial access to the network, second information indicating at least one other set of system information available for request by the user equipment, and third information concerning scheduling of the at least one other set of system information available for request by the user equipment, wherein the first set of system information is broadcast in the network periodically;
   receiving, from the user equipment using a physical channel resource reserved by the cell, based on the second information and the third information, a message requesting the at least one other set of system information, wherein the message contains a list of the at least one other set of system information requested by the apparatus; and
   transmitting, to the user equipment, the requested at least one other set of system information.

* * * * *